(12) United States Patent
Yamazaki et al.

(10) Patent No.: US 10,592,094 B2
(45) Date of Patent: Mar. 17, 2020

(54) DATA PROCESSING DEVICE AND DRIVING METHOD THEREOF

(71) Applicant: Semiconductor Energy Laboratory Co., Ltd., Atsugi-shi, Kanagawa-ken (JP)

(72) Inventors: Shunpei Yamazaki, Setagaya (JP); Hajime Kimura, Atsugi (JP); Hideaki Kuwabara, Isehara (JP); Koji Dairiki, Atsugi (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 15/874,279

(22) Filed: Jan. 18, 2018

(65) Prior Publication Data

US 2018/0157394 A1   Jun. 7, 2018

Related U.S. Application Data

(63) Continuation of application No. 14/552,214, filed on Nov. 24, 2014, now Pat. No. 9,875,015.

(30) Foreign Application Priority Data

Nov. 29, 2013   (JP) .................................. 2013-248392

(51) Int. Cl.
  *G06F 3/0488*    (2013.01)
  *G06F 1/3234*    (2019.01)
(52) U.S. Cl.
  CPC .......... *G06F 3/0488* (2013.01); *G06F 1/3265* (2013.01); *G06F 2203/04101* (2013.01); *G06F 2203/04104* (2013.01); *G06F 2203/04108* (2013.01); *Y02B 70/123* (2013.01); *Y02D 10/153* (2018.01)

(58) Field of Classification Search
  CPC ......... G06F 1/3265; G06F 2203/04101; G06F 2203/04104; G06F 2203/04108; G06F 3/0488
  See application file for complete search history.

(56) References Cited

U.S. PATENT DOCUMENTS 8,415,208 B2   4/2013  Takayama et al.
8,502,788 B2   8/2013  Cho
(Continued)

FOREIGN PATENT DOCUMENTS

CN   101727272 A   6/2010
CN   101739171 A   6/2010
(Continued)

OTHER PUBLICATIONS

Taiwanese Office Action (Application No. 103140069) dated Jun. 21, 2018.
(Continued)

*Primary Examiner* — Viet D Pham
(74) *Attorney, Agent, or Firm* — Robinson Intellectual Property Law Office; Eric J. Robinson

(57) ABSTRACT

A data processing device which includes a flexible position input portion for sensing proximity or a touch of an object such as a user's palm and finger. In the case where a first region of the flexible position input portion is held by a user for a certain period, supply of image signals to the first region is selectively stopped.

13 Claims, 32 Drawing Sheets

(56) References Cited

U.S. PATENT DOCUMENTS

| | | |
|---|---|---|
| 8,516,728 B2 | 8/2013 | Jung |
| 8,593,418 B2 | 11/2013 | Blow et al. |
| 8,610,118 B2 | 12/2013 | Yamazaki et al. |
| 8,610,155 B2 | 12/2013 | Hatano et al. |
| 8,723,824 B2 | 5/2014 | Myers et al. |
| 8,823,655 B2 | 9/2014 | Wang et al. |
| 8,976,141 B2 | 3/2015 | Myers et al. |
| 9,024,897 B2 | 5/2015 | Tanaka |
| 9,277,045 B2 | 3/2016 | Makiguchi |
| 9,411,451 B2 | 8/2016 | Myers et al. |
| 9,733,822 B2 | 8/2017 | Liu et al. |
| 9,791,949 B2 | 10/2017 | Myers et al. |
| 9,843,664 B2 | 12/2017 | Makiguchi |
| 2003/0201974 A1 | 10/2003 | Yin |
| 2010/0117975 A1* | 5/2010 | Cho .................. G06F 1/1626 345/173 |
| 2010/0287470 A1 | 11/2010 | Homma et al. |
| 2010/0315361 A1 | 12/2010 | Wang et al. |
| 2010/0317409 A1 | 12/2010 | Jiang et al. |
| 2011/0050657 A1 | 3/2011 | Yamada |
| 2012/0032979 A1 | 2/2012 | Blow et al. |
| 2012/0038571 A1* | 2/2012 | Susani .................. G06F 3/0416 345/173 |
| 2012/0056849 A1 | 3/2012 | Kasahara et al. |
| 2012/0133484 A1 | 5/2012 | Griffin |
| 2012/0217516 A1 | 8/2012 | Hatano et al. |
| 2012/0243151 A1 | 9/2012 | Lynch |
| 2013/0002133 A1 | 1/2013 | Jin et al. |
| 2013/0076649 A1 | 3/2013 | Myers et al. |
| 2013/0141373 A1 | 6/2013 | Takuma et al. |
| 2013/0180882 A1 | 7/2013 | Hamers et al. |
| 2013/0194761 A1 | 8/2013 | Kim |
| 2013/0300697 A1 | 11/2013 | Kim et al. |
| 2014/0009415 A1 | 1/2014 | Nishida |
| 2014/0099999 A1 | 4/2014 | Hatano et al. |
| 2014/0240289 A1 | 8/2014 | Myers et al. |
| 2014/0306260 A1 | 10/2014 | Yamazaki et al. |
| 2014/0361980 A1 | 12/2014 | Iwaki et al. |
| 2014/0375660 A1 | 12/2014 | Tamaki |
| 2015/0009128 A1 | 1/2015 | Matsumoto |
| 2015/0035777 A1 | 2/2015 | Hirakata et al. |
| 2015/0062525 A1 | 3/2015 | Hirakata |
| 2015/0103023 A1 | 4/2015 | Iwaki |
| 2018/0052540 A1 | 2/2018 | Myers et al. |
| 2018/0097929 A1 | 4/2018 | Makiguchi |

FOREIGN PATENT DOCUMENTS

| | | |
|---|---|---|
| CN | 101887343 A | 11/2010 |
| CN | 102402282 A | 4/2012 |
| CN | 202433855 U | 9/2012 |
| CN | 102830935 A | 12/2012 |
| CN | 103019572 A | 4/2013 |
| CN | 103052937 A | 4/2013 |
| CN | 103309532 A | 9/2013 |
| CN | 103828334 A | 5/2014 |
| EP | 2192750 A | 6/2010 |
| EP | 2426581 A | 3/2012 |
| EP | 2706441 A | 3/2014 |
| EP | 3125508 A | 2/2017 |
| JP | 2008-003702 A | 1/2008 |
| JP | 2010-262557 A | 11/2010 |
| JP | 2011-007833 A | 1/2011 |
| JP | 2011-216066 A | 10/2011 |
| JP | 2012-058883 A | 3/2012 |
| JP | 2012-190794 A | 10/2012 |
| JP | 2012-234386 A | 11/2012 |
| JP | 2013-538397 | 10/2013 |
| JP | 2014-535086 | 12/2014 |
| KR | 2014-0066253 A | 5/2014 |
| TW | 201044235 | 12/2010 |
| WO | WO-2012/021417 | 2/2012 |
| WO | WO-2012/150697 | 11/2012 |
| WO | WO-2013/048881 | 4/2013 |

OTHER PUBLICATIONS

Chinese Office Action (Application No. 201480061980.4) dated Aug. 31, 2018.
International Search Report (Application No. PCT/IB2014/066147) dated Feb. 24, 2015.
Written Opinion (Application No. PCT/IB2014/066147) dated Feb. 24, 2015.
Chinese Office Action (Application No. 201480061980.4) dated Sep. 25, 2019.

* cited by examiner

FIG. 7A1
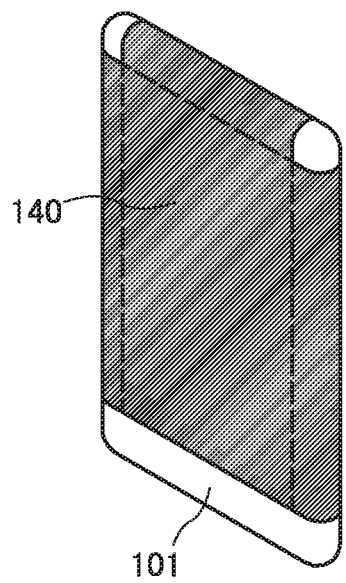
FIG. 7A2
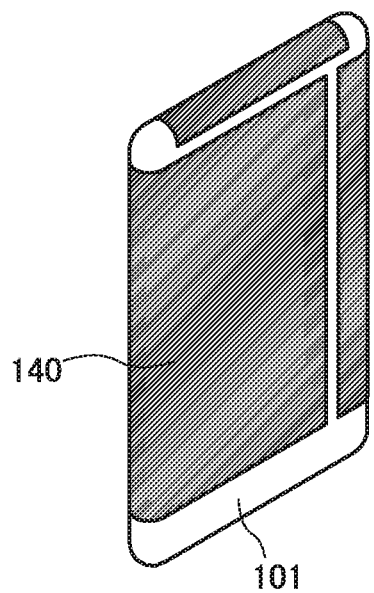
FIG. 7B1
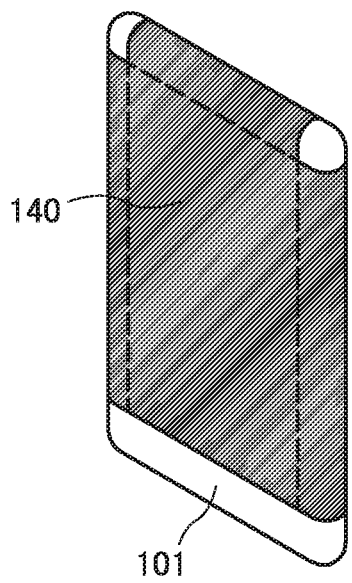
FIG. 7B2
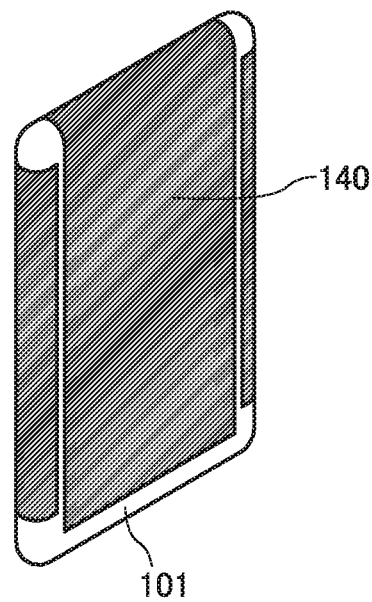

FIG. 8A1 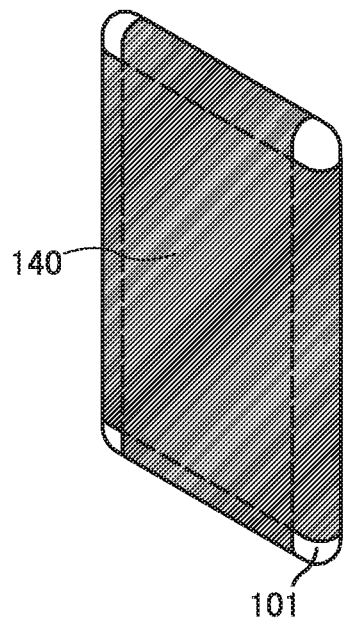
FIG. 8A2 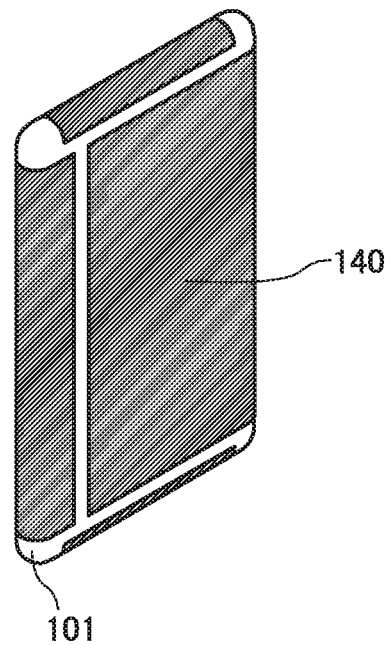
FIG. 8B1 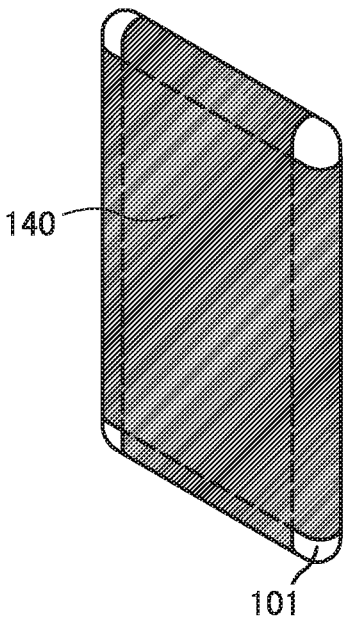
FIG. 8B2 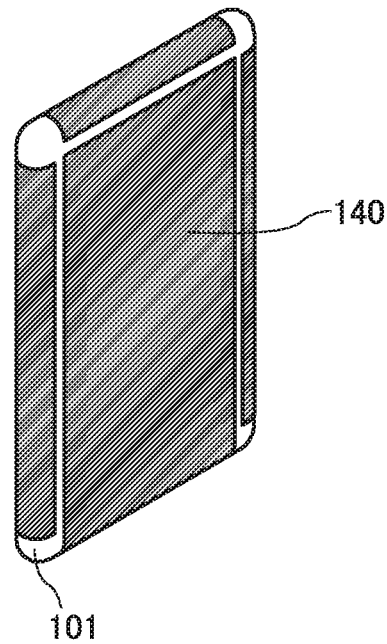

FIG. 9A1
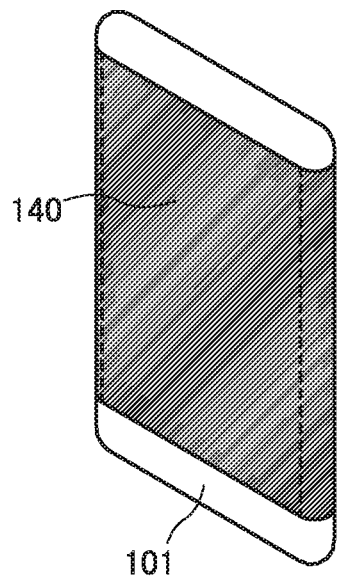
FIG. 9A2
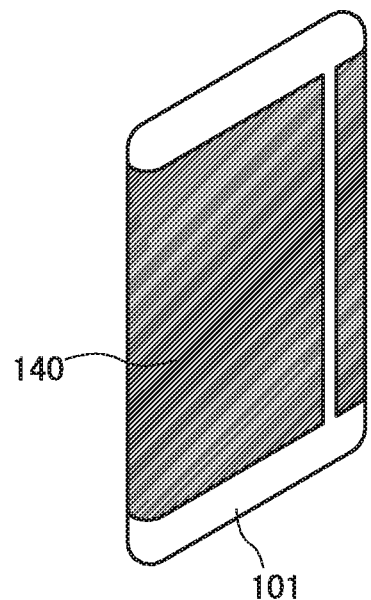
FIG. 9B1
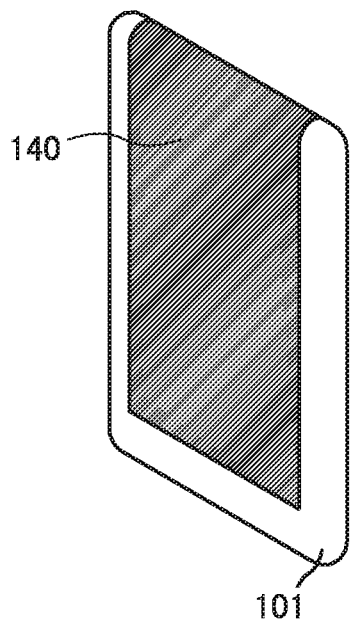
FIG. 9B2
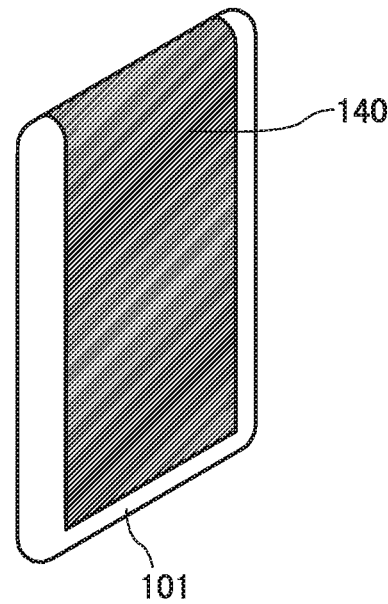

FIG. 10A1
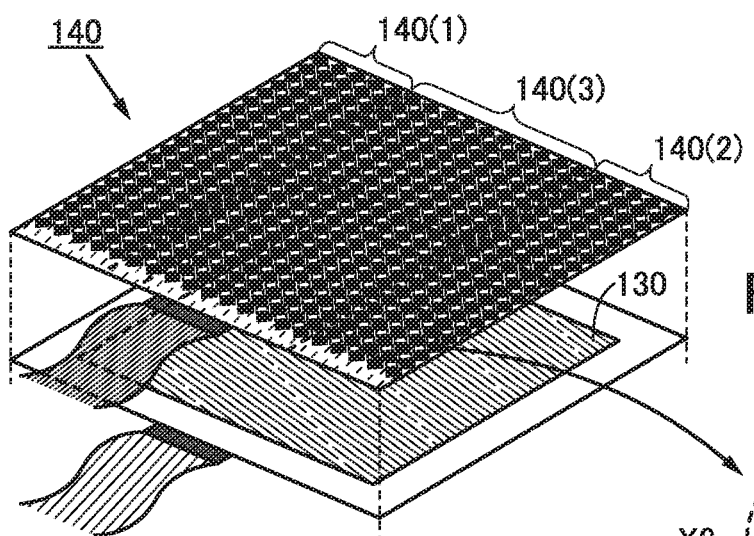
FIG. 10A2
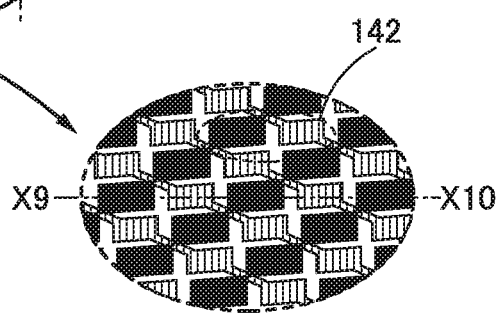
FIG. 10B
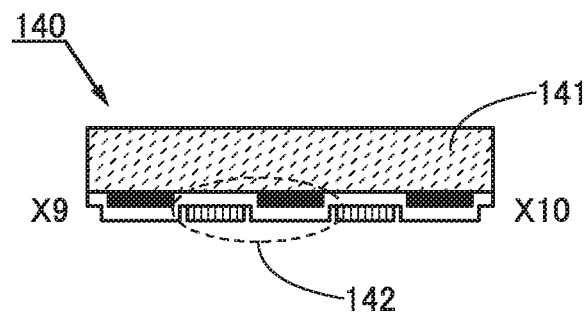

FIG. 14A1
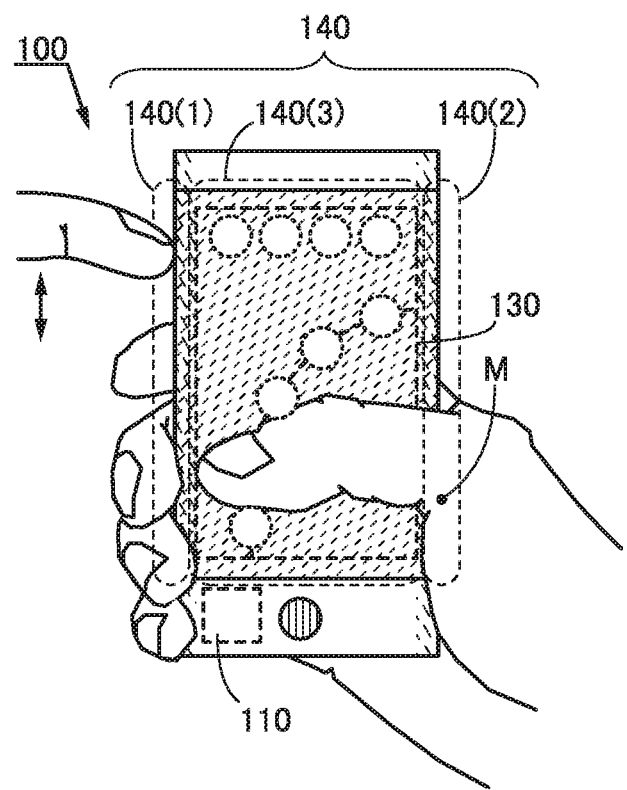
FIG. 14A2
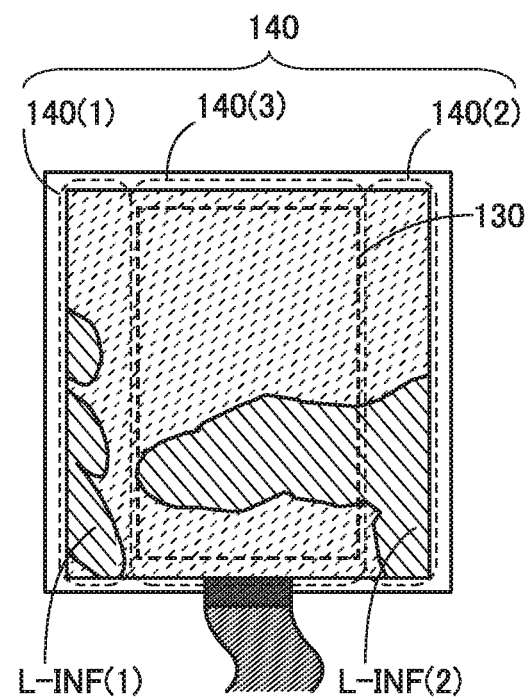
FIG. 14B1
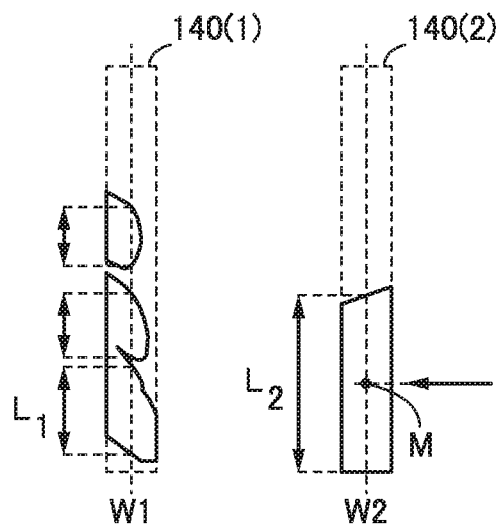
FIG. 14B2
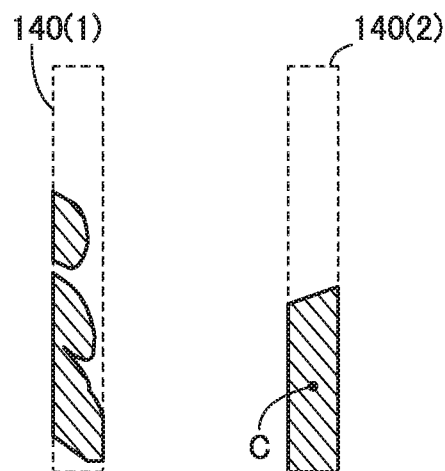

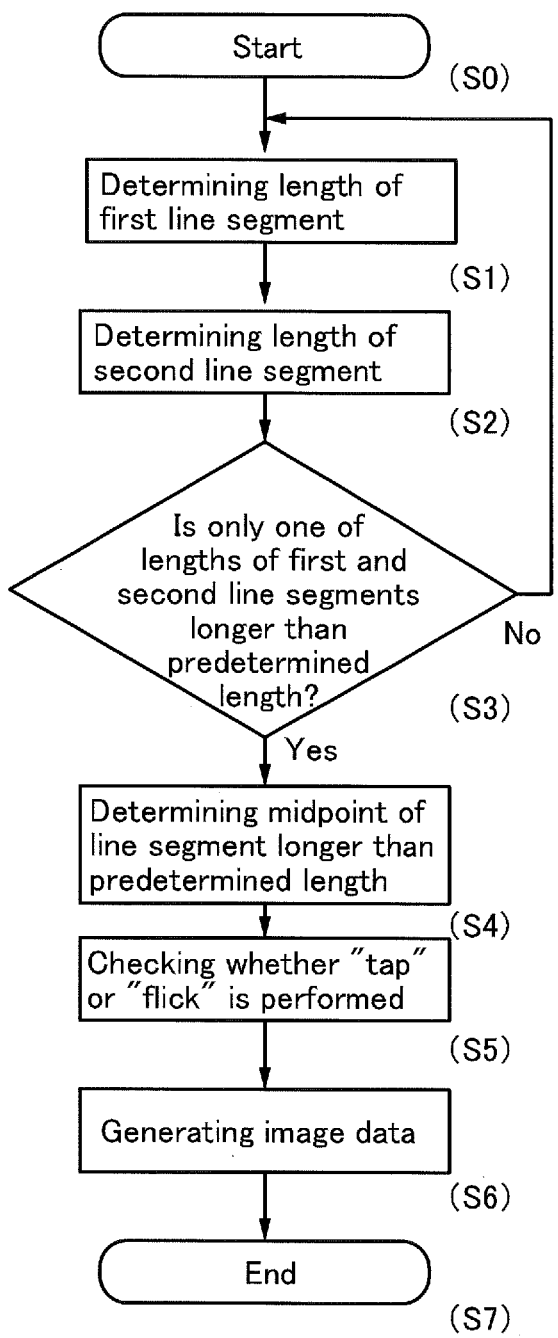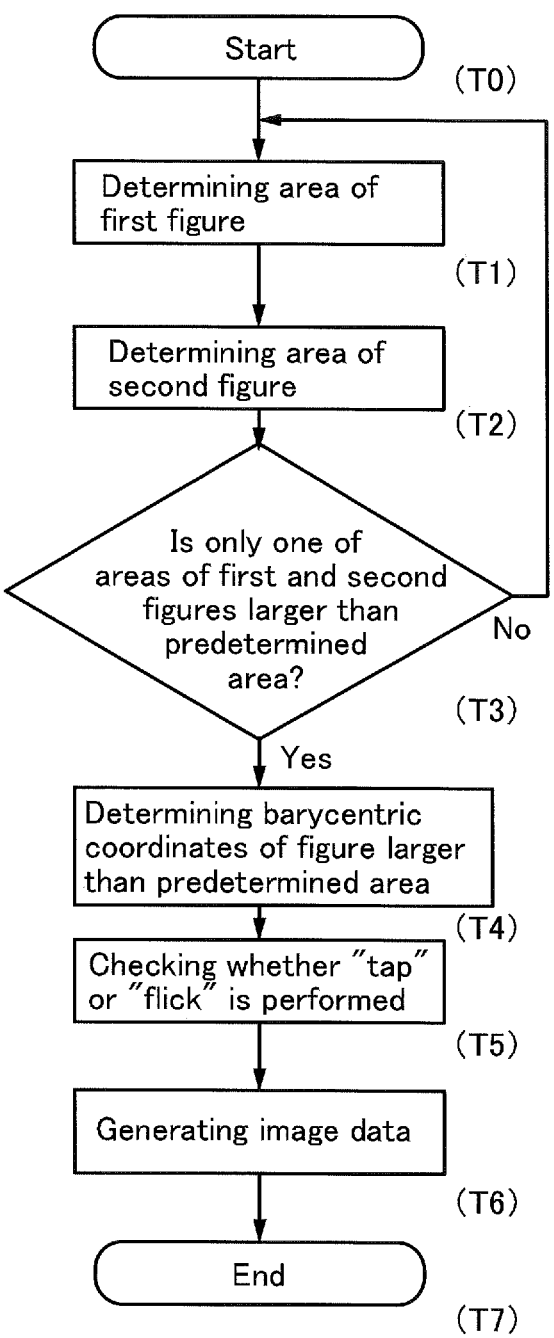

DATA PROCESSING DEVICE AND DRIVING METHOD THEREOF

TECHNICAL FIELD

The present invention relates to an object, a method, or a manufacturing method. In addition, the present invention relates to a process, a machine, manufacture, or a composition of matter. In particular, the present invention relates to, for example, a semiconductor device, a display device, a light-emitting device, a power storage device, a driving method thereof, or a manufacturing method thereof. In particular, the present invention relates to, for example, a method and a program for processing and displaying image information, and a device including a recording medium in which the program is recorded. In particular, the present invention relates to, for example, a method for processing and displaying image information by which an image including information processed by an information processor provided with a display portion is displayed, a program for displaying an image including information processed by an information processor provided with a display portion, and an information processor including a recording medium in which the program is recorded.

BACKGROUND ART

Display devices with large screens can display many pieces of information. Therefore, such display devices are excellent in browsability and suitable for information processors.

The social infrastructures relating to means for transmitting information have advanced. This has made it possible to acquire, process, and send out many pieces and various kinds of information with the use of an information processor not only at home or office but also at other visiting places.

With this being the situation, portable information processors are under active development.

For example, portable information processors are often used outdoors, and force might be accidentally applied by dropping to the information processors and display devices included in them. As an example of a display device that is not easily broken, a display device having high adhesiveness between a structure body by which a light-emitting layer is divided and a second electrode layer is known (Patent Document 1).

REFERENCE

[Patent Document 1] Japanese Published Patent Application No. 2012-190794

DISCLOSURE OF INVENTION

An object of one embodiment of the present invention is to provide a novel human interface with high operability. Another object is to provide a novel data processing device with high operability. Another object is to provide a novel processing device, a novel display device, or the like. Another object is to provide a data processing device, a display device, or the like which consumes low power. Another object is to provide a data processing device, a display device, or the like with favorable operability. Another object is to provide a data processing device, a display device, or the like which can be easily held by a user. Another object is to provide a data processing device, a display device, or the like which is less likely to fall. Another object is to provide a data processing device, a display device, or the like with fewer malfunctions. Another object is to provide a data processing device and a display device that can be easily operated with both hands.

Note that the descriptions of these objects do not disturb the existence of other objects. In one embodiment of the present invention, there is no need to achieve all the objects. Other objects will be apparent from and can be derived from the description of the specification, the drawings, the claims, and the like.

One embodiment of the present invention is a data processing device including an input/output unit that supplies positional data and receives image data, an arithmetic unit that receives the positional data and supplies the image data. The input/output unit includes a position input portion and a display portion. The position input portion is flexible to be bent such that a first region, a second region facing the first region, and a third region between the first region and the second region are formed. The display portion is provided to overlap with at least part of the first region, the second region, or the third region. The arithmetic unit includes an arithmetic portion and a memory portion that stores a program to be executed by the arithmetic portion, and supplies image data to the display portion based on the positional data.

Another embodiment of the present invention is a data processing device including an input unit having a plurality of regions provided with a sensor portion that senses proximity or a touch of the object, an arithmetic portion that determines a proximity operation or a contact operation over a sensor portion, and a display device having flexibility. In the case where the specific proximity operation or contact operation is performed in the plurality of regions at the same time, predetermined processing is carried out.

One embodiment of the present invention is a method for driving a data processing device including an input unit provided with a sensor portion that senses proximity or a touch of an object and a display unit provided with a display portion for displaying images. The sensor portion and the display portion overlaps with each other. The data processing device determines the first region over the sensor portion in which proximity or touch of an object is sensed for a predetermined time, and image signals are not provided to the second region over the display portion which overlaps with the first region.

Another embodiment of the present invention is a driving method of a data processing device including an input unit provided with a sensor portion for sensing proximity or a touch of an object, and an arithmetic portion for determining a proximity operation or a contact operation over the sensor portion. The data processing device detects a region over the sensor portion in which proximity or contact of an object is sensed for a predetermined time is determined, so that the region is excluded from a subject of determination of the proximity operation or the contact operation.

Another embodiment of the present invention is a driving method of a data processing device in which whether the data processing device is operated by one hand or whether it is operated with both hands is determined, and an image based on the determination result is displayed.

In one embodiment of the present invention, a human interface with high operability can be provided. Furthermore, a novel data processing device with high operability can be provided. A novel data processing device or a novel display device can be provided. Furthermore, a data processing device, a display device, and the like which consume low power can be provided. A data processing device, a display device, and the like with high operability can be provided. A data processing device, display device, and the like which can be held easily can be provided. A data processing device, a display device, and the like which are less likely to fall can be provided. A data processing device, a display device, and the like with fewer malfunctions can be provided. A data processing device, a display device, and the like which is easily operated by both hands can be provided. Note that the description of these effects does not disturb the existence of other effects. One embodiment of the present invention does not necessarily achieve all the objects listed above. Other effects will be apparent from and can be derived from the description of the specification, the drawings, the claims, and the like.

BRIEF DESCRIPTION OF DRAWINGS

FIGS. 7A1, 7A2, 7B1, and 7B2 are schematic views illustrating structures of data processing devices of embodiments.

FIGS. 8A1, 8A2, 8B1, and 8B2 are schematic views illustrating structures of data processing device of embodiments.

FIGS. 9A1, 9A2, 9B1, and 9B2 are schematic views illustrating a structure of data processing devices of embodiments.

FIGS. 10A1, 10A2, and 10B illustrate a structure of a position input portion of an embodiment.

FIGS. 14A1, 14A2, 14B1, and 14B2 illustrate a data processing device of an embodiment held by a user.

FIGS. 16A and 16B are flow charts showing a program to be executed by an arithmetic portion of a data processing device of an embodiment.

BEST MODE FOR CARRYING OUT THE INVENTION

Figure 1:
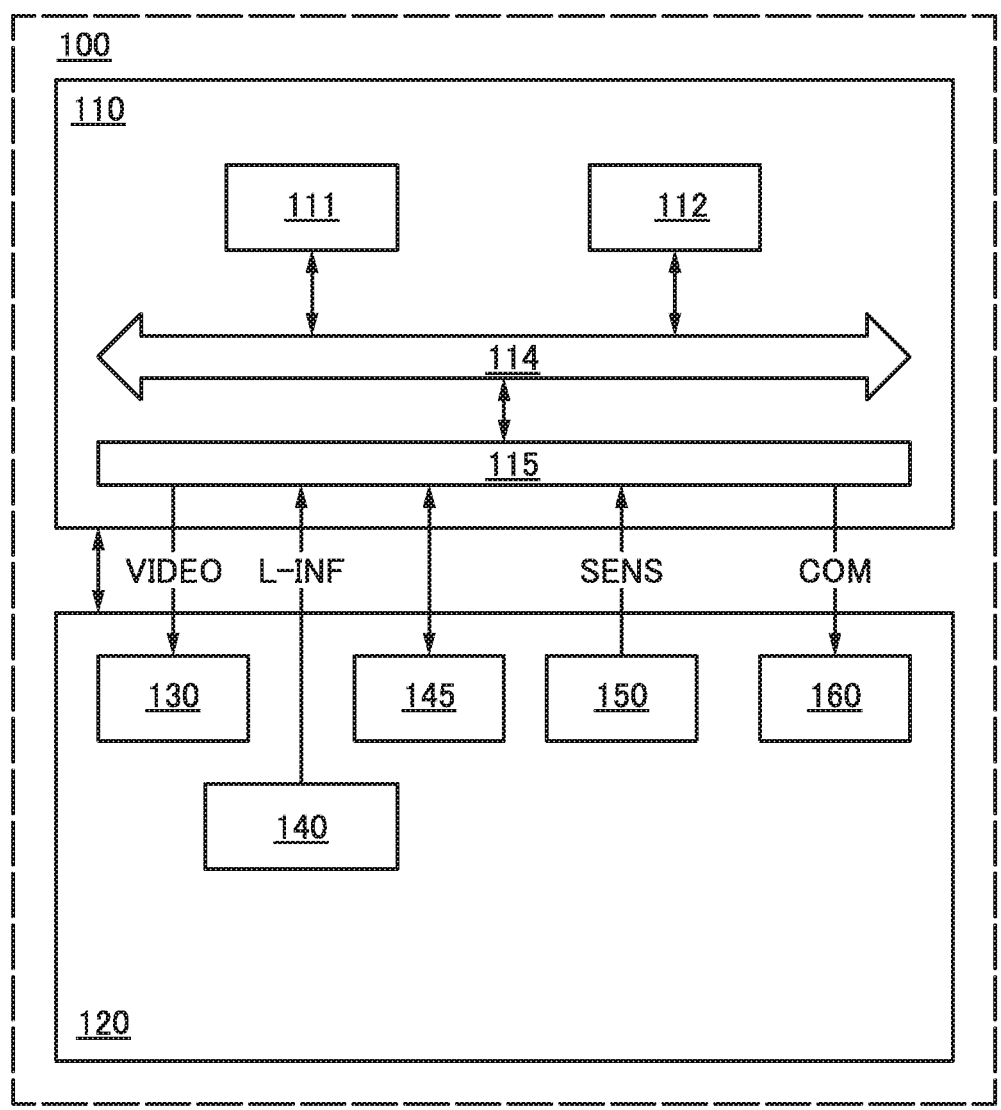
FIG. 1 is a block diagram illustrating a structure of a data processing device of an embodiment.

Embodiments will be described in detail with reference to drawings. Note that the present invention is not limited to the description below, and it is easily understood by those skilled in the art that various changes and modifications can be made without departing from the spirit and scope of the present invention. Accordingly, the present invention should not be interpreted as being limited to the content of the embodiments below. Note that in the structures of the invention described below, the same portions or portions having similar functions are denoted by the same reference numerals in different drawings, and description of such portions is not repeated.

The position, size, range, and the like of each component illustrated in the drawings and the like are not accurately represented in some cases to facilitate understanding of the invention. Therefore, the disclosed invention is not necessarily limited to the position, the size, the range, or the like disclosed in the drawings and the like. For example, the position, size, range, and the like of each component are not illustrated in some cases for easy understanding.

Note that the term "over" or "below" in this specification and the like does not necessarily mean that a component is placed directly on or directly below and directly in contact with another component. For example, the expression "electrode B over insulating layer A" does not necessarily mean that the electrode B is on and in direct contact with the insulating layer A and can mean the case where another component is provided between the insulating layer A and the electrode B.

Note that ordinal numbers such as "first" and "second" and the like in this specification and the like are used in order to avoid confusion among components and do not denote the priority or the order such as the order of steps or the stacking order. A term without an ordinal number in this specification and the like might be provided with an ordinal number in a claim in order to avoid confusion among components. In addition, a term with an ordinal number in this specification and the like may be provided with a different ordinal number in a claim.

In this specification and the like, "touch" means contacting with a surface of a data processing device by part of the body of a user such as a finger or a tool such as a stylus. In this specification and the like, "tap" means hitting the surface of the data processing device with part of the body of a user such as a finger or a tool such as a stylus. In this specification and the like, "flick" means sliding part of the body of a user or a tool such as a stylus on the surface of the data processing device. In this specification and the like, "drag" means selecting part or all of an image displayed on a display portion and moving the selected image by "flick" by part of the body of a user such as a finger or a tool such as a stylus. In this specification and the like, "pinch in" means sliding two fingers on the surface of the data processing device as if pinching an object. In this specification and the like, "pinch out" means sliding two fingers on the surface of the data processing device so that they are away from each other. In this specification and the like, a proximity operation and a contact operation performed over a sensor portion, such as "touch", "tap", "flick", "drag", "pinch in", and "pinch out" are collectively referred to as "touch action".

Embodiment 1

In this embodiment, a structure of a data processing device of one embodiment of the present invention will be described with reference to drawings.

FIG. 1 shows a block diagram of a structure of a data processing device 100 of one embodiment of the present invention.

Figure 2A:
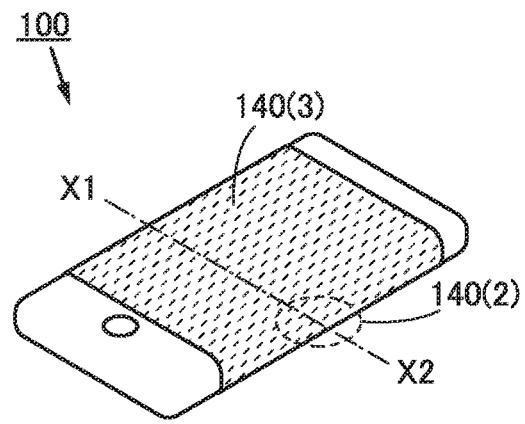
FIGS. 2A to 2E illustrate structures of a data processing device and a position input portion of an embodiment.
Figure 2B:
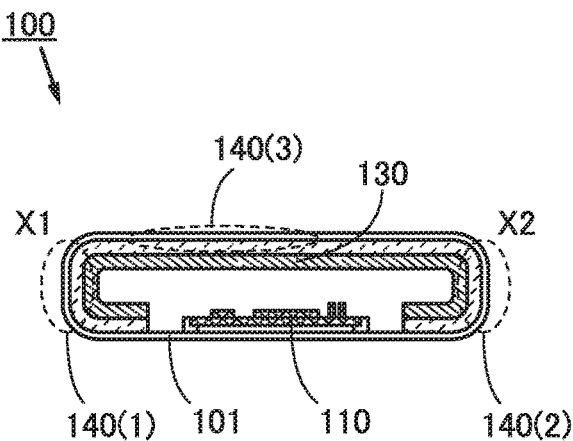
Figure 2C:
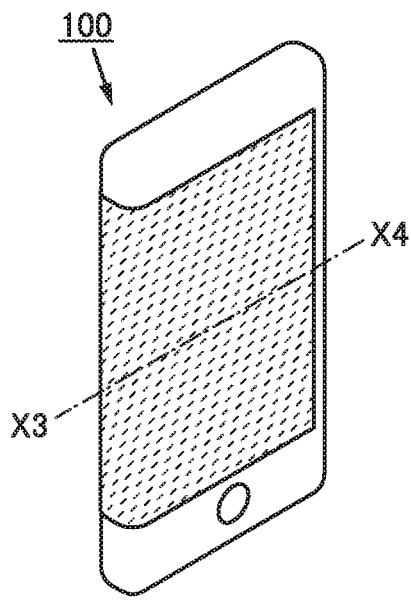
Figure 2D:
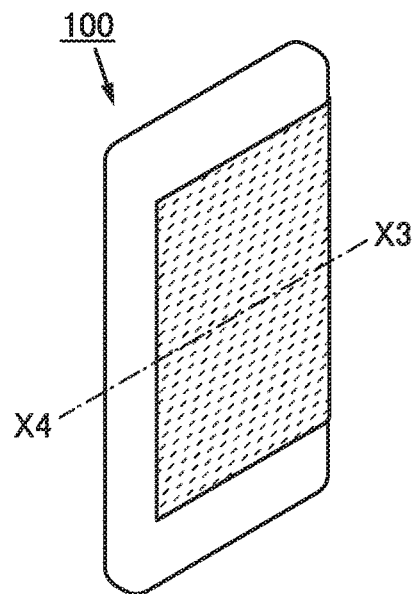
Figure 2E:
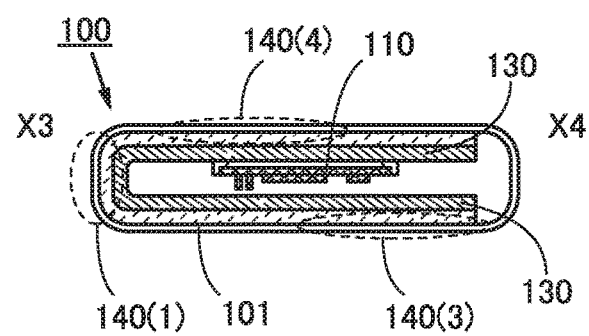

FIG. 2A is a schematic view illustrating the external appearance of the data processing device 100 of one embodiment of the present invention, and FIG. 2B is a cross-sectional view illustrating a cross-sectional structure along a cutting-plane line X1-X2 in FIG. 2A. FIGS. 2C and 2D are schematic views illustrating the external appearance of the data processing device 100 of one embodiment of the present invention, and FIG. 2E is a cross-sectional view illustrating a cross-sectional structure along a cutting-plane line X3-X4 in FIGS. 2C and 2D. FIG. 2C is a schematic view illustrating a front surface of the data processing device 100. FIG. 2D is a schematic view illustrating a back surface of the data processing device 100.

Figure 3A:
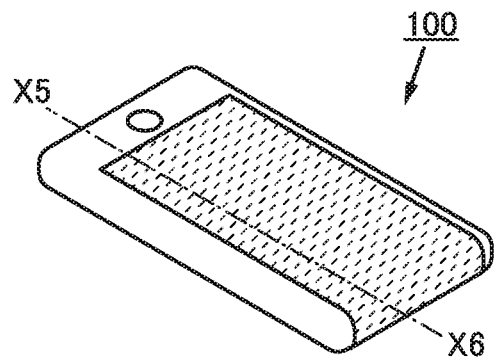
FIGS. 3A to 3C illustrate structures of a data processing device and a position input portion of an embodiment.
Figure 3B:
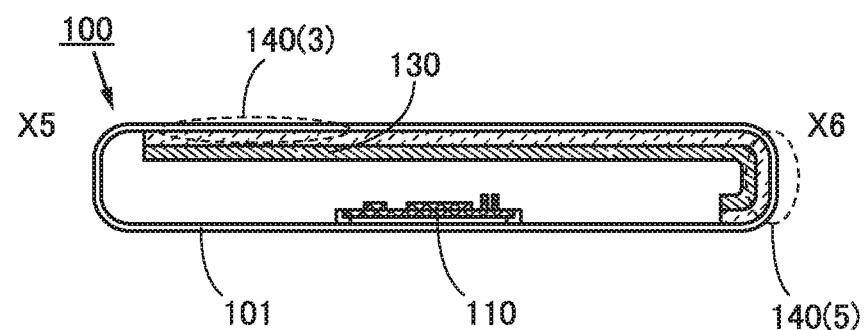
Figure 3C:
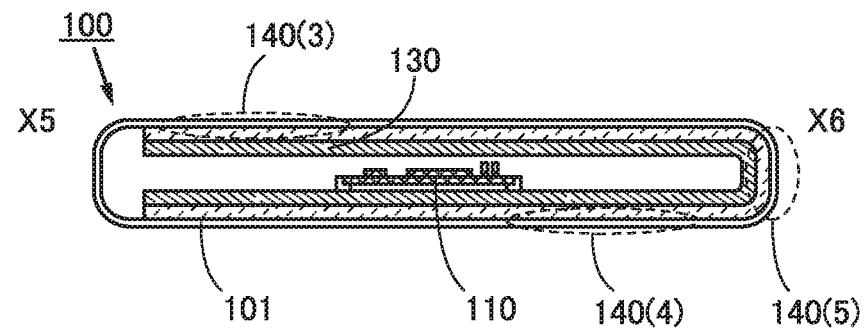

FIG. 3A is a schematic view illustrating the external appearance of the data processing device 100 of one embodiment of the present invention, and FIG. 3B is a cross-sectional view illustrating a cross-sectional structure along a cutting-plane line X5-X6 in FIG. 3A. FIG. 3C is a cross sectional view illustrating an example of a cross-sectional structure which is different from that of FIG. 3B.

Figure 4A:
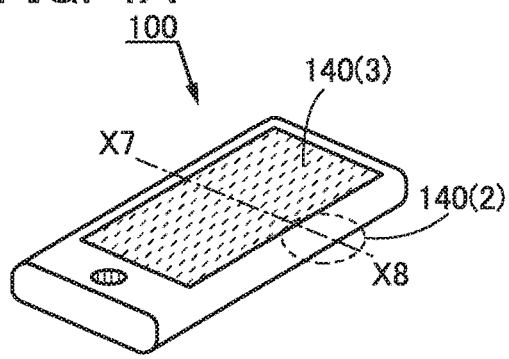
FIGS. 4A to 4H illustrate structures of a data processing device and a position input portion of an embodiment.
Figure 4B:
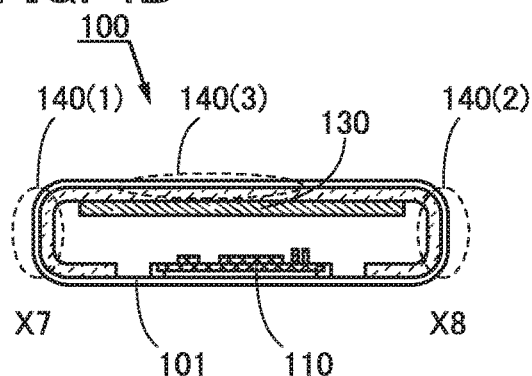

FIG. 4A is a schematic view illustrating the external appearance of the data processing device 100 of one embodiment of the present invention, and FIG. 4B is a cross-sectional view illustrating a cross-sectional structure along a cutting-plane line X7-X8 in FIG. 4A. FIGS. 4C to 4H are cross-sectional views illustrating examples of cross-sectional structures which are different from those of FIG. 4B.

As illustrated in FIGS. 2C and 2D, and FIG. 3C, a position input portion 140 or a display portion 130 may be provided not only on the front surface but also on the side surface or the back surface of the data processing device 100. As illustrated in FIG. 3A, the position input portion 140 or the display portion 130 may also be provided on the top surface of the data processing device 100. The position input portion 140 or the display portion 130 may also be provided on the bottom surface of the data processing device 100. As illustrated in FIG. 4A and FIG. 4B that is a cross-sectional view of FIG. 4A, the position input portion 140 and the display portion 130 are not necessarily provided on the side surface, the top surface or the back surface of the data processing device 100.

Figure 5A:
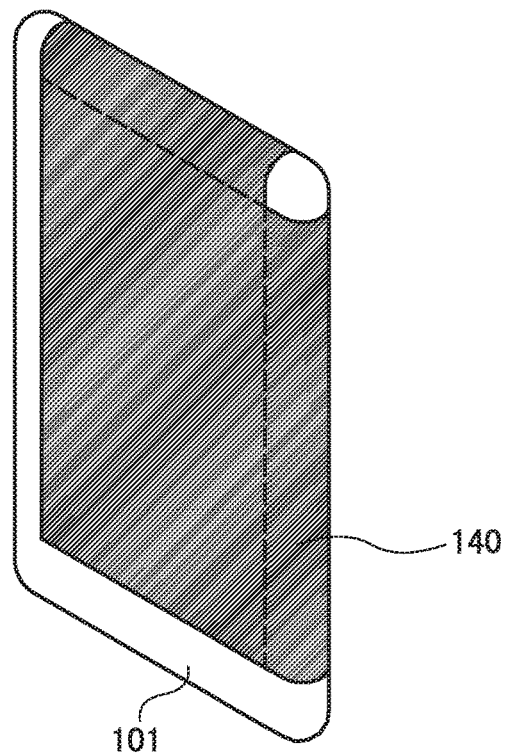
FIGS. 5A and 5B are schematic views illustrating a structure of a data processing device of an embodiment.
Figure 5B:
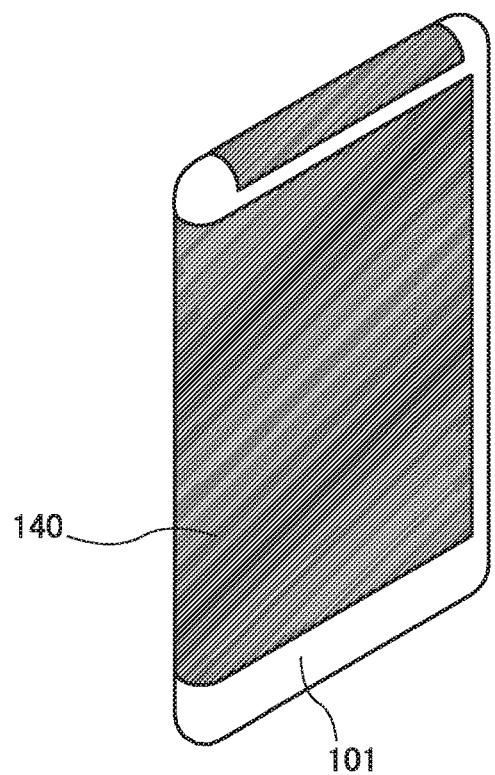
Figure 6A:
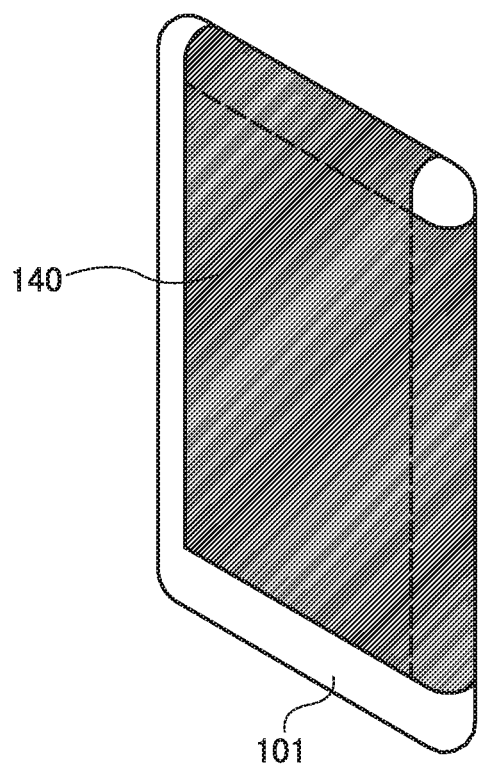
FIGS. 6A and 6B are schematic views illustrating a structure of a data processing device of an embodiment.
Figure 6B:
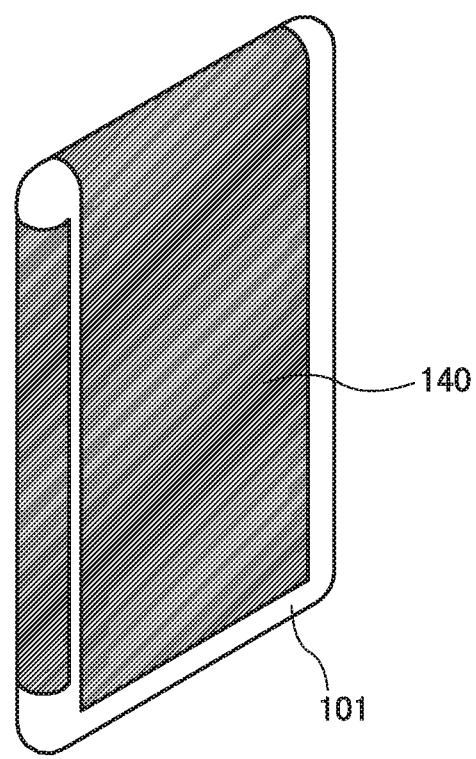

For example, a structure illustrated in FIGS. 5A and 5B may be employed. FIG. 5A is a schematic perspective view of the front surface side of the data processing device, and FIG. 5B is a schematic perspective view of the back surface side thereof. Alternatively, a structure illustrated in FIGS. 6A and 6B may be employed. FIG. 6A is a schematic perspective view of the front surface side of the data processing device, and FIG. 6B is a schematic perspective view of the back surface side thereof. Alternatively, a structure illustrated in FIGS. 7A1 and 7A2 may be employed. FIG. 7A1 is a schematic perspective view of the front surface side of the data processing device, and FIG. 7A2 is a schematic perspective view of the back surface side thereof. In addition, a structure illustrated in FIGS. 7B1 and 7B2 may be employed. FIG. 7B1 is a schematic perspective view of the front surface side of the data processing device, and FIG. 7B2 is a schematic perspective view of the back surface side thereof. In addition, a structure illustrated in FIGS. 8A1 and 8A2 may be employed. FIG. 8A1 is a schematic perspective view of the front surface side of the data processing device, and FIG. 8A2 is a schematic perspective view of the back surface side thereof. In addition, a structure illustrated in FIGS. 8B1 and 8B2 may be employed. FIG. 8B1 is a schematic perspective view of the front surface side of the data processing device, and FIG. 8B2 is a schematic perspective view of the back surface side thereof. In addition, a structure illustrated in FIGS. 9A1 and 9A2 may be employed. FIG. 9A1 is a schematic perspective view of the front surface side of the data processing device, and FIG. 9A2 is a schematic perspective view of the back surface side thereof. In addition, a structure illustrated in FIGS. 9B1 and 9B2 may be employed. FIG. 9B1 is a schematic perspective view of the front surface side of the data processing device, and FIG. 9B2 is a schematic perspective view of the back surface side thereof.

Note that in addition to the position input portion 140, a hardware button, an external connection terminal, and the like may be provided on the surface of a housing 101.

With such a structure, images can be displayed not only on the plane parallel to the front surface of the housing like in a conventional data processing device but also on the side surface of the housing. In particular, display regions are preferably provided along the two or more side surfaces of the housing because the variety of display is further increased.

A display region provided along the front surface of the data processing device and display regions provided along the side surface thereof may be independently used as display regions to display different images or the like, or two or more of the display regions may display one image or the like. For example, a continuous image may be displayed on the display region provided along the front surface of the data processing device and the display region provided along the side surface thereof and the like.

FIG. 10A1 is a schematic view illustrating arrangement of a position input portion 140 and the display portion 130 that can be employed in the data processing device 100 of one embodiment of the present invention, and FIG. 10A2 is a schematic view illustrating arrangement of proximity sensors 142 of the position input portion 140.

FIG. 10B is a cross-sectional view illustrating a cross-sectional structure of the position input portion 140 along a cutting-plane line X9-X10 in FIG. 10A2.

<Example of Structure of Data Processing Device>

The data processing device 100 described here includes an input/output unit 120 which supplies positional data L-INF and to which image data VIDEO is supplied and an arithmetic unit 110 to which the positional data L-INF is supplied and supplies the image data VIDEO (see FIG. 1).

The input/output unit 120 includes the position input portion 140 which supplies the positional data L-INF and the display portion 130 to which the image data VIDEO is supplied.

The position input portion 140 is flexible to be bent such that, for example, a first region 140(1), a second region 140(2) facing the first region 140(1), and a third region 140(3) between the first region 140(1) and the second region 140(2) are formed (see FIG. 2B). For another example, the position input portion 140 is flexible to be folded, such that the first region 140(1), the third region 140(3), and a fourth region 140(4) facing the third region 140(3) are formed (see FIG. 2E).

For another example, the position input portion 140 is flexible to be folded, such that the third region 140(3), a fifth region 140(5), the fourth region 140(4) facing the third region 140(3) are formed (see FIG. 3C).

Figure 4C:
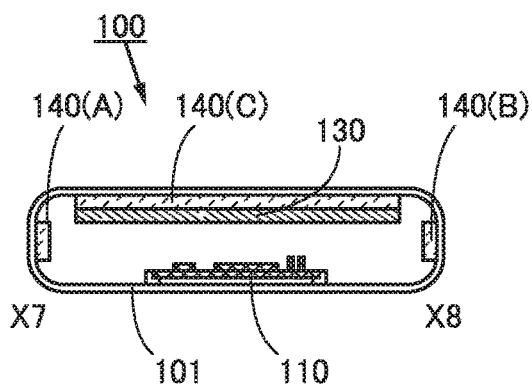
Figure 4D:
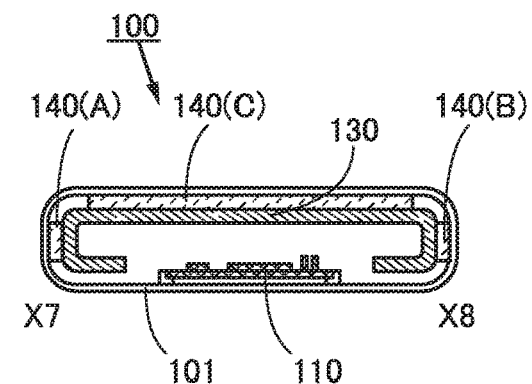
Figure 4E:
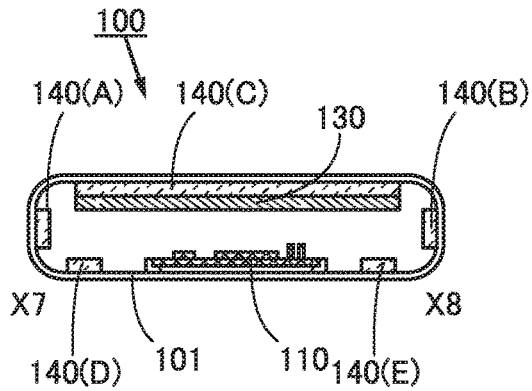
Figure 4F:
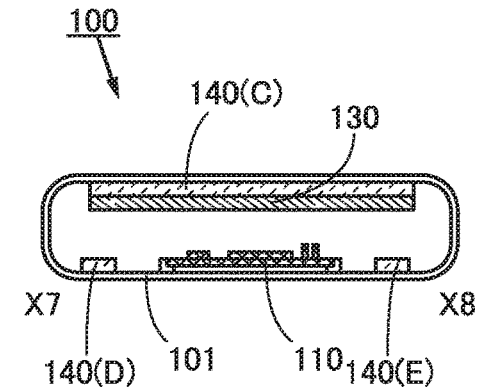
Figure 4G:
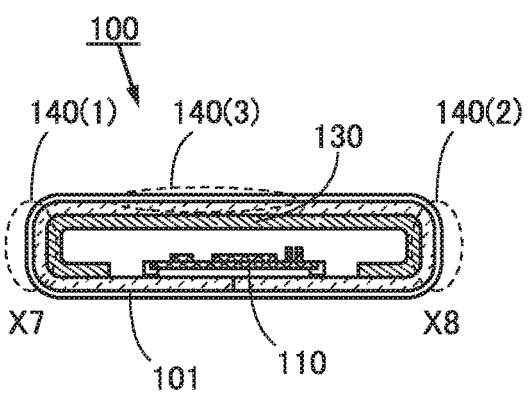
Figure 4H:
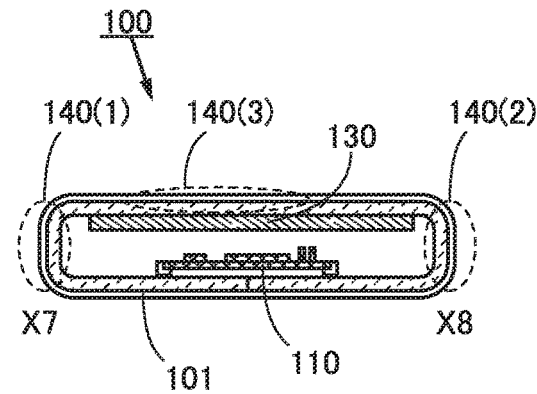

Note that the surfaces or regions may be provided with the respective position input portions 140. For example, as illustrated in FIGS. 4C, 4D, and 4E, position input portions 140(A), 140(B), 140(C), 140(D), and 140(E) may be provided in the respective regions. Alternatively, a structure may be employed in which some of the position input portions 140(A), 140(B), 140(C), 140(D), and 140(E) are not provided as illustrated in FIG. 4F. As illustrated in FIGS. 4G and 4H, the position input portion may be provided around the entire inside surface of a housing.

Note that the second region 140(2) may face the first region 140(1) with or without an inclination. Note that the fourth region 140(4) may face the third region 140(3) with or without an inclination.

The display portion 130 is supplied with the image data VIDEO and is provided to overlap with at least part of the first region 140(1), the second region 140(2), the third region 140(3), the fourth region 140(4), or the fifth region 140(5). The arithmetic unit 110 includes an arithmetic portion 111 and a memory portion 112 that stores a program to be executed by the arithmetic portion 111 (see FIG. 1).

The data processing device 100 includes the flexible position input portion 140 sensing proximity or touch of an object. The position input portion 140 can be bent such that the first region 140(1), the second region 140(2) facing the first region 140(1), and the third region 140(3) positioned between the first region 140(1) and the second region 140(2) and overlapping with the display portion 130 are formed, for example. With this structure, whether or not a palm or a finger is proximate to or touches the first region 140(1), the second region 140(2), or the like can be determined. As a result, a human interface with high operability can be provided. Furthermore, a novel data processing device with high operability can be provided.

Individual components included in the data processing device 100 are described below (see FIG. 1). Note that these units can not be clearly distinguished and one unit also serves as another unit or include part of another unit in some cases.

For example, a touch panel in which a touch sensor overlaps with a display portion is provided over the position input portion 140 as well as over the display portion 130.

<<Input/Output Device>>

The input/output unit 120 includes the position input portion 140 and the display portion 130. An input/output portion 145, a sensor portion 150, a communication portion 160, and the like may also be included. The input/output unit 120 is supplied with data and can supply data (see FIG. 1).

<<Position Input Portion>>

The position input portion 140 supplies the positional data L-INF. The user of the data processing device 100 can supply the positional data L-INF to the position input portion 140 by touching the position input portion 140 with his/her finger or palm and thereby supplying a variety of operation instructions to the data processing device 100. For example, an operation instruction including a termination instruction (an instruction to terminate the program) can be supplied (see FIG. 1).

The position input portion 140 includes, for example, the first region 140(1), the second region 140(2), and the third region 140(3) between the first region 140(1) and the second region 140(2) (see FIG. 10A1). In each of the first region 140(1), the second region 140(2), and the third region 140(3), the proximity sensors 142 are arranged in matrix (see FIG. 10A2).

The position input portion 140 includes, for example, a flexible substrate 141 and the proximity sensors 142 over the flexible substrate 141 (see FIG. 10B).

The position input portion 140 can be bent such that the second region 140(2) and the first region 140(1) face each other (see FIG. 2B).

The third region 140(3) of the position input portion 140 overlaps with the display portion 130 (see FIGS. 2B and 10A1). Note that when the third region 140(3) is positioned closer to the user than the display portion 130 is, the third region 140(3) has a light-transmitting property.

The distance between the second region and the first region of the position input portion 140 in a bent state is one that allows the user of the data processing device 100 to hold it in his/her hand (see FIG. 14A1). The distance is, for example, 17 cm or shorter, preferably 9 cm or shorter, further preferably 7 cm or shorter. When the distance is short, the thumb of the holding hand can be used to input the positional data to a wide range of the third region 140(3).

Thus, the user of the data processing device 100 can use the data processing device 100, holding it with the thumb joint portion (the vicinity of the thenar) being proximate to or touching one of the first region 140(1) and the second region 140(2), and a finger(s) other than the thumb being proximate to or touching the other.

The shape of the thumb joint portion (the vicinity of the thenar) being proximate to or touching one of the first region 140(1) and the second region 140(2) is different from the shape(s) of the finger(s) other than the thumb being proximate to or touching the other region; therefore, the first region 140(1) supplies positional data different from that supplied by the second region 140(2). Specifically, the shape of the thumb joint portion (the vicinity of the thenar) being proximate to or touching one region is larger than the shape(s) of the finger(s) other than the thumb being proximate to or touching the other region or is continuous (not divided), for example.

The proximity sensor 142 is a sensor that can sense proximity or touch of an object (e.g., a finger or a palm), and a capacitor or an imaging element can be used as the proximity sensor. Note that a substrate provided with capacitors arranged in matrix can be referred to as a capacitive touch sensor, and a substrate provided with an imaging element can be referred to as an optical touch sensor.

For the flexible substrate 141, a resin thin enough to be flexible can be used. Examples of the resin include polyester, polyolefin, polyamide, polyimide, aramid, epoxy, polycarbonate, and an acrylic resin.

As a normal substrate not having flexibility, a glass substrate, a quartz substrate, a semiconductor substrate, or the like can be used.

Specific examples of a structure that can be employed in the position input portion 140 are described in Embodiments 6 and 7.

<<Display Portion>>

The display portion 130 and at least the third region 140(3) of the position input portion 140 overlap with each other. Not only the third region 140(3) but also the first region 140(1) and/or the second region 140(2) may overlap with the display portion 130.

There is no particular limitation on the display portion 130 as long as the display portion 130 can display the supplied image data VIDEO.

An operation instruction associated with a portion of the display portion 130 with which the first region 140(1) and/or the second region 140(2) overlap(s) may be different from an operation instruction associated with a portion of the display portion 130 with which the third region 140(3) overlaps.

The user can thus see, from display on the display portion, what operation instruction is associated with the portion with which the first region 140(1) and/or the second region 140(2) overlap(s). Consequently, a variety of operation instructions can be associated. Moreover, false input of an operation instruction can be reduced.

Specific examples of a structure that can be employed in the display portion 130 are described in Embodiments 6 and 7.

<<Arithmetic Unit>>

The arithmetic unit 110 includes the arithmetic portion 111, the memory portion 112, an input/output interface 115, and a transmission path 114 (see FIG. 1).

The arithmetic unit 110 is supplied with the positional data L-INF and supplies the image data VIDEO.

For example, the arithmetic unit 110 supplies the image data VIDEO including an image used for operation of the data processing device 100, and the input/output unit 120 is supplied with the image data VIDEO including the image used for operation. The display portion 130 displays the image used for operation.

By touching a portion of the third region 140(3) overlapping with the display portion 130 in which an image used for operation is displayed with his/her finger, the user can supply the positional data L-INF for selecting the image.

<<Arithmetic Portion>>

The arithmetic portion 111 executes the program stored in the memory portion 112. For example, in response to supply of the positional data L-INF that is associated with a position in which an image used for operation is displayed, the arithmetic portion 111 executes a program associated with the image.

<<Memory Portion>>

The memory portion 112 stores the program to be executed by the arithmetic portion 111.

Note that examples of a program to be executed by the arithmetic unit 110 are described in other embodiments.

<<Input/Output Interface and Transmission Path>>

The input/output interface 115 supplies data and is supplied with data.

The transmission path 114 can supply data, and the arithmetic portion 111, the memory portion 112, and the input/output interface 115 are supplied with data. In addition, the arithmetic portion 111, the memory portion 112, and the input/output interface 115 can supply data and the transmission path 114 is supplied with data.

The data processing device 100 includes the arithmetic unit 110, the input/output unit 120, and the housing 101 (see FIG. 1 and FIG. 2B).

<<Sensor Portion>>

The sensor portion 150 senses the states of the data processing device 100 and the circumstances and supplies sensing data SENS (see FIG. 1).

Note that the sensor portion 150 senses, for example, acceleration, a direction, pressure, a global positioning system (GPS) signal, temperature, humidity, or the like and may supply data thereon.

<<Communication Unit>>

The communication portion 160 supplies data COM supplied by the arithmetic unit 110 to a device or a communication network outside the data processing device 100. Furthermore, the communication portion 160 acquires the data COM from the device or communication network outside the data processing device 100 and supplies the data COM.

The data COM can include a variety of instructions and the like. For example, the data COM can include a display instruction to make the arithmetic portion 111 generate or delete the image data VIDEO.

A communication unit for connection to the external device or external communication network, e.g., a hub, a router, or a modem, can be used for the communication portion 160. Note that the connection method is not limited to a method using a wire, and a wireless method (e.g., radio wave or infrared rays) may be used.

<<Input/Output Unit>>

As the input/output portion 145, for example, a camera, a microphone, a read-only external memory portion, an external memory portion, a scanner, a speaker, or a printer can be used (see FIG. 1).

Specifically, as a camera, a digital camera, digital video camera, or the like can be used.

As an external memory portion, a hard disk, a removable memory, or the like can be used. As a read-only external memory portion, a CD-ROM, a DVD-ROM, or the like can be used.

<<Housing>>

The housing 101 protects the arithmetic unit 110 and the like from external stress.

The housing 101 can be formed using metal, plastic, glass, ceramics, or the like.

This embodiment can be combined with any of the other embodiments in this specification as appropriate.

Embodiment 2

In this embodiment, the structure of the data processing device of one embodiment of the present invention will be described with reference to drawings.

Figure 11:
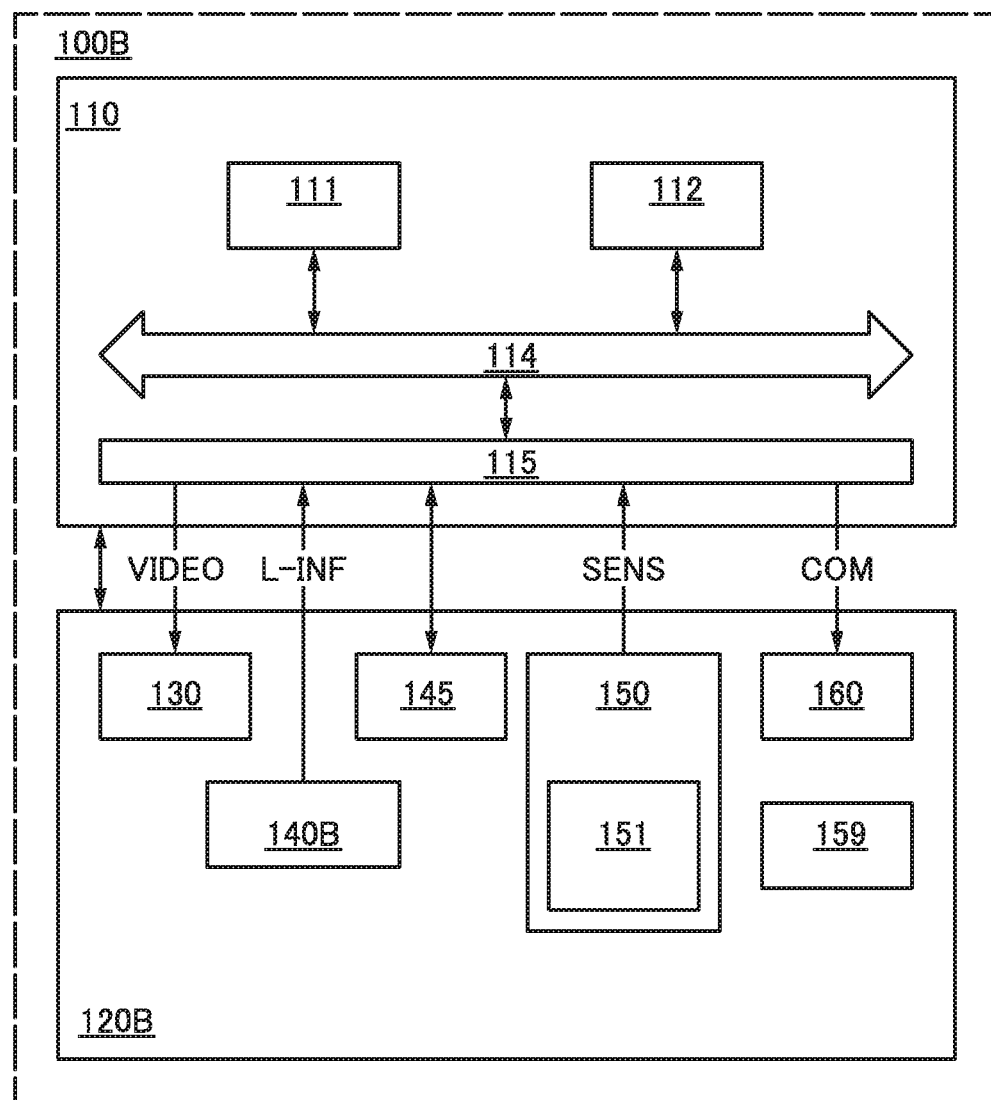
FIG. 11 is a block diagram illustrating a structure of a data processing device of an embodiment.

FIG. 11 shows a block diagram of a structure of a data processing device 100B of one embodiment of the present invention.

Figure 12A:
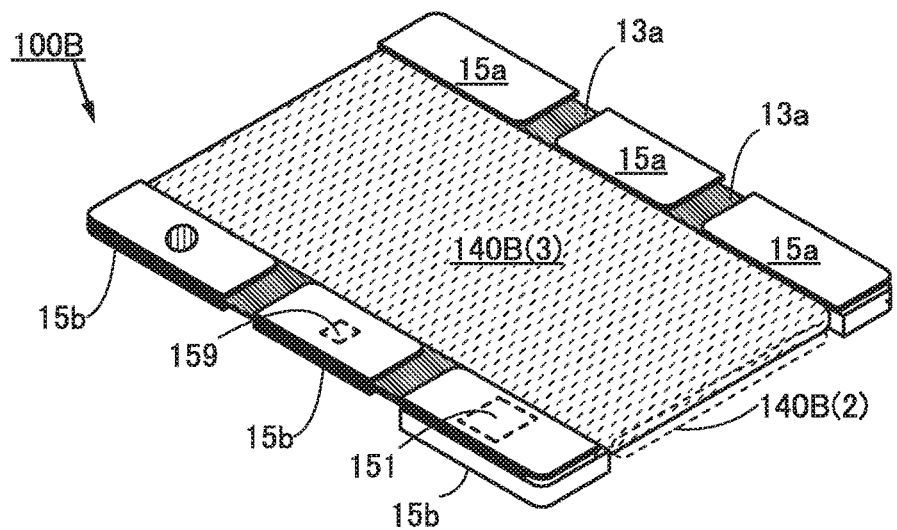
FIG. 12A illustrates a structure of a data processing device of an embodiment.
Figure 12B:
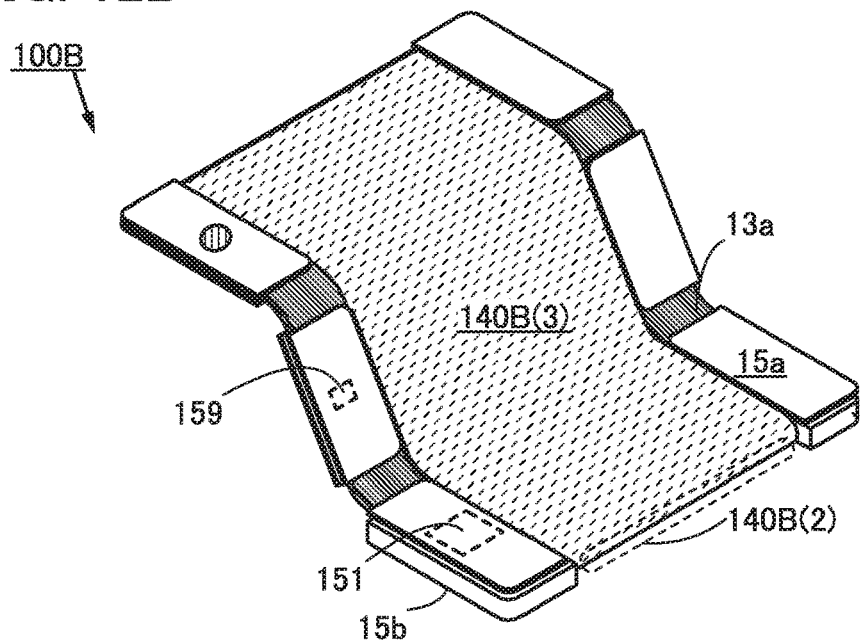
FIGS. 12B and 12C illustrate an unfolded state and an folded state of the data processing device.
Figure 12C:
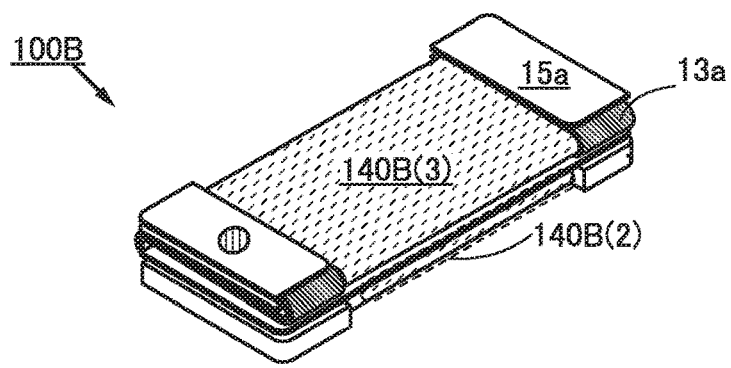

FIGS. 12A to 12C are schematic views illustrating the external appearance of the data processing device 100B. FIG. 12A is the schematic view illustrating the external appearance of the data processing device 100B in an unfolded state, FIG. 12B is the schematic view illustrating the external appearance of the data processing device 100B in a bent state, and FIG. 12C is the schematic view illustrating the external appearance of the data processing device 100B in a folded state.

Figure 13A:
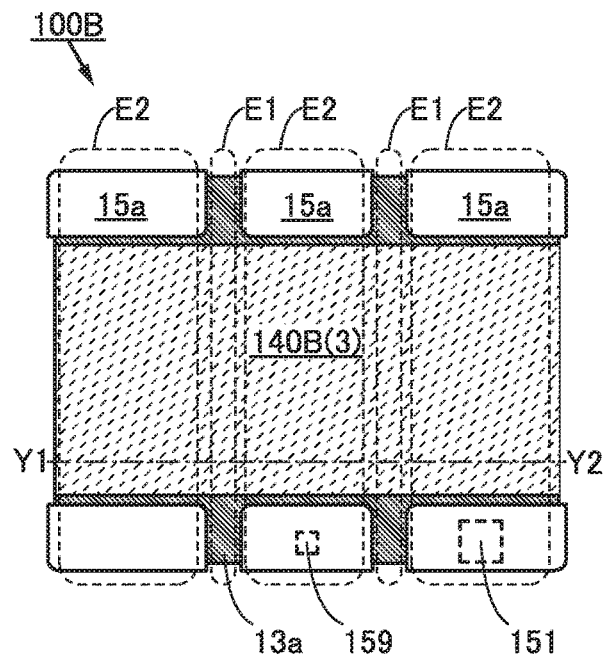
FIGS. 13A to 13E illustrate a structure of a data processing device of an embodiment.
Figure 13B:
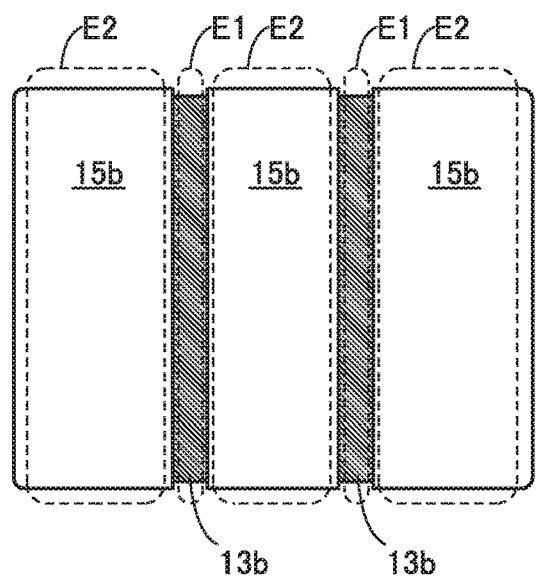
Figure 13C:
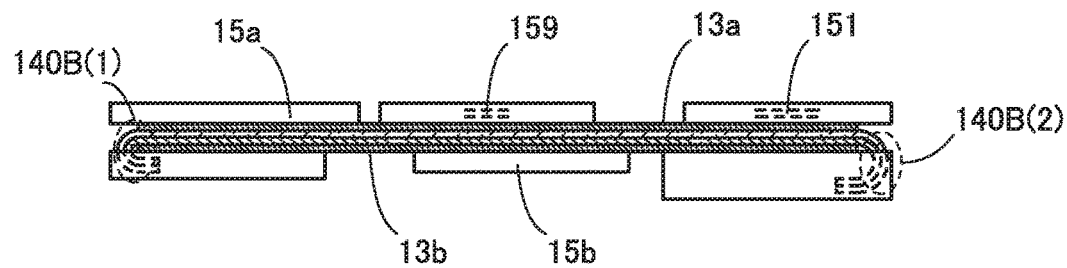
Figure 13D:
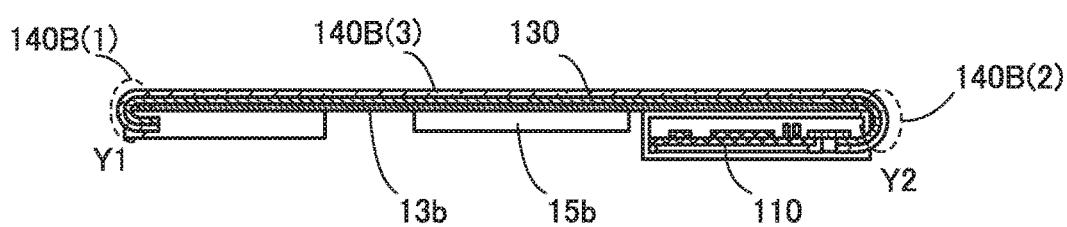
Figure 13E:
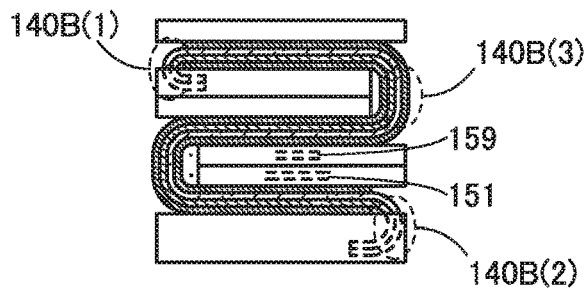

FIGS. 13A to 13E are schematic views illustrating the structures of the data processing device 100B. FIGS. 13A to 13D illustrate the structure in an unfolded state and FIG. 13E illustrates the structure in a folded state.

FIG. 13A is a top view of the data processing device 100B, FIG. 13B is a bottom view of the data processing device 100B, and FIG. 13C is a side view of the data processing device 100B. FIG. 13D is a cross-sectional view illustrating a cross section of the data processing device 100B taken along a cutting-plane line Y1-Y2 in FIG. 13A. FIG. 13E is a side view of the data processing device 100B in the folded state.

<Example of Structure of Data Processing Device>

The data processing device 100B described here includes an input/output unit 120B which supplies the positional data L-INF and the sensing data SENS including folding data and to which the image data VIDEO is supplied and the arithmetic unit 110 to which the positional data L-INF and the sensing data SENS including the folding data are supplied and which supplies the image data VIDEO (see FIG. 11).

The input/output unit 120B includes a position input portion 140B, the display portion 130, and the sensor portion 150.

The position input portion 140B is flexible to be unfolded or folded such that the first region 140B(1), the second region 140B(2) facing the first region 140B(1), and the third region 140B(3) between the first region 140B(1) and the second region 140B(2) are formed (see FIGS. 12A to 12C and FIGS. 13A to 13E).

The sensor portion 150 includes a folding sensor 151 capable of sensing a folded state of the position input portion 140B and supplying the sensing data SENS including the folding data.

The display portion 130 is supplied with the image data VIDEO and is positioned so that the display portion 130 and the third region 140B(3) overlap with each other. The arithmetic unit 110 includes the arithmetic portion 111 and the memory portion 112 that stores the program to be executed by the arithmetic portion 111 (see FIG. 13D).

The data processing device 100B described here includes the flexible position input portion 140B sensing a palm or a finger that is proximate to the first region 140B(1), the second region 140B(2) facing the first region 140B(1) in the folded state, and the third region 140B(3) positioned between the first region 140B(1) and the second region 140B(2) and overlapping with the display portion 130; and the sensor portion 150 including the folding sensor 151 capable of determining whether the flexible position input portion 140B is in a folded state or an unfolded state (see FIG. 11 and FIGS. 13A to 13E). With this structure, whether or not a palm or a finger is proximate to the first region 140B(1) or the second region 140B(2) can be determined. As a result, a human interface with high operability can be provided. Furthermore, a novel data processing device with high operability can be provided.

Individual components included in the data processing device 100B are described below. Note that these units can not be clearly distinguished and one unit also serves as another unit or include part of another unit in some cases.

For example, a touch panel in which a touch sensor overlaps with a display portion is provided over the position input portion 140B as well as over the display portion 130.

The data processing device 100B is different from the data processing device described in Embodiment 1 in that the position input portion 140B is flexible to be in an unfolded state or a folded state and that the sensor portion 150 in the input/output unit 120B includes the folding sensor 151. Different structures will be described in detail below, and the above description is referred to for the other similar structures.

<<Input/Output Device>>

The input/output unit 120B includes the position input portion 140B, the display portion 130, and the sensor portion 150 including the folding sensor 151. The input/output portion 145, a sign 159, the communication portion 160, and the like may also be included. The input/output unit 120B is supplied with data and can supply data (FIG. 11).

<<Structure Enabling Folding and Unfolding of Data Processing Device>>

The data processing device 100B has a housing in which a high flexibility portion E1 and a low flexibility portion E2 are alternately provided. In other words, in the housing of the data processing device 100B, the high flexibility portion E1 and the low flexibility portion E2 are strip-like portions (form stripes) (see FIGS. 13A and 13B).

The above-described structure allows the data processing device 100B to be folded (see FIGS. 12A to 12C). The data processing device 100B in a folded state is highly portable. It is possible to fold the data processing device 100B such that part of the third region 140B(3) of the position input portion 140B is on the outer side and use only part of the third region 140B(3) (see FIG. 12C).

The high flexibility portion E1 and the low flexibility portion E2 can have a shape both sides of which are parallel to each other, a triangular shape, a trapezoidal shape, a fan shape, or the like.

The user of the data processing device 100B folded to a size that allows the data processing device to be held in one hand can operate part of the third region 140B(3) of the position input portion with the thumb of his/her hand supporting the data processing device and input positional data. In the above manner, the data processing device that can be operated with one hand can be provided (see FIG. 15A).

Note that in a folded state such that parts of the position input portion 140 are on the inner side, the user cannot operate part of the third region 140B(3) (see FIG. 12C). Thus, it is possible to stop driving of part of the third region 140B(3) of the position input portion in a folded state. In that case, the data processing device 100B can have reduced power consumption with the position input portion in a folded state.

The position input portion 140B in an unfolded state is seamless and has a wide operation region.

The display portion 130 and the third region 140B(3) of the position input portion overlap with each other (see FIG. 13D). The position input portion 140B is interposed between a connecting member 13a and a connecting member 13b. The connecting member 13a and the connecting member 13b are interposed between a supporting member 15a and a supporting member 15b (see FIG. 13C).

The display portion 130, the position input portion 140B, the connecting member 13a, the connecting member 13b, the supporting member 15a, and the supporting member 15b are fixed by any of a variety of methods; for example, it is possible to use an adhesive, a screw, structures that can be fit with each other, or the like.

<<High Flexibility Portion>>

The high flexibility portion E1 is bendable and functions as a hinge.

The high flexibility portion E1 includes the connecting member 13a and the connecting member 13b overlapping with each other (see FIGS. 13A to 13C).

<<Low Flexibility Portion>>

The low flexibility portion E2 includes at least one of the supporting member 15a and the supporting member 15b. For example, the low flexibility portion E2 includes the supporting member 15a and the supporting member 15b overlapping with each other. Note that when only the supporting member 15b is included, the weight and thickness of the low flexibility portion E2 can be reduced.

<<Connecting Member>>

The connecting member 13a and the connecting member 13b are flexible. For example, flexible plastic, metal, alloy and/or rubber can be used as the connecting member 13a and the connecting member 13b. Specifically, silicone rubber can be used as the connecting member 13a and the connecting member 13b.

<<Supporting Member>>

Any one of the supporting member 15a and the supporting member 15b has lower flexibility than the connecting member 13a and the connecting member 13b. The supporting member 15a or the supporting member 15b can increase the mechanical strength of the position input portion 140B and protect the position input portion 140B from breakage.

For example, plastic, metal, alloy, rubber, or the like can be used as the supporting member 15a or the supporting member 15b. The connecting member 13a, the connecting member 13b, the supporting member 15a, or the supporting member 15b formed using plastic, rubber, or the like can be lightweight or break-resistant.

Specifically, engineering plastic or silicone rubber can be used. Stainless steel, aluminum, magnesium alloy, or the like can also be used for the supporting member 15a and the supporting member 15b.

<<Position Input Portion>>

The position input portion 140B can be in an unfolded state or a folded state (see FIGS. 12A to 12C).

The third region 140B(3) in an unfolded state is positioned on a top surface of the data processing device 100B (see FIG. 13C), and the third region 140B(3) in a folded state is positioned on the top surface and a side surface of the data processing device 100B (see FIG. 13E).

The usable area of the unfolded position input portion 140B is larger than that of the folded position input portion 140B.

When the position input portion 140B is folded, an operation instruction that is different from an operation instruction associated with a portion of the third region 140B(3) on the top surface of the data processing device 100B can be associated with a portion of the third region 140B(3) on the side surface of the data processing device 100B. Note that an operation instruction that is different from an operation instruction associated with the second region 140B(2) may be associated with the portion of the third region 140B(3) on the side surface of the data processing device 100B. In this manner, a complex operation instruction can be given with the use of the position input portion 140B.

The position input portion 140B supplies the positional data L-INF (see FIG. 11).

The position input portion 140B is provided between the supporting member 15a and the supporting member 15b. The position input portion 140B may be interposed between the connecting member 13a and the connecting member 13b.

The position input portion 140B includes the first region 140B(1), the second region 140B(2), and the third region 140B(3) between the first region 140B(1) and the second region 140B(2) (see FIG. 13D).

The position input portion 140B includes a flexible substrate and proximity sensors over the flexible substrate. In each of the first region 140B(1), the second region 140B(2), and the third region 140B(3), the proximity sensors are arranged in matrix.

Specific examples of a structure that can be employed in the position input portion 140B are described in Embodiments 6 and 7.

<<Sensor Portion and Sign>>

The data processing device 100B includes the sensor portion 150. The sensor portion 150 includes the folding sensor 151 (see FIG. 11).

The folding sensor 151 and the sign 159 are positioned in the data processing device 100B so that a folded state of the position input portion 140B can be sensed (FIGS. 12A and 12B and FIGS. 13A, 13C, and 13E).

In a state where the position input portion 140B is unfolded, the sign 159 is positioned away from the folding sensor 151 (see FIG. 12A and FIGS. 13A and 13C).

In a state where the position input portion 140B is bent at the connecting members 13a, the sign 159 is close to the folding sensor 151 (see FIG. 12B).

In a state where the position input portion 140B is folded at the connecting members 13a, the sign 159 faces the folding sensor 151 (see FIG. 13E).

The sensor portion 150 senses the sign 159 to determine that the position input portion 140B is in a folded state and supplies the sensing data SENS including folding data.

<<Display Portion>>

The display portion 130 and at least part of the third region 140(3) of the position input portion 140 overlap with each other. The display portion 130 can display the supplied image data VIDEO.

Particularly when flexible, the display portion 130 can be unfolded or folded with the position input portion 140 overlapping with the display portion 130. Thus, seamless display with excellent browsability can be performed by the display portion 130.

Specific examples of a structure that can be employed in the flexible display portion 130 are described in Embodiments 6 and 7.

<<Arithmetic Unit>>

The arithmetic unit 110 includes the arithmetic portion 111, the memory portion 112, an input/output interface 115, and a transmission path 114 (see FIG. 11).

This embodiment can be combined with any of the other embodiments in this specification as appropriate.

Embodiment 3

In this embodiment, a structure of a data processing device of one embodiment of the present invention will be described with reference to drawings.

Figure 17A:
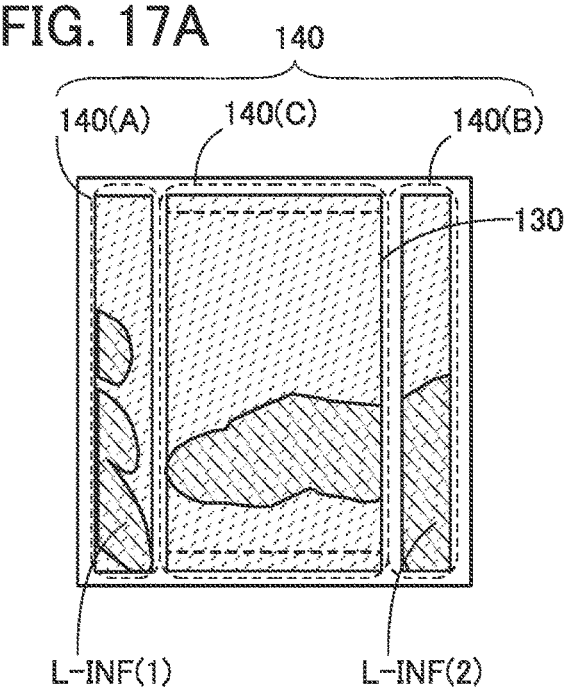
FIGS. 17A to 17C illustrate structures of a data processing device and a position input portion of an embodiment

FIGS. 14A1, 14A2, 14B1, and 14B2 illustrate a state where the data processing device 100 of one embodiment of the present invention is held by a user. FIG. 14A1 illustrates the external appearance of the data processing device 100 held by a user, and FIG. 14A2 illustrates the ranges of a palm and fingers holding the data processing device 100 that are sensed by the proximity sensor in the position input portion 140 illustrated in FIG. 14A1. Note that the case where separate position input portions 140(A), 140(B), and 140(C) are used is illustrated in FIG. 17A. The description for the case of FIG. 17A can apply to the case of FIG. 14A2.

FIG. 14B1 is a schematic view where solid lines denote results of edge sensing processing of first positional data L-INF(1) sensed by the first region 140(1) of the position input portion 140 and second positional data L-INF(2) sensed by the second region 140(2). FIG. 14B2 is a schematic view where hatching patterns denote results of labelling processing of the first positional data L-INF(1) and the second positional data L-INF(2).

FIGS. 16A and 16B are flow charts showing the programs to be executed by the arithmetic portion 111 of the data processing device of one embodiment of the present invention.

<Example of Structure of Data Processing Device>

The data processing device described here is the data processing device 100 in Embodiment 1 in which the first region 140(1) supplies the first positional data L-INF(1) and the second region 140(2) supplies the second positional data L-INF(2) (see FIG. 14A2); and the image data VIDEO to be displayed on the display portion 130 with which the third region 140(3) overlaps is generated by the arithmetic portion 111 in accordance with results of a comparison between the first positional data L-INF(1) and the second positional data L-INF(2) (see FIG. 1, FIGS. 2A to 2E, FIGS. 10A1, 10A2, 10B and FIGS. 14A1, 14A2, 14B1, and 14B2).

Individual components included in the data processing device 100 are described below. Note that these units can not be clearly distinguished and one unit also serves as another unit or include part of another unit in some cases.

For example, a touch panel in which a touch sensor overlaps with a display portion is provided over the position input portion 140 as well as over the display portion 130.

The data processing device 100 is different from the data processing device described in Embodiment 1 in that the first region of the position input portion 140 supplies the first positional data and the second region of the position input portion 140 supplies the second positional data, and that an image to be displayed on the display portion 130 is generated in accordance with results of a comparison between the first positional data and the second positional data. Different structures will be described in detail below, and the above description is referred to for the other similar structures.

<<Position Input Portion>>

The position input portion 140 is flexible to be bent such that the first region 140(1), the second region 140(2) facing the first region 140(1), and the third region 140(3) provided between the first region 140(1) and the second region 140(2) and overlapping with the display portion 130 are formed (see FIG. 2B).

FIG. 14A1 illustrates the data processing device 100 held by a user. In FIG. 14A2, the ranges of a palm and fingers holding the data processing device 100 that are sensed by the proximity sensor in the position input portion 140 are illustrated together with the position input portion 140 in the unfolded state.

The first region 140(1) and the second region 140(2) of the data processing device 100 held by a user sense part of the user's palm and part of the user's fingers. For example, the first region 140(1) supplies the first positional data L-INF(1) including data on contact positions of part of the index finger, the middle finger, and the ring finger, and the second region 140(2) supplies the second positional data L-INF(2) including data on a contact position of the thumb joint portion (the vicinity of the thenar). Note that the third region 140(3) supplies data on a contact position of the thumb.

<<Display Portion>>

The display portion 130 and the third region 140(3) overlap with each other (see FIGS. 14A1 and 14A2). The display portion 130 is supplied with the image data VIDEO and displays the image data VIDEO. For example, the image data VIDEO including an image used for operation of the data processing device 100 can be displayed. A user of the data processing device 100 can input positional data for selecting the image, by making his/her thumb touch the third region 140(3) overlapping with the image.

Figure 17B:
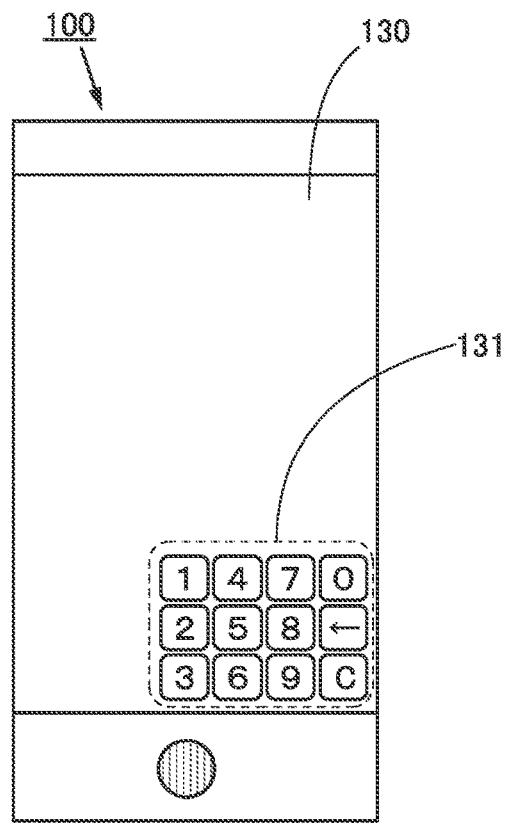
Figure 17C:
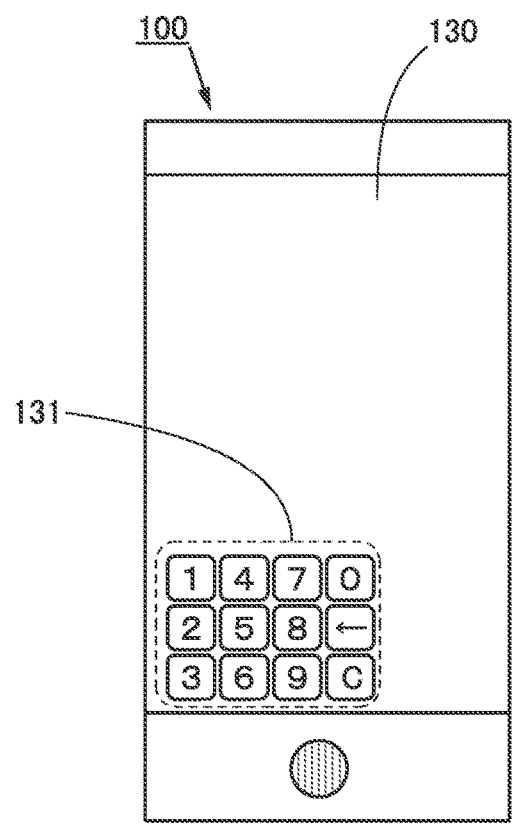

For example, a keyboard 131, icons, and the like are displayed on the right side as illustrated in FIG. 17B when operation is performed with the right hand. The keyboard 131, icons, and the like are displayed on the left side as illustrated in FIG. 17C when operation is performed with the left hand. In this way, operation with fingers is facilitated.

Figure 18A:
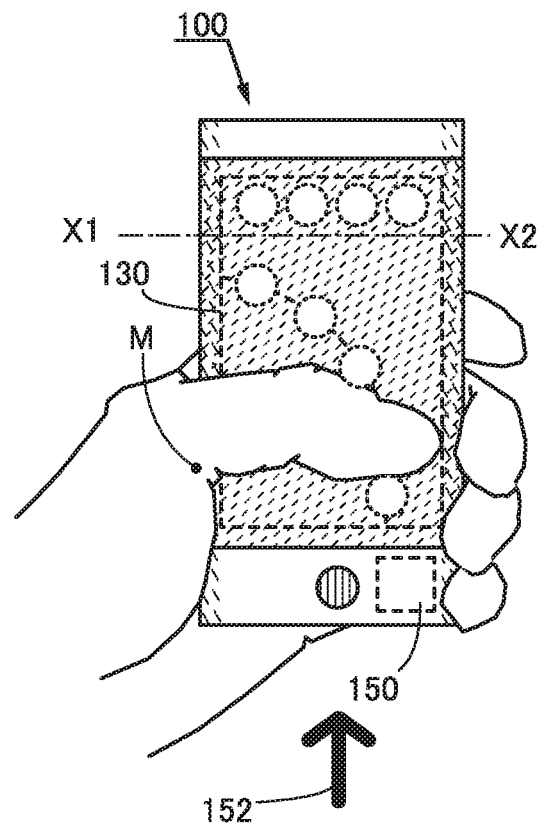
FIGS. 18A to 18D illustrate structures of a data processing device and a position input portion of an embodiment.
Figure 18B:
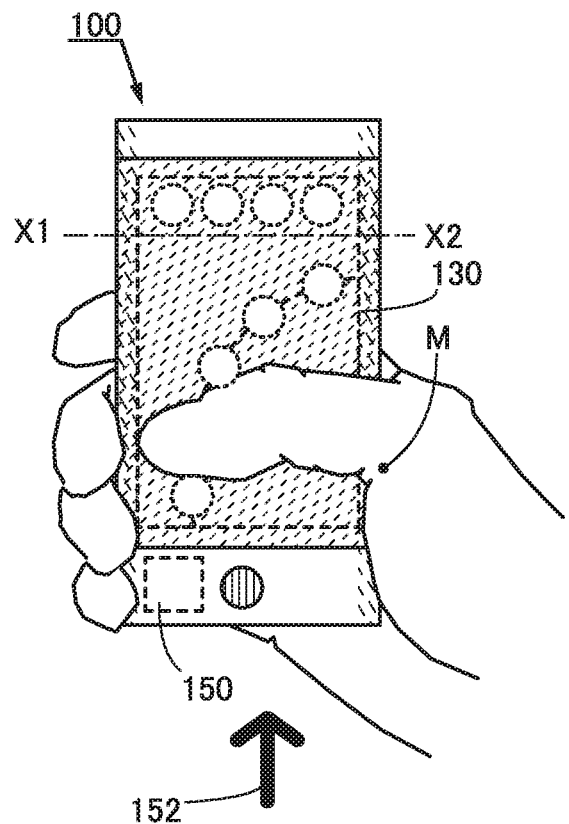
Figure 18C:
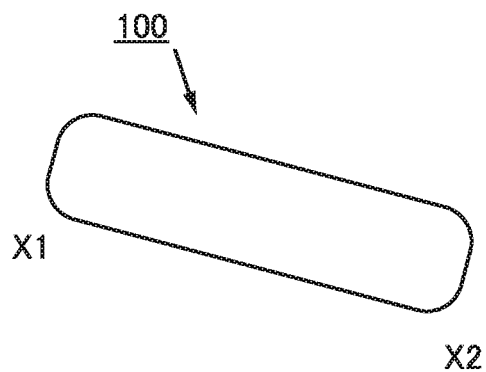
Figure 18D:
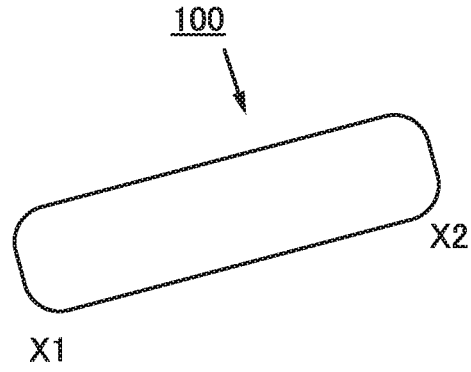

Note that a displayed screen may be changed in response to sensing of inclination of the data processing device 100 by the sensor portion 150 that senses acceleration. For example, the left end of the data processing device 100 held in the left hand as illustrated in FIG. 18A is positioned higher than the right end as illustrated in FIG. 18C when seen in the direction denoted by an arrow 152. Here, in response to sensing of this inclination, a screen for the left hand is displayed as illustrated in FIG. 17C and the keyboard 131 for the left hand is operated. In a similar manner, the right end of the data processing device 100 held in the right hand as illustrated in FIG. 18B is positioned higher than the left end as illustrated in FIG. 18D when seen in the direction denoted by the arrow 152. Here, in response to sensing of this inclination, a screen for the right hand is displayed as illustrated in FIG. 17B and the keyboard 131 for the right hand is operated. The display positions of a keyboard, icons, and the like may be controlled in this manner.

Note that the method for sensing inclination of the data processing device 100 and the method illustrated in FIGS. 14A1, 14A2, 14B1, and 14B2 may be combined to control the display positions. Alternatively, without sensing of information, the screen may be switched between an operation screen for the right hand and an operation screen for the left hand by the user of the data processing device 100.

<<Arithmetic Portion>>

The arithmetic portion 111 is supplied with the first positional data L-INF(1) and the second positional data L-INF(2) and generates the image data VIDEO to be displayed on the display portion 130 in accordance with results of a comparison between the first positional data L-INF(1) and the second positional data L-INF(2).

<Example of Structure of Data Processing Device>

The data processing device described here is different from the data processing device described in Embodiment 1 or that described above in that the memory portion stores a program in accordance with which the arithmetic portion 111 executes the following seven steps (see FIG. 16A). Different processes will be described in detail below, and the above description is referred to for the other similar processes.

<<Example of Program>>

In a first step, the length of a first line segment is determined using the first positional data L-INF(1) supplied by the first region 140(1) (see 51 in FIG. 16A).

In a second step, the length of a second line segment is determined using the second positional data L-INF(2) supplied by the second region 140(2) (see S2 in FIG. 16A).

In a third step, the length of the first line segment and the length of the second line segment are compared with the predetermined length. The program proceeds to a fourth step when only one of the lengths of the first and second line segments is longer than the predetermined length. The program proceeds to the first step in other cases (see S3 in FIG. 16A). Note that it is preferable that the predetermined length be longer than or equal to 2 cm and shorter than or equal to 15 cm, and it is particularly preferable that the predetermined length be longer than or equal to 5 cm and shorter than or equal to 10 cm.

In a fourth step, the coordinates of the midpoint of the line segment longer than the predetermined length are determined (see S4 in FIG. 16A).

In a fifth step, whether "tap", "flick", or the like is performed in a region in which the coordinates of the midpoint is not determined is checked in the first region 140(1) or the second region 140(2) (see S5 in FIG. 16A).

In a sixth step, the image data VIDEO to be displayed on the display portion 130 which overlaps with the third region 140(3) is generated based on the coordinates of the midpoint and whether the operation of "tap" or "flick" has been performed confirmed in the fifth step (see S6 in FIG. 16A).

In a seventh step, the program is terminated (see S7 in FIG. 16A).

The data processing device 100 described here includes the flexible position input portion 140 capable of sensing proximity or touch of an object and supplying the positional data L-INF, and the arithmetic portion 111. The flexible position input portion 140 can be bent such that the first region 140(1), the second region 140(2) facing the first region 140(1), and the third region 140(3) positioned between the first region 140(1) and the second region 140(2) and overlapping with the display portion 130 are formed. The arithmetic portion 111 can compare the first positional data L-INF(1) supplied by the first region 140(1) with the second positional data L-INF(2) supplied by the second region 140(2) and generate the image data VIDEO to be displayed on the display portion 130.

With this structure, whether a palm or a finger is proximate to or touches the first region 140(1) or the second region 140(2) can be determined, furthermore, whether the data processing device is operated with one hand or whether it is operated with both hands can be determined, and the image data VIDEO including an image (e.g., an image used for operation) positioned for easy operation can be generated. As a result, a human interface with high operability can be provided. Furthermore, a novel data processing device with high operability can be provided.

Note that a step in which the display portion 130 displays the predetermined image data VIDEO (also referred to as initial image) may be included before the first step. In that case, the predetermined image data VIDEO can be displayed when both the length of the first line segment and that of the second line segment are longer or shorter than the predetermined length.

Individual processes executed by the arithmetic portion with the use of the program are described below. Note that these processes cannot be clearly distinguished and one process also serves as another process or include part of another process in some cases.

<<Method for Determining Midpoint of Line Segment>>

Hereinafter, a method for determining the length of the first line segment and the length of the second line segment using the first positional data L-INF(1) and the second positional data L-INF(2), respectively, is described. A method for determining the midpoint of a line segment is also described.

Specifically, an edge sensing method for determining the length of a line segment is described.

Note that although description is given of an example in which an imaging element is used as the proximity sensor, a capacitor or the like may be used as the proximity sensor.

Assume that a value acquired by an imaging pixel with coordinates (x, y) is $f_{(x, y)}$. It is preferable that a value obtained by subtracting a background value from a value sensed by the imaging pixel be used as $f_{(x, y)}$ because noise can be removed.

<<Method for Extracting Edge (Contour)>>

Formula 1 below expresses the sum $\Delta_{(x, y)}$ of differences between a value sensed by the imaging pixel with the coordinates (x, y) and values sensed by imaging pixels with coordinates (x−1, y), coordinates (x+1, y), coordinates (x, y−1), and coordinates (x, y+1), which are adjacent to the coordinates (x, y).

$$\Delta_{(x,y)} = 4 \cdot f_{(x,y)} - \{f_{(x,y-1)} + f_{(x,y+1)} + f_{(x-1,y)} + f_{(x+1,y)}\} \quad \text{[Formula 1]}$$

FIG. 14A2 shows values sensed by the imaging pixels in the first region 140(1) and the second region 140(2). FIG. 14B1 shows calculation results of $\Delta_{(x, y)}$. When $\Delta_{(x, y)}$ is used in the above manner, an edge (contour) of a finger or a palm that is proximate to or touches the first region 140(1) and the second region 140(2) can be extracted to the first region 140(1) and the second region 140(2).

<<Method for Determining Length of Line Segment>>

The coordinates of intersection between the contour extracted to the first region 140(1) and a predetermined line segment W1 are determined, and the predetermined line segment W1 is cut at the point of intersection to be divided into a plurality of line segments. The line segment having the longest length among the plurality of line segments is the first line segment. Note that the length of the first line segment is length L1 (see FIG. 14-B1).

The coordinates of intersection between the contour extracted to the second region 140(2) and a predetermined line segment W2 are determined, and the predetermined line segment W2 is cut at the point of intersection to be divided into a plurality of line segments. The line segment having the longest length among the plurality of line segments is the second line segment. Note that the length of the second line segment is length L2.

<<Method for Determining Midpoint>>

The length of the first line segment L1 and the length of the second line segment L2 are compared with each other, the longer one is selected, and the coordinates of a midpoint M is calculated. In this embodiment, the length L2 is longer than the length L1; thus, the coordinates of the midpoint M of the second line segment are determined.

<<Image Data Generated in Accordance with Coordinates of Midpoint>>

The coordinates of the midpoint M can be associated with the position of the thumb joint portion (the vicinity of the thenar), the movable range of the thumb, or the like. In this manner, image data that facilitates operation of the data processing device 100 can be generated in accordance with the coordinates of the midpoint M.

For example, it is possible to generate the image data VIDEO that includes an image used for operation positioned in the display portion 130 with which the third region 140(3) in the movable range of the thumb overlaps. Specifically, images used for operation (denoted by circles) can be positioned on a circular arc whose center is in the vicinity of the midpoint M (see FIG. 14A1). Among images used for operation, images that are used frequently may be positioned on a circular arc and images that are used less frequently may be positioned inside or outside the circular arc. As a result, a human interface with high operability can be provided. Furthermore, a novel data processing device with high operability can be provided.

In the case where an operations such as "tap" or "flick" are detected in the region in which the midpoint M is not calculated in the first region 140(1) and the second region 140(2), it can be determined that a user operates the data processing device 100 with both hands, and a predetermined processing such as the display of image data VIDEO which is different from the above can be executed. For example, when the operations such as "tap" or "flick" are detected in the second region 140(2) at the same time as the midpoint M is calculated in the first region 140(1), it can be determined that a user operates the data processing device 100 with both hands, and a predetermined image can be displayed on the display portion 130.

In the case where the operations such as "tap" or "flick" are detected in the region in which the midpoint M is not calculated in the first region 140(1) and the second region 140(2), the predetermined processing may be performed by determining that the data processing device is not operated by both hands. For example, predetermined program execution, display or non-display of images, or turning on or off a power source may be performed.

<Example of Structure of Data Processing Device>

The data processing device described here is different from the data processing device described in Embodiment 1 or that described above in that the memory portion stores a program in accordance with which the arithmetic portion 111 executes the following six steps, in which the area of a first figure and the area of a second figure are used instead of the length of the first line segment and the length of the second line segment (see FIG. 16B). Different processes will be described in detail below, and the above description is referred to for the other similar processes.

<<Example of Program>>

In a first step, the area of the first figure is determined using the first positional data L-INF(1) supplied by the first region 140(1) (T1 in FIG. 16B).

In a second step, the area of the second figure is determined using the second positional data L-INF(2) supplied by the second region 140(2) (T2 in FIG. 16B).

In a third step, the area of the first figure and the area of the second figure are compared with the predetermined area. The program proceeds to a fourth step when only one of the areas of the first and second figures is larger than the predetermined area. The program proceeds to the first step in other cases (T3 in FIG. 16B). Note that it is preferable that the predetermined area be larger than or equal to 1 cm² and smaller than or equal to 8 cm², and it is particularly preferable that the predetermined area be larger than or equal to 3 cm² and smaller than or equal to 5 cm².

In a fourth step, the barycentric coordinates of the figure whose area is larger than the predetermined area are determined (T4 in FIG. 16B).

In a fifth step, whether "tap", "flick", or the like is performed in a region in which barycentric coordinates are not determined in the first region 140(1) and the second region 140(2) is checked (see T5 in FIG. 16A).

In a sixth step, the image data VIDEO to be displayed on the display portion 130 which overlaps with the third region is generated based on the barycentric coordinates and whether the operation of "tap" or "flick" has been performed confirmed in the fifth step (T6 in FIG. 16B).

In a seventh step, the program is terminated (see T7 in FIG. 16B).

Individual processes executed by the arithmetic portion with the use of the program are described below. Note that these processes cannot be clearly distinguished and one process also serves as another process or include part of another process in some cases.

<<Method for Determining Center of Area>>

Hereinafter, a method for determining the area of the first figure and the area of the second figure using the first positional data L-INF(1) and the second positional data L-INF(2), respectively, is described. A method for determining the center of gravity of a figure is also described.

Specifically, labeling processing for determining the area of a figure is described.

Note that although description is given of an example in which an imaging element is used as the proximity sensor, a capacitor or the like may be used as the proximity sensor.

Assume that a value acquired by an imaging pixel with coordinates (x, y) is $f_{(x, y)}$. It is preferable that a value obtained by subtracting a background value from a value sensed by the imaging pixel be used as $f_{(x, y)}$ because noise can be removed.

<<Labelling Processing>>

In the case where one imaging pixel and an adjacent imaging pixel in the first region 140(1) and the second region 140(2) each acquire a value $f_{(x, y)}$ exceeding a predetermined threshold value, the region where the region occupied by these imaging pixels is regarded as one figure. Note that when $f_{(x, y)}$ can be 256, for example, it is preferable that the predetermined threshold value be greater than or equal to 0 and less than or equal to 150, and it is particularly preferable that the predetermined threshold value be greater than or equal to 0 and less than or equal to 50.

The above processing is performed on all of the imaging pixels in the first region 140(1) and the second region 140(2), and imaging of the results is carried out to give the regions in which adjacent imaging pixels each exceeds the predetermined threshold value as shown in FIGS. 14A2 and 14B2. The figure having the largest area among figures in the first region 140(1) is the first figure. The figure having the largest area among figures in the second region 140(2) is the second figure.

<<Method for Determining Center of Gravity of Figure>>

The area of the first figure and that of the second figure are compared, the larger one is selected, and the center of gravity is calculated. Coordinates $C_{(X, Y)}$ of the center of gravity can be calculated using Formula (2) below.

$$C_{(X,Y)} = \left( \frac{1}{n}\sum_{i=0}^{n-1} x_i, \frac{1}{n}\sum_{i=0}^{n-1} y_i \right) \quad \text{[Formula 2]}$$

In Equation (2), (x, y) represents the coordinates of n imaging pixels forming one figure. The area of the second figure is larger than that of the first figure; thus, the barycentric coordinates C of the second figure are determined.

<<Image Data Generated in Accordance with Barycentric Coordinates>>

The barycentric coordinates C can be associated with the position of the thumb joint portion (the vicinity of the thenar), the movable range of the thumb, or the like. In this manner, image data that facilitates operation of the data processing device 100 can be generated in accordance with the barycentric coordinates C.

In the case where an operations such as "tap" or "flick" are detected in the region in which the center of gravity C is not calculated in the first region 140(1) and the second region 140(2), it can be determined that a user operates the data processing device 100 by both hands, and the image data VIDEO which is different from above can be displayed.

In the case where an operations such as "tap" or "flick" are detected in the region in which the center of gravity C is not calculated in the first region 140 (1) and the second region 140 (2), operations other than the display of the image data VIDEO may be performed. For example, execution of a predetermined program, display or non-display of images or turning on or off a power source may be performed.

Figure 19A:
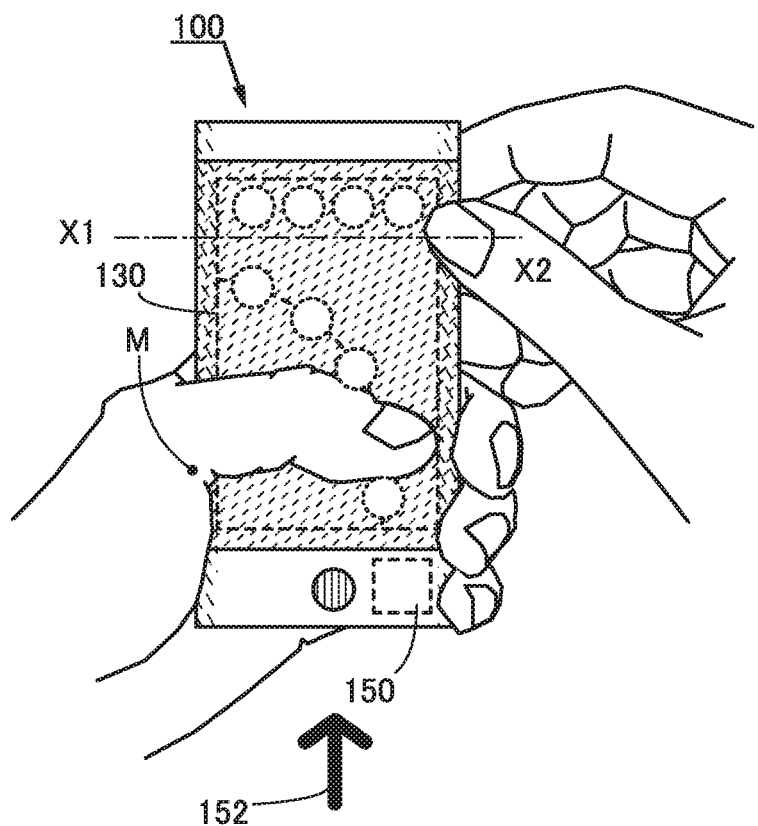
FIGS. 19A and 19B illustrate application examples of a data processing device of an embodiment.
Figure 19B:
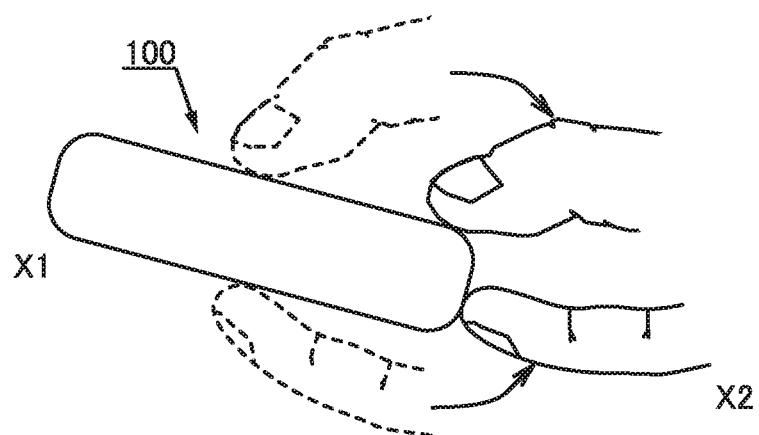

In the case where the position input portion 140 is provided on the front surface and the back surface of the data processing device 100, the position input portion 140 of the front surface and the back surface are tapped at the same time, whereby execution of the predetermined program, display or non-display of images, or turning on or off a power source may be performed, for example (see FIG. 19A). In addition, portions of the position input portion 140 of the front surface and the back surface are "flicked" at the same time, whereby execution of the predetermined program, display or non-display of images, turning on or off a power source may be performed, for example (see FIG. 19B). Therefore, unexpected malfunctions can be prevented.

This embodiment can be combined with any of the other embodiments in this specification as appropriate.

Embodiment 4

In this embodiment, a structure of a data processing device of one embodiment of the present invention will be described with reference to drawings.

Figure 15A:
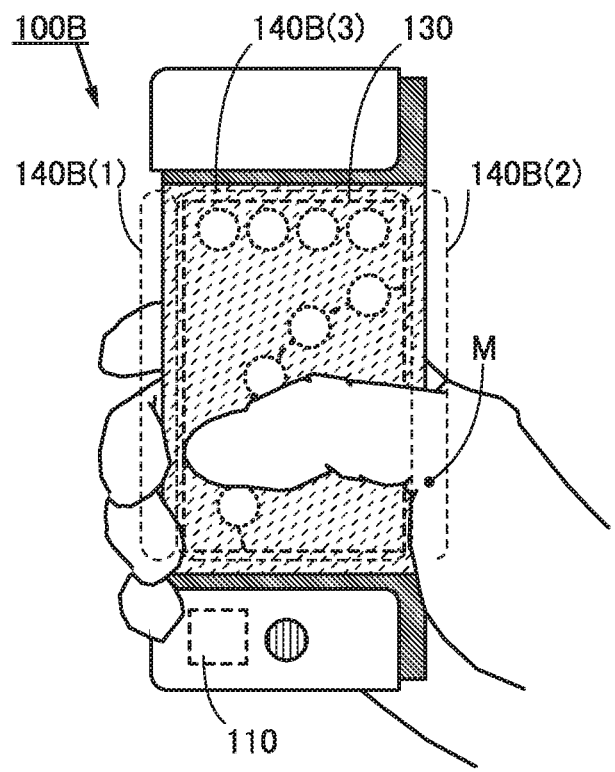
FIGS. 15A and 15B illustrate a data processing device of an embodiment held by a user.
Figure 15B:
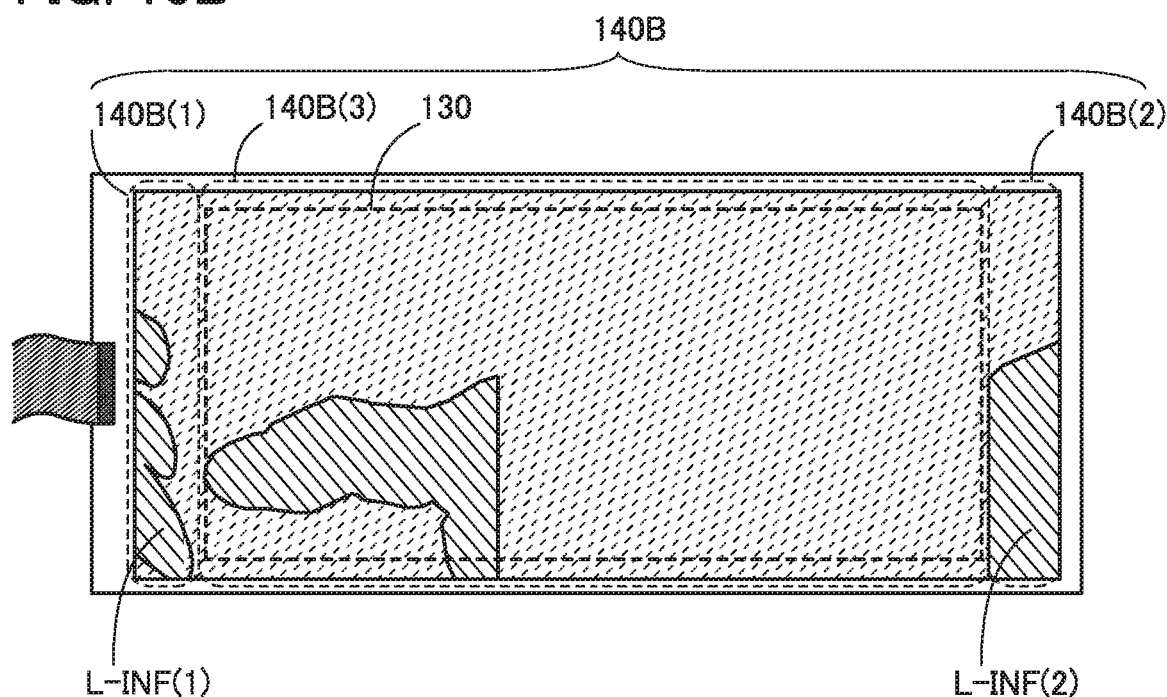

FIGS. 15A and 15B illustrate a state where the data processing device 100B of one embodiment of the present invention is held by a user. FIG. 15A illustrates the data processing device 100B in a folded state held by a user, and FIG. 15B illustrates the ranges of a palm and fingers sensed by the data processing device 100B in the state illustrated in FIG. 15A. Note that the ranges of the palm and fingers are illustrated together with the unfolded position input portion 140B.

Figure 20:
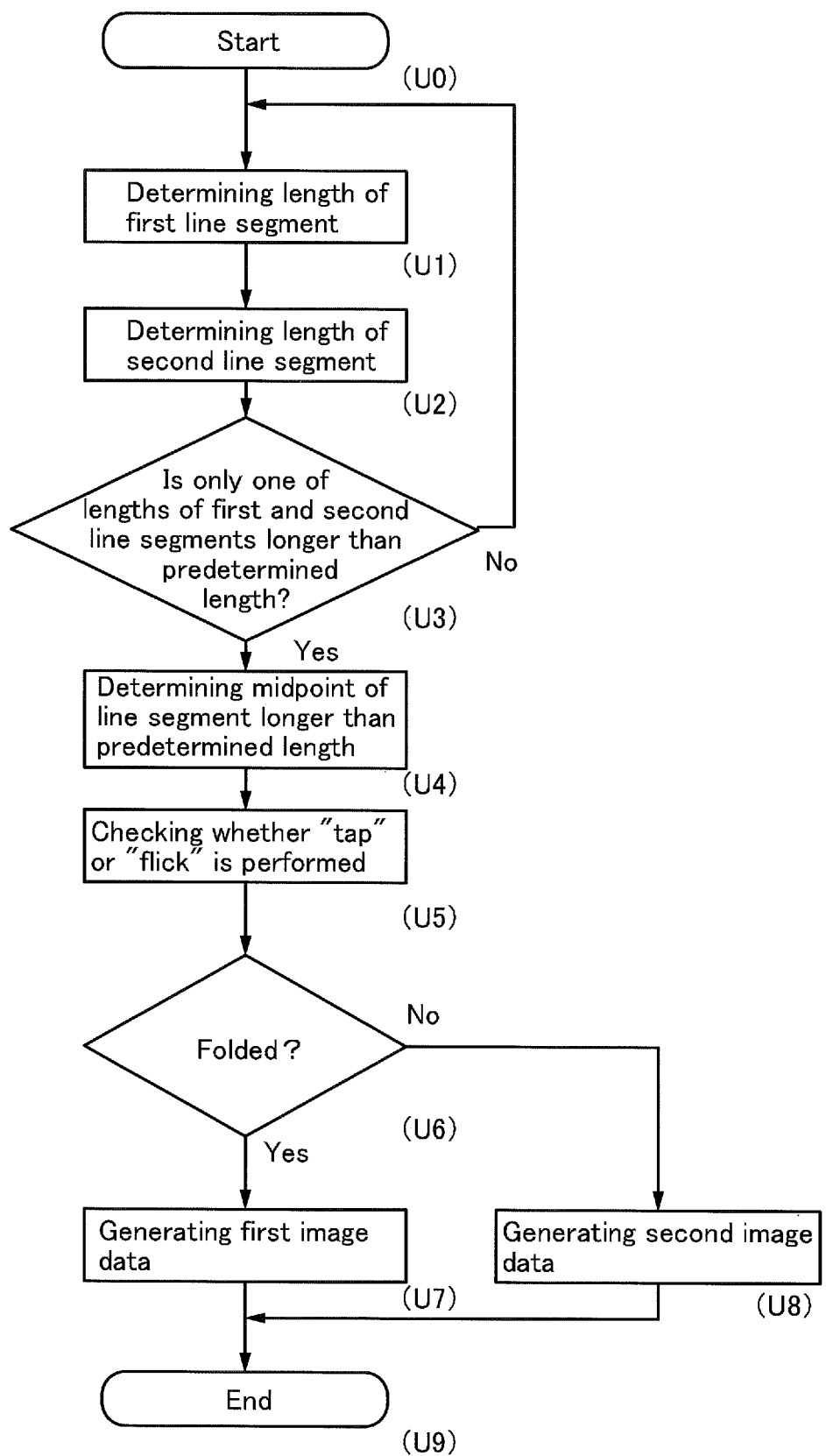
FIG. 20 is a flow chart showing a program to be executed by an arithmetic portion of a data processing device of an embodiment.

FIG. 20 is a flow chart showing the program to be executed by the arithmetic portion 111 of the data processing device 100B of one embodiment of the present invention.

Figure 21A:
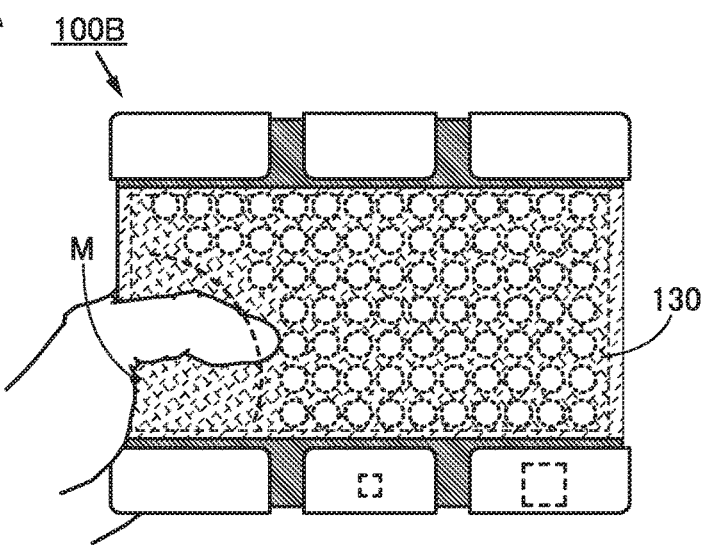
FIGS. 21A to 21C illustrate an example of an image displayed on a display portion of a data processing device of an embodiment.
Figure 21B:
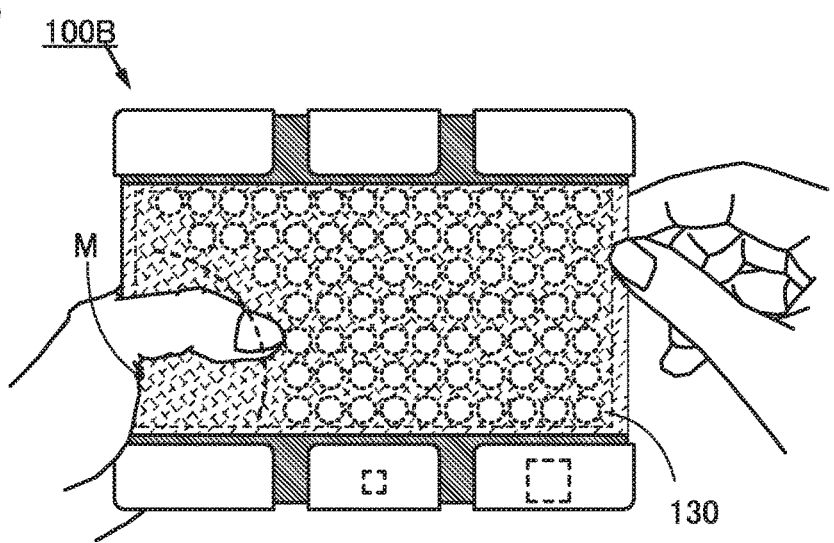
Figure 21C:
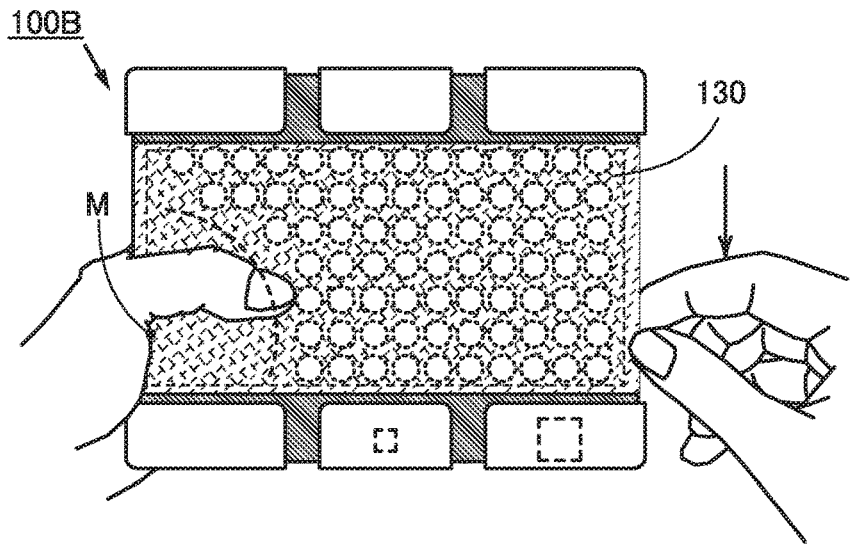

FIGS. 21A to 21C illustrate an example of an image displayed on the display portion 130 of the data processing device 100B of one embodiment of the present invention.

Figure 22:
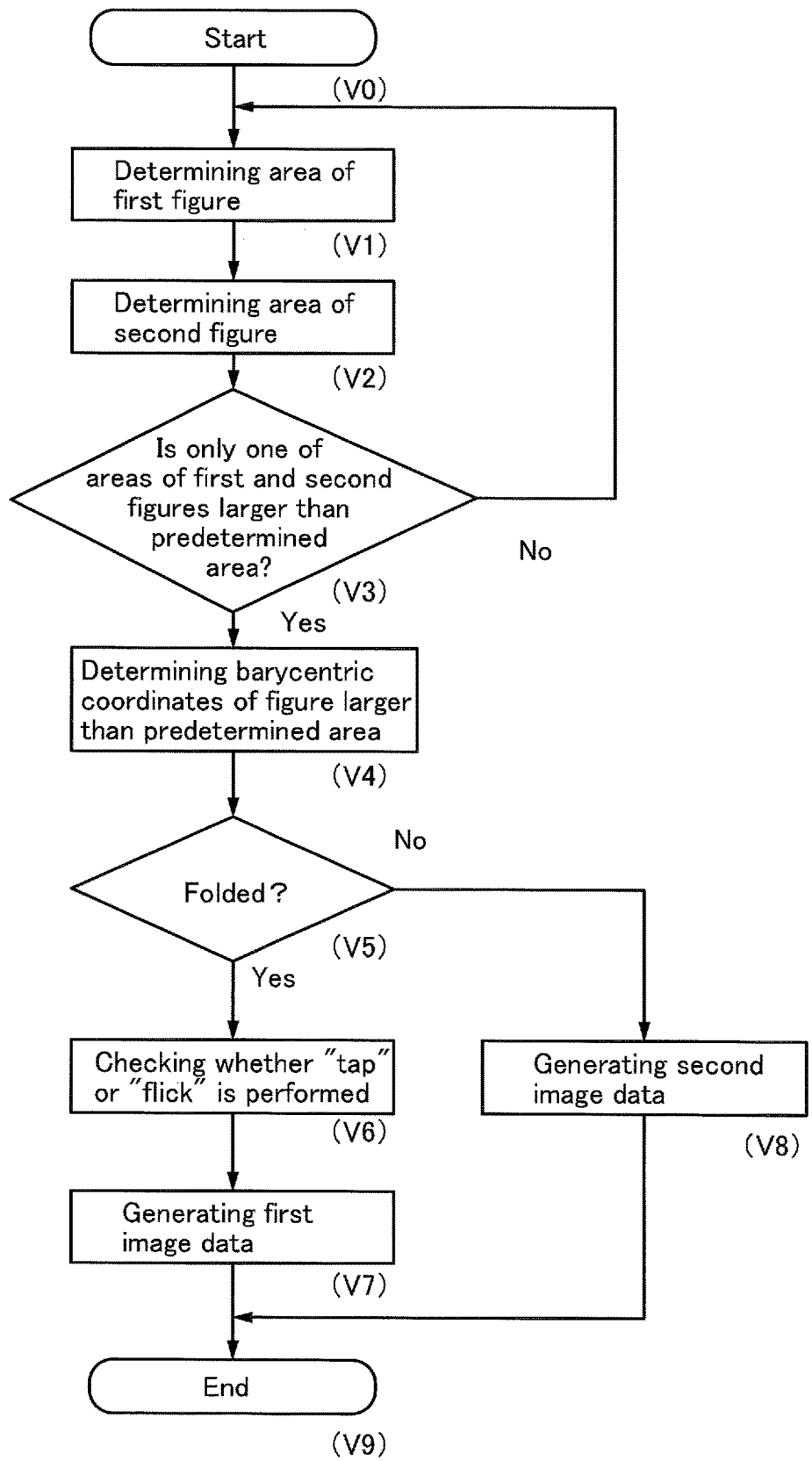
FIG. 22 is a flow chart showing a program to be executed by an arithmetic portion of a data processing device in one embodiment.

FIG. 22 is a flow chart showing the program to be executed by the arithmetic portion 111 of the data processing device 100B of one embodiment of the present invention.

<Example of Structure of Data Processing Device>

In a data processing device described here, the first region 140B(1) of the position input portion 140B supplies the first positional data L-INF(1), and the second region 140B(2) supplies the second positional data L-INF(2) (see FIG. 15B). The sensor portion 150 supplies the sensing data SENS including folding data; and the image data VIDEO to be displayed on the display portion 130 is generated by the arithmetic portion 111 in accordance with the sensing data SENS including the folding data and results of a comparison between the first positional data L-INF(1) and the second positional data L-INF(2) (see FIG. 11, FIGS. 12A to 12C, and FIGS. 15A and 15B).

Individual components included in the data processing device 100B are described below. Note that these units can not be clearly distinguished and one unit also serves as another unit or include part of another unit in some cases.

For example, a touch panel in which a touch sensor overlaps with a display portion is provided in the position input portion 140B as well as in the display portion 130.

The data processing device 100B is different from the data processing device described in Embodiment 2 in that the first region 140B(1) of the position input portion 140B supplies the first positional data and the second region 140B(2) of the position input portion 140B supplies the second positional data, and that an image to be displayed on the display portion 130 is generated in accordance with results of a comparison between the first positional data and the second positional data. Different structures will be described in detail below, and the above description is referred to for the other similar structures.

<<Position Input Portion>>

The position input portion 140B is flexible to unfolded or folded such that the first region 140B(1), the second region 140B(2) facing the first region 140B(1), and the third region 140B(3) provided between the first region 140B(1) and the second region 140B(2) and overlapping with the display portion 130B are formed (see FIGS. 12A to 12C).

The first region 140B(1) and the second region 140B(2) which the user's palm and the user's fingers are proximate to or touch sense part of the user's palm and part of the user's fingers. For example, the first region 140B(1) supplies the first positional data L-INF(1) including data on contact positions of part of the index finger, the middle finger, and the ring finger, and the second region 140B(2) supplies the second positional data L-INF(2) including data on a contact position of the thumb joint portion (the vicinity of the thenar). Note that the third region 140B(3) supplies data on a contact position of the thumb.

<<Display Portion>>

The display portion 130 and the third region 140B(3) overlap with each other (see FIGS. 15A and 15B). The display portion 130 is supplied with the image data VIDEO and can display an image used for operation of the data processing device 100B, for example. A user of the data processing device 100B can input positional data for selecting the image, by making his/her thumb touch the third region 140B(3) overlapping with the image.

<<Arithmetic Portion>>

The arithmetic portion 111 is supplied with the first positional data L-INF(1) and the second positional data L-INF(2) and generates the image data VIDEO to be displayed on the display portion 130 in accordance with results of a comparison between the first positional data L-INF(1) and the second positional data L-INF(2).

<Example of Structure of Data Processing Device>

The data processing device described here is different from the data processing device described in Embodiment 2 or that described above in that the memory portion stores a program in accordance with which the arithmetic portion 111 executes the following nine steps (see FIG. 20). Different processes will be described in detail below, and the above description is referred to for the other similar processes.

<<Example of Program>>

In a first step, the length of the first line segment is determined using the first positional data supplied by the first region (U1 in FIG. 20).

In a second step, the length of the second line segment is determined using the second positional data supplied by the second region (U2 in FIG. 20).

In a third step, the length of the first line segment and the length of the second line segment are compared with the predetermined length. The program proceeds to a fourth step when only one of the lengths of the first and second line segments is longer than the predetermined length. The program proceeds to the first step in other cases (U3 in FIG. 20). Note that it is preferable that the predetermined length be longer than or equal to 2 cm and shorter than or equal to 15 cm, and it is particularly preferable that the predetermined length be longer than or equal to 5 cm and shorter than or equal to 10 cm.

In the fourth step, the coordinates of the midpoint of the line segment longer than the predetermined length are determined (U4 in FIG. 20).

In a fifth step, whether or not the operation such as "tap" or "flick" is performed in a region in which the coordinates of the midpoint are not determined in the first region 140(1) and the second region 140(2) is checked (see U5 in FIG. 20A).

In a sixth step, the folding data of the data processing device 100B is acquired. The program proceeds to a seventh step when the folding data indicates the folded state (U6 in FIG. 20).

In the seventh step, the first image data to be displayed on the display portion 130 with which the third region overlaps is generated in accordance with the coordinates of the midpoint and whether the operation of "tap" or "flick" has been performed which is confirmed in the fifth step (U7 in FIG. 20).

In the sixth step, the folding data of the data processing device 100B is acquired. The program proceeds to an eighth step when the folding data indicates the folded state (U5 in FIG. 20).

In the eighth step, the second image data to be displayed on the display portion with which the third region overlaps is generated in accordance with the coordinates of the midpoint and whether the operation of "tap" or "flick" has been performed which is confirmed in the fifth step (U8 in FIG. 20).

In the ninth step, the program is terminated (see U9 in FIG. 20).

The data processing device 100B described here includes the flexible position input portion 140B capable of sensing proximity or touch of an object and supplying the positional data L-INF; the sensor portion 150 including the folding sensor 151 that can determine whether the flexible position input portion 140B is in a folded state or an unfolded state; and the arithmetic portion 111 (see FIG. 11). The flexible position input portion 140B can be bent such that the first region 140B(1), the second region 140B(2) facing the first region 140B(1) in the folded state, and the third region 140B(3) positioned between the first region 140B(1) and the second region 140B(2) and overlapping with the display portion 130 are formed. The arithmetic portion 111 can compare the first positional data L-INF(1) supplied by the first region 140B(1) with the second positional data L-INF(2) supplied by the second region 140B(2) and generate the image data VIDEO to be displayed on the display portion 130 in accordance with the folded state.

With this structure, whether or not a palm or a finger is proximate to or touches the first region 140B(1) or the second region 140B(2) can be determined, furthermore, whether data processing device is operated with one hand or with both hands can be determined, and the image data VIDEO including a first image positioned for easy operation in the folded state of the position input portion 140B (e.g., the first image in which an image used for operation is positioned) or a second image positioned for easy operation in the unfolded state of the position input portion 140B can be generated. As a result, a human interface with high operability can be provided. Furthermore, a novel data processing device with high operability can be provided.

In the data processing device 100B described here, a step in which the predetermined image data VIDEO is generated by the arithmetic portion 111 and displayed by the display portion 130 may be included before the first step. In that case, the predetermined image data VIDEO can be displayed when both the length of the first line segment and that of the second line segment are longer or shorter than the predetermined length in the third step.

Individual processes executed by the arithmetic portion with the use of the program are described below. Note that these processes cannot be clearly distinguished and one process also serves as another process or include part of another process in some cases.

The program to be executed by the arithmetic portion 111 of the data processing device 100B is different from the program to be executed by the arithmetic portion of the data processing device in Embodiment 3 in that in the fifth step, the process is branched in accordance with the folded state of the position input portion 140B. Different processes will be described in detail below, and the above description is referred to for the other similar processes.

<<Process for Generating First Image Data>>

When the acquired folding data indicates the folded state, the arithmetic portion 111 generates the first image data. For example, in a manner similar to that of the fifth step of the program to be executed by the arithmetic portion 111 of the data processing device 100 in Embodiment 3, first image data VIDEO to be displayed on the display portion 130 with which the third region 140B(3) in the folded state overlaps is generated in accordance with the coordinates of the midpoint and whether the operation of "tap" or "flick" has been performed which is confirmed in the fifth step.

The coordinates of the midpoint M can be associated with the position of the thumb joint portion (the vicinity of the thenar), the movable range of the thumb, or the like. In the case where an operation such as "tap" or "flick" is not detected in the region in which the midpoint M is not calculated in the first region 140(1) and the second region 140(2), it can be determined that a user operates the data processing device 100 with one hand, and image data that facilitates the operation of the data processing device 100B in the folded state can be generated in accordance with the coordinates of the midpoint M.

For example, it is possible to generate the first image data VIDEO for one-hand operation that includes an image used for operation positioned in the display portion 130 with which the third region 140B(3) in the movable range of the thumb overlaps. Specifically, images used for operation (denoted by circles) can be positioned on a circular arc whose center is in the vicinity of the midpoint M (see FIG. 21A). Among images used for operation, images that are used frequently may be positioned on a circular arc and images that are used less frequently may be positioned inside or outside the circular arc. As a result, a human interface with high operability can be provided in the data processing device 100B in the folded state. Furthermore, a novel data processing device with high operability can be provided.

In the case where an operations such as "tap" or "flick" are detected in the region in which the midpoint M is not calculated in the first region 140(1) and the second region 140(2), it can be judged that the data processing device 100 is operated with both hands, so that the first image data VIDEO for two-hand operation can be displayed. Note that the first image data VIDEO for one-hand operation and the first image data VIDEO for two-hand operation can be the same.

In the case where operations such as "tap" or "flick" are detected in the region in which midpoint M is not calculated in the first region 140(1) and the second region 140(2), operations other than the display of the imaged data VIDEO may be performed. For example, execution of the predetermined program, display or non-display of images or turning on or off a power source may be performed.

<<Process for Generating Second Image Data>>

When the acquired folding data indicates the unfolded state, the arithmetic portion 111 generates the second image data. For example, in a manner similar to that of the fifth step of the program to be executed by the arithmetic portion 111 of the data processing device 100 in Embodiment 3, first image data VIDEO to be displayed on the display portion 130 with which the third region 140B(3) in the folded state overlaps is generated in accordance with the coordinates of the midpoint and whether the operation of "tap" or "flick" has been performed which is confirmed in the fifth step. The coordinates of the midpoint M can be associated with the position of the thumb joint portion (the vicinity of the thenar), the movable range of the thumb, or the like.

For example, it is possible to generate second image data VIDEO that includes an image used for operation not positioned in an area with which the movable range of the thumb overlaps. For example, in the case where an operation such as "tap" or "flick" is not detected in the region in which midpoint M is not calculated in the first region 140(1) and the second region 140(2), it can be determined that a user operates the data processing device 100 with one hand, and images used for operation (denoted by circles) can be positioned outside a circular arc whose center is in the vicinity of the midpoint M (see FIGS. 21A to 21C). The position input portion 140B may be driven such that the position input portion 140B supplies positional data in response to sensing of an object that is proximate to or touches the circular arc or a region outside the circular arc.

The user can support the data processing device 100B by holding the circular arc or a region inside the circular arc in the position input portion 140B in the unfolded state with one hand. The image used for operation and displayed outside the circular arc can be operated with the other hand. As a result, a human interface with high operability can be provided in the data processing device 100B in the unfolded state. Furthermore, a novel data processing device with high operability can be provided.

In the case where an operations such as "tap" or "flick" are detected in the region in which midpoint M is not calculated in the first region 140(1) and the second region 140(2) (see FIGS. 21A and 21B), it can be judged that the data processing device 100 is operated with both hands, so that the second image data VIDEO for two-hand operation can be displayed. Note that the first image data VIDEO for one-hand operation and the second image data VIDEO for two-hand operation can be the same.

In the case where the operations such as "tap" or "flick" are detected in the region in which midpoint M is not calculated in the first region 140(1) and the second region 140(2), operations other than the display of the image data VIDEO may be performed. For example, execution of the predetermined program, display or non-display of images or turning on or off a power source may be performed.

<Example of Structure of Data Processing Device>

The data processing device described here is different from the data processing device described in Embodiment 2 or that described above in that the memory portion stores a program in accordance with which the arithmetic portion 111 executes the following seven steps, in which the area of the first figure and the area of the second figure are used instead of the length of the first line segment and the length of the second line segment (see FIG. 22). Different processes will be described in detail below, and the above description is referred to for the other similar processes.

<<Example of Program>>

In a first step, the area of the first figure is determined using the first positional data supplied by the first region 140B(1) (see V1 in FIG. 22).

In a second step, the area of the second figure is determined using the second positional data supplied by the second region 140B(2) (see V2 in FIG. 22).

In a third step, the area of the first figure and the area of the second figure are compared with the predetermined area. The program proceeds to a fourth step when only one of the area of the first figure and the area of the second figure is larger than the predetermined area. The program proceeds to the first step in other cases (see V3 in FIG. 22). Note that it is preferable that the predetermined area be larger than or equal to 1 cm$^2$ and smaller than or equal to 8 cm$^2$, and it is particularly preferable that the predetermined area be larger than or equal to 3 cm$^2$ and smaller than or equal to 5 cm$^2$.

In a fourth step, the barycentric coordinates of the area which is larger than the predetermined area are determined (see V4 in FIG. 22).

In a fifth step, the folding data of the data processing device 100B is acquired. The program proceeds to the sixth step when the folding data indicates the folded state (see V5 in FIG. 22).

In a sixth step, whether operations of "tap", "flick", or the like are performed in a region in which the coordinates of the midpoint are not determined in the first region 140(1) and the second region 140(2) is checked (see V6 in FIG. 22).

In a seventh step, the first image data to be displayed on the display portion 130 which overlaps with the third region is generated in accordance with the barycentric coordinates and whether the operation of "tap" or "flick" has been performed confirmed in the sixth step (see V7 in FIG. 22).

In a fifth step, the folding data of the data processing device 100B is acquired. The program proceeds to the eighth step when the folding data indicates the folded state (see V5 in FIG. 22).

In an eighth step, the second image data to be displayed on the display portion with which the third region overlaps is generated in accordance with the barycentric coordinates (see V8 in FIG. 22).

The program is terminated in a ninth step (see V9 in FIG. 22).

This embodiment can be combined with any of the other embodiments in this specification as appropriate.

Embodiment 5

In this embodiment, an operation example that can be used for the data processing device of one embodiment of the present invention will be described with reference to drawings.

In the case where the data processing device 100 is held by a user, a specific region of the position input portion 140 is touched for a long time. In the display portion 130, display on a region overlapping with the region touched or rewriting data in the region overlapping with the region touched is not performed, whereby power consumption of the data processing device 100 can be suppressed. Since a region touched is a blind spot, visibility of the display image is not decreased when the display in the region overlapping with the region touched is stopped. Here, the region in which the display is stopped may be smaller than the region touched, for example. In that case, display appears to be performed even if a hand holding the data processing device moves a little.

In the display portion 130, there may be a region in which display is not performed or a region in which a rewriting operation is not performed may be provided in a region other than touched region. For example, when the data processing device 100 is held by a user, there might be a region in which a user cannot view the display images near the region touched even though the region is not touched. A region in which display is not performed or a region in which a rewriting operation is not performed may be provided even in such a region.

As an example of such a case, the case of contacting the display portion 130 with a palm can be given. When a palm contacts the display portion 130, the entire palm does not necessary contact the display portion. Even in a region with which palm is not in contact, however, the palm prevents a user from viewing the region in some cases. Thus, display or a rewriting operation is not necessarily performed in such a region.

Here, the terms "display is not performed" and "rewriting operation is not performed" refer to not supplying a new image signal or charge to pixels in the display portion 130. Furthermore, the terms indicate that light is not supplied from the lighting device such as a backlight or a frontlight. For example, in the case of using a light-emitting element for the pixel, black display is performed in the region that is not supplied with an image signal in some cases. In addition, in the case where a display element that is not a light emitting element (e.g., a liquid crystal element) is used for the pixel, black display or white display is performed depending on a pixel configuration. Moreover, in the case of using a liquid crystal element as the pixel, an image which is displayed just before the supply of an image signal is stopped might be continuously displayed. For example, in the case of using a transistor including an oxide semiconductor in a channel portion, the same image may be continuously displayed because the off-state current of the transistor is extremely small. Furthermore, in the case of using a liquid crystal element for the pixel, black display may be performed in the region to which illumination light from the backlight is not supplied.

In the case where a user holds the data processing device 100 with a hand and the like, the region held by the hand can be determined by various methods.

For example, as described in the above embodiments, the edge detection processing is performed based on the first positional data L-INF (1) sensed by the first region 140(1) of the position input portion 140 and a second positional data L-INF (2) sensed by a second region 140(2), and when the arithmetic portion 111 determines that the area or the barycentric coordinates of the region surrounded by the edge is not changed for a certain period or longer, a portion of the display of the display portion 130 overlapping with the region is stopped. Alternatively, the display image rewriting of a portion of the display portion 130 that overlaps with the region is stopped. A similar processing may be performed using a third positional data L-INF (3) sensed by the third region 140(3). In the case where the data processing device 100 includes a fourth region 140(4) and a fifth region 140(5), for example, a similar processing may be performed based on fourth positional data L-INF (4) sensed by the fourth region 140(4) and a fifth positional data L-INF (5) sensed by the fifth region 140(5), for example.

Alternatively, all the touched regions are simply detected, and the regions which are determined to be touched for a certain period or longer may be determined to be a region which is held by a hand or the like. Alternatively, the regions may be determined by using another sensor such as an acceleration sensor, an optical sensor, and an infrared ray sensor. In such a manner, the regions that are held by a hand can be determined by using and combining various methods.

Figure 32A:
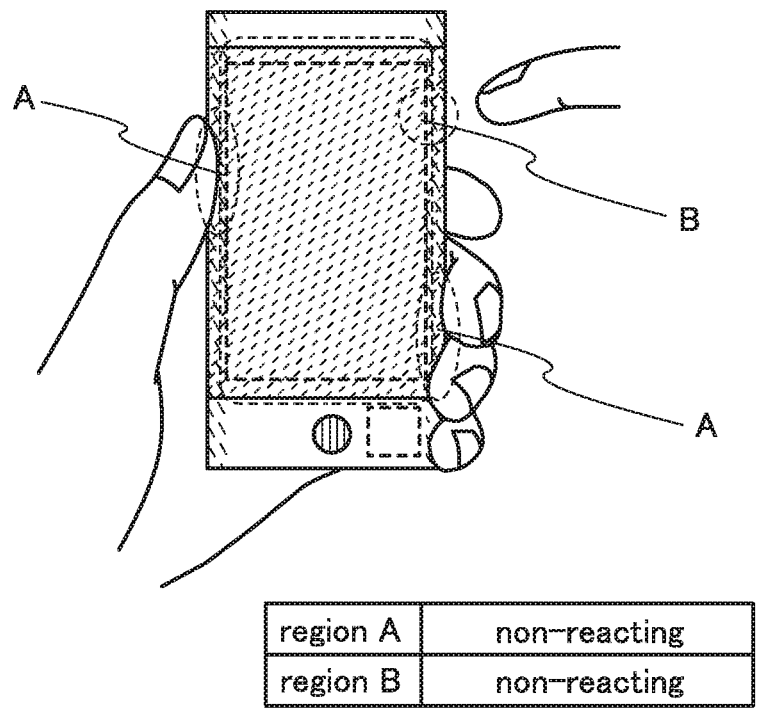
FIGS. 32A and 32B illustrate application examples of a data processing device of an embodiment.
Figure 32B:
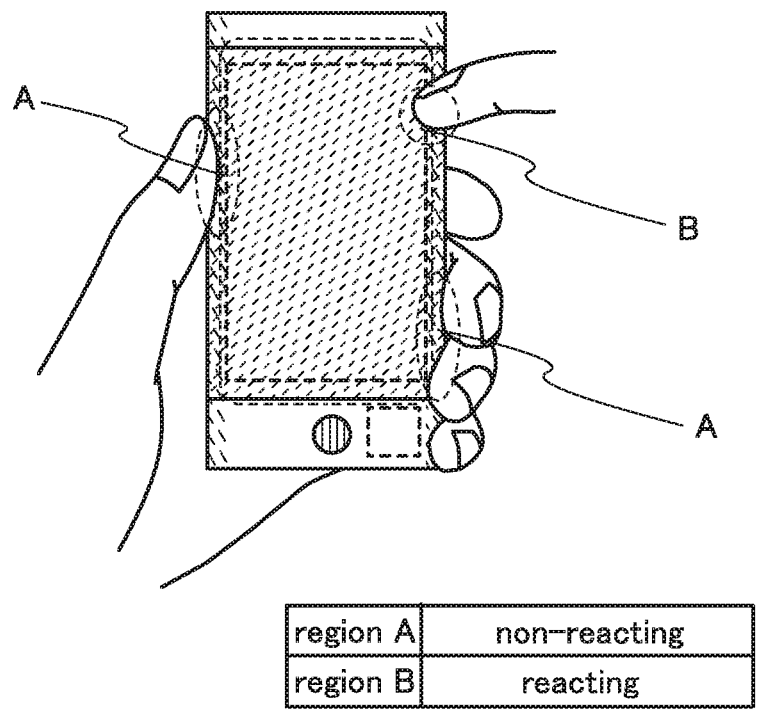

For example, as shown in FIG. 32(A), a region A which is touched for a certain period or longer by a hand or the like does not react. In addition, a region B does not react because the region B is not in contact with anything. Next, as shown in FIG. 32(B), when a finger or the like touches the region B, the region B reacts but the region A does not react. It is possible to operate the data processing device 100 by such a method.

<<Example of Program>>

An example of a program for making the arithmetic portion 111 execute the processing by which display is not performed in the region overlapping with the region touched for a certain period will be described with reference to FIG. 23. The data processing device described here has a memory portion storing a program for making the arithmetic portion 111 execute the following eight steps. Note that the data processing device described in the above embodiments can be appropriately used as the data processing device.

Figure 23:
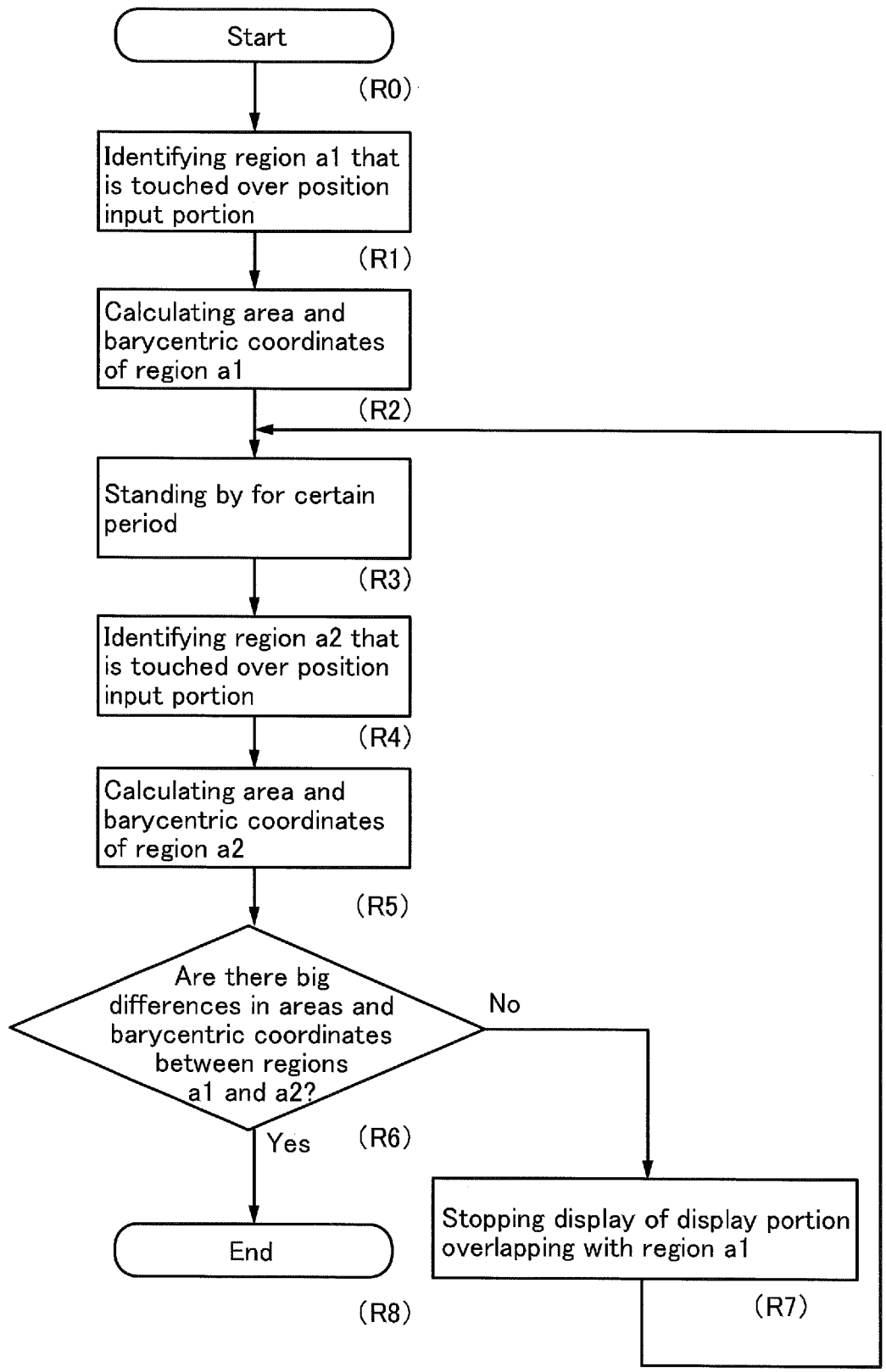
FIG. 23 is a flow chart showing a program to be executed by an arithmetic portion of a data processing device of one embodiment.

In a first step, a region a1 that is touched over the position input portion 140 is identified based on the first positional data L-INF (1) to the fourth positional data L-INF (4), and the like (see R1 in FIG. 23).

In a second step, the area and the barycentric coordinates of the region a1 are calculated (R2 in FIG. 23).

In a third step, the data processing device stands by for a certain period (R3 in FIG. 23). Note that the stand-by time is preferably 1 second or longer and shorter than 30 seconds, and more preferably 1 second or longer and shorter than 15 seconds. When the stand-by time is too long, the display quality of the data processing device 100 is likely to decrease because the display in the display portion 130 overlapping with the region a1 might not be performed even after the holding position changed or holding is stopped.

In a fourth step, a region a2 over the position input portion 140 which is touched is identified based on the first positional data L-INF (1) to the fourth positional data L-INF (4), or the like (R4 in FIG. 23).

In a fifth step, the area and the barycentric coordinates of the region a2 are calculated (R5 in FIG. 23).

In a sixth step, whether there are big differences in the areas and the barycentric coordinates between the region a1 and the region a2 is determined (R6 in FIG. 23).

In the case where there is no great difference in at least one of the areas and the barycentric coordinates between the region a1 and the region a2, a seventh step is performed (R7 in FIG. 23).

In the seventh step, display of the display portion 130 overlapping with the region a1 is stopped. Alternatively, display image rewriting of the display portion 130 overlapping with the region a1 is stopped. After that, the operation returns to the third step, and the data processing device stands by for a certain period.

In the sixth step, in the case where there is a great difference in at least one of the areas and the barycentric coordinates between the region a1 and the region a2, the execution of the program is terminated in an eighth step.

In such a manner, power consumption of the data processing device 100 can be suppressed.

Note that although the display or the display image rewriting of the display portion 130 overlapping with the region a1 is stopped in the seventh step, one embodiment of the present invention is not limited thereto. For example, in the seventh step, when the display or the display image rewriting of the display portion 130 is stopped, it is also stopped not only in the region touched for a certain period but also in the vicinity thereof. Alternatively, the display or the display image rewriting of the display portion 130 is stopped in a region which is a slightly smaller than the region touched for a certain period.

In the case of FIGS. 2C, 2D, and 2E, for example, when the region touched for a certain period exists in any part of the fourth region 140(4), the display of a region of the display portion 130 that overlaps with the entire part of the first region 140(4) is stopped, or the display image rewriting is stopped. Similarly, for example, in the case where a region touched for a certain period exists in any part of the first region 140(1), the display of a region of the display portion 130 that overlaps with the entire part of the first region 140(1) is stopped, or the display image rewriting is stopped. For example, since the fourth region 140(4) corresponds to the back surface of the data processing device 100, the fourth region 140(4) is a place which is hardly viewed by a user when the data processing device is held. Accordingly, when the display portion 130 may be not viewed from a user, the display or the display image rewriting is temporarily stopped in the entire part of such a region. However, when the third region 140(3) is not touched for a certain period, the display is restored, for example. Thus, the display can be performed only when a user is viewing, which results in reducing the power consumption.

In the case where a user views the fourth region 140(4), the third region 140(3) substantially corresponds to the back surface of the data processing device 100. Thus, for example, in such a case, in a manner similar to the case of the fourth region 140(4), the display or the display image rewriting of the display portion 130 is stopped in the entire part of the third region 140(3).

At least one of the region determining whether the region is touched for a long time; the region determining whether the region is touched for holding the data processing device by a user; the region in which the display of the display portion 130 is stopped; and the region in which the display image rewriting of the display portion 130 may be set to be a part of a region of the display portion 130. Furthermore, the position of the region, a judgment operation or a display operation performed in the region, and the like may be changed according to the situation. In addition, they may be set and changed by a user.

For example, whether a region is touched for a long time or is touched for holding the device is not necessarily determined in the region corresponding to the front surface of the data processing device 100, such as in the third region 140(3). Furthermore, in such a region, the display or the display image rewriting of the display portion 130 is not necessarily stopped. In this manner, a user can view a display image even when the user rapidly changes the holding state of the data processing device 100.

Furthermore, an acceleration sensor, a magnetic sensor, or the like may be used for determining whether a user is viewing the back surface or the front surface of the data processing device 100. By utilizing data of these sensors, circumstances can be precisely judged.

In the case where the data processing device 100 is held by a user, when the region held by a user is included in the region determining touch action, touch action cannot be accurately determined, which causes malfunction or decrease in operability. In addition, there is a risk of dropping the data processing device 100 when a user holds a region of the data processing device 100 except for the region determining touch action.

Hence, for example, a region touched by a user unintentionally is excluded from the region determining touch action in the position input portion 140. Furthermore, for example, a region of the position input portion 140 touched by a user for holding the data processing device 100 is excluded from the region determining touch action. Alternatively, for example, a region which cannot be touched even if a user intends to is excluded from the region determining touch action. For example, a region touched for a certain period is excluded from a region determining touch action in the position input portion 140. Thus, detection accuracy of touch action can be improved. Furthermore, favorable operability of the data processing device 100 can be obtained.

As an example of a region which cannot be touched even if a user intends to, a region in contact with a palm can be given. In the case where a palm touches the region, the entire palm is not necessarily in contact with the region. Even if the region is not touched by a palm, the palm prevents the other hand from touching the region.

As an example of a region which cannot be touched even if a user intends to touch, small spaces between fingers at the time of touching with a plurality of fingers can be given. The spaces cannot be touched with another hand. In this manner, a region which cannot be touched even if a user intends to touch may be excluded from the region determining touch action.

In the case where the data processing device 100 is held by a hand or the like, the region held by a hand can be judged by various methods.

For example, as described in the above embodiments, the edge detection process is performed based on the first positional data L-INF (1) sensed by the first region 140 (1) of the position input portion 140 and the second positional data L-INF (2) sensed by the second region 140 (2), and when the arithmetic portion 111 judges that the area or the barycentric coordinates of a region surrounded by the edge is not changed for a certain period or longer, the region is excluded from the region determining touch action. The similar processing may be performed using the third positional data L-INF (3) sensed by the third region 140 (3). In the case where the data processing device 100 includes the fourth region 140(4), the fifth region 140(5), and the like, the same processing may be performed based on the results of the fourth positional data L-INF (4) sensed by the fourth region 140(4) and the fifth positional data L-INF (5) sensed by the fifth region 140(5), and the like.

Alternatively, all the touched regions are simply detected, and the region which is determined to be touched for a certain period or longer may be determined to be a region which is held by a hand, or the like. Alternatively, the regions may be determined by using another sensor such as an acceleration sensor, an optical sensor, and an infrared ray sensor. In such a manner, the regions that are held with a hand can be determined by using and combining various methods.

<<Example of Program>>

An example of a program for making the arithmetic portion 111 execute the processing by which a region touched for a certain period is excluded from the region determining touch action will be described with reference to FIG. 24. The data-processing device described here has the memory portion storing a program for making the arithmetic portion 111 execute the following eight steps. Note that, the data processing device described in the above embodiments can be appropriately used as the data processing device.

Figure 24:
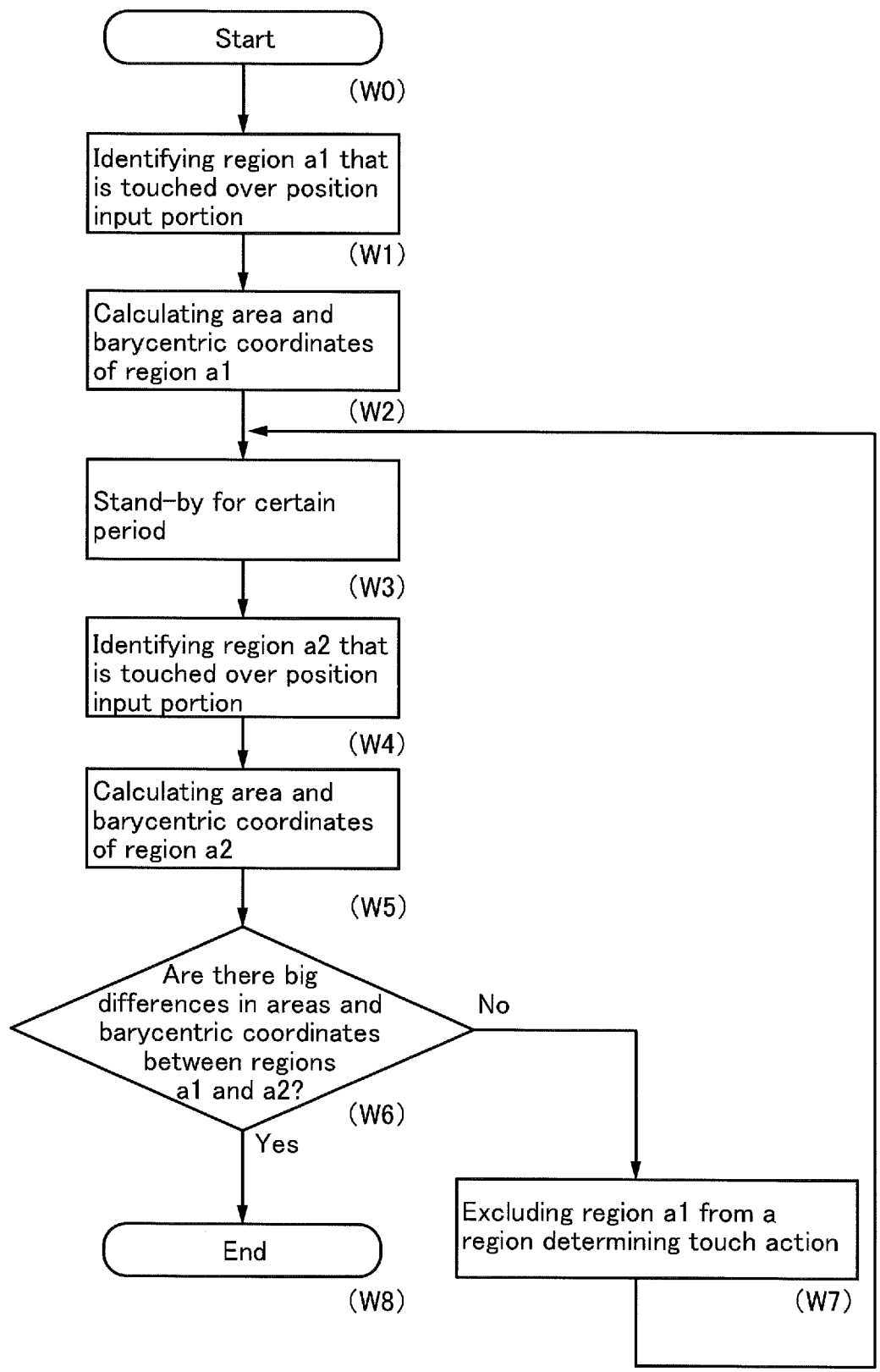
FIG. 24 is a flow chart showing a program to be executed by an arithmetic portion of a data processing device of one embodiment.

In a first step, a region a1 that is touched over the position input portion 140 is identified based on the first positional data L-INF (1) to the fourth positional data L-INF (4), and the like (see W1 in FIG. 24).

In a second step, the area and the barycentric coordinates of the region a1 are calculated (see W2 in FIG. 24).

In a third step, the data processing device stands by for a certain period (see W3 in FIG. 24). The stand by time is preferably 1 second or longer and shorter than 30 seconds, and more preferably 1 second or longer and shorter than 15 seconds. When the stand-by time is too long, display quality of the data processing device 100 is likely to decrease because the display in the display portion 130 that overlaps with a region a1 is not performed in some cases even after the holding position changed or holding is stopped.

In a fourth step, a region a2 that is touched over the position input portion 140 is identified based on the first positional data L-INF (1) to the fourth positional data L-INF (4), and the like (see W4 in FIG. 24).

In a fifth step, the area and the barycentric coordinates of a region a2 are calculated (see W5 in FIG. 24).

In a sixth step, whether there are big differences in the area and the barycentric coordinates between region a1 and the region a2 is judged (see W6 in FIG. 24).

In the case where there is no great difference in at least one of the areas and the barycentric coordinates between the region a1 and the region a2, a seventh step is performed (see W7 in FIG. 24).

In the seventh step, a region touched for a certain period is excluded from the region determining the touching action in the position input portion 140.

In the sixth step, in the case where there is a great difference in at least one of the areas and the barycentric coordinates of the region a1 and the region a2, the execution of the program is terminated in an eighth step.

In such a manner, detection accuracy of touch action of the data processing device 100 can be improved. Furthermore, favorable operability of the data processing device 100 can be obtained. Since a user does not need to be careful not to touch the region determining touch action, the data processing device 100 can be easily held. Since it becomes easy for a user to operate the data processing device 100 by one hand while holding the data processing device 100 by the other hand, the user can easily operate the data processing device 100 by both hands.

Note that, although the region touched for a certain period is excluded from the region determining the touching action in the position input portion 140 in the seventh step, one embodiment of the present invention is not limited thereto. For example, in the seventh step, when the region touched for a certain period is excluded from the region determining the touch action in the position input portion 140, the vicinity of the region touched for a certain period can also be excluded from the region determining touch action.

In the case of FIGS. 2A and 2B, for example, when a region touched for a certain period exists in any part of the second region 140(2), the entire part of the second region 140(2) is excluded from the region determining touch action. Similarly, for example, when a region touched for a certain period exists in any part of the first region 140(1), the entire part of the first region 140(1) is excluded from the region determining touch action. Since the first region 140(1) and the second region 140(2) correspond to the side surfaces of the data processing device 100, the first region 140(1) and the second region 140(2) are regions that are easily touched. Thus, such regions may be temporarily excluded from the regions determining touch action. Note that, when the first region 140(1) and the second region 140(2) are not touched for a certain period, the regions are returned to the regions determining touch action. Accordingly, touch action can be utilized only when a user intends to perform operations.

At least one of the region determining whether the region is touched for a long time, the region determining whether the region is touched by a user for holding the data processing device, and the region determining touch action may be set to be a part of the region of the display portion 130. Furthermore, the position of the region, a judgment operation or a display operation performed in the region, and the like may be changed according to the situation. In addition, they may be set and changed by a user.

For example, whether a region is touched for a long time or is touched for holding the data processing device is not necessarily judged in the region corresponding to the front surface of the data processing device 100 such as the third region 140 (3). In addition, such a region is not necessarily excluded from the region determining touch action. Thus, a user can use the data processing device 100 smoothly in some cases.

Note that instead of determining whether a region is touched for a certain period, a user may set a specific region which is excluded from the region determining touch action. For example, in a normal use, only a front surface such as the third region 140 (3) may be set to be the region determining touch action. Then, the other regions are excluded from the region determining touch action. The settings are changed according the usage of the data processing device. Thus, a user can easily operate the data processing device 100.

Furthermore, an acceleration sensor, a magnetic sensor, or the like can be used for determining whether a user is viewing the back surface or the front surface of the data processing device 100. By utilizing the data of these sensors, circumstances can be precisely determined.

Figure 25:
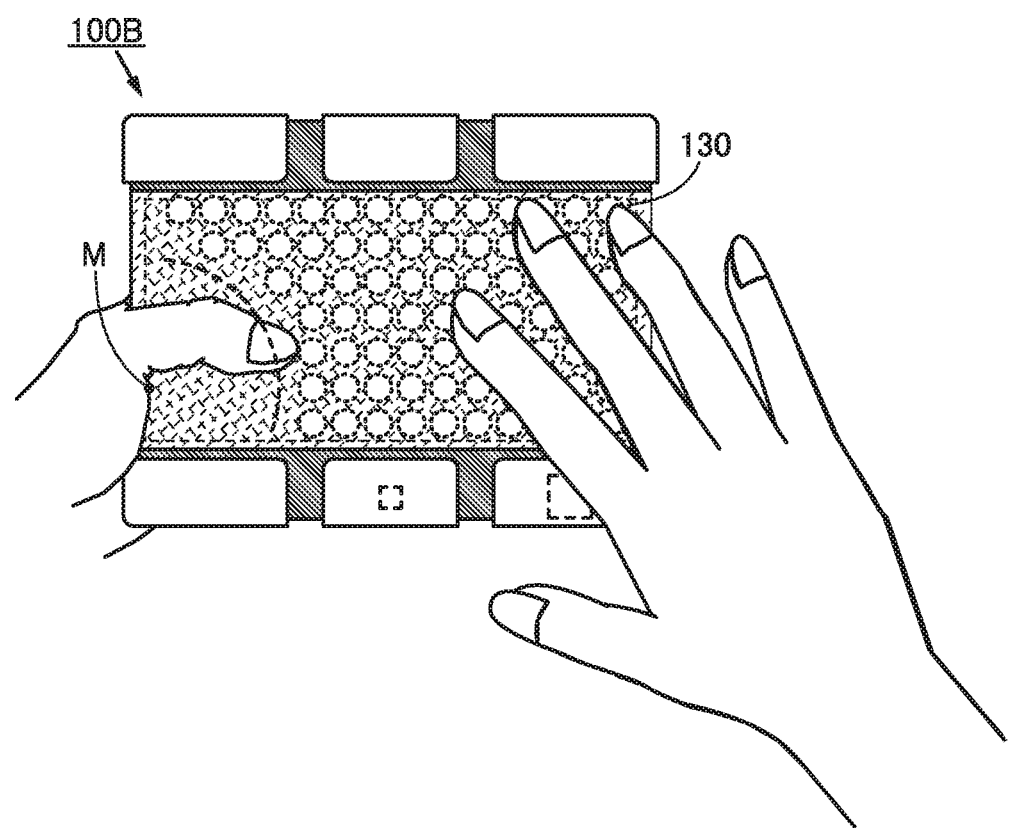
FIG. 25 illustrates an application example of a data processing device of an embodiment.

The program described above is not only used in the data processing device 100 but also used in data processing devices in other embodiments. In FIG. 25, a data processing device 100B which is unfolded is held by a left hand, and touch action is performed on the position input portion 140 overlapping with the display portion 130 by a right hand. With the use of the program described above in the data processing device 100B, the display of the region held by a left hand is stopped, which results in reducing the power consumption. Alternatively, with use of the program described above in the data processing device 100B, the region held by a left hand is excluded from the region determining touch action, whereby the detection accuracy of touch action of the data processing device 100B can be improved. Alternatively, favorable operability of the data processing device 100B can be obtained.

When the data processing device 100 is held by a user, in a region of the display portion 130 overlapping with the region touched, an operation of not performing the display of the region or an operation of not performing rewriting operation of the region, and an operation of excluding the region from the region determining touch action can be carried out in combination. For example, display is not performed and touch action is not judged in the region touched by a user for holding the data processing device 100.

This embodiment can be combined with any of the other embodiments in this specification as appropriate.

Embodiment 6

In this embodiment, the structure of a display panel that can be used for a position input portion and a display device of the data processing device of one embodiment of the present invention will be described with reference to FIGS. 26A to 26C. Note that the display panel described in this embodiment includes a touch sensor (a contact sensor device) that overlaps with a display portion; thus, the display panel can be called a touch panel (an input/output device).

Figure 26A:
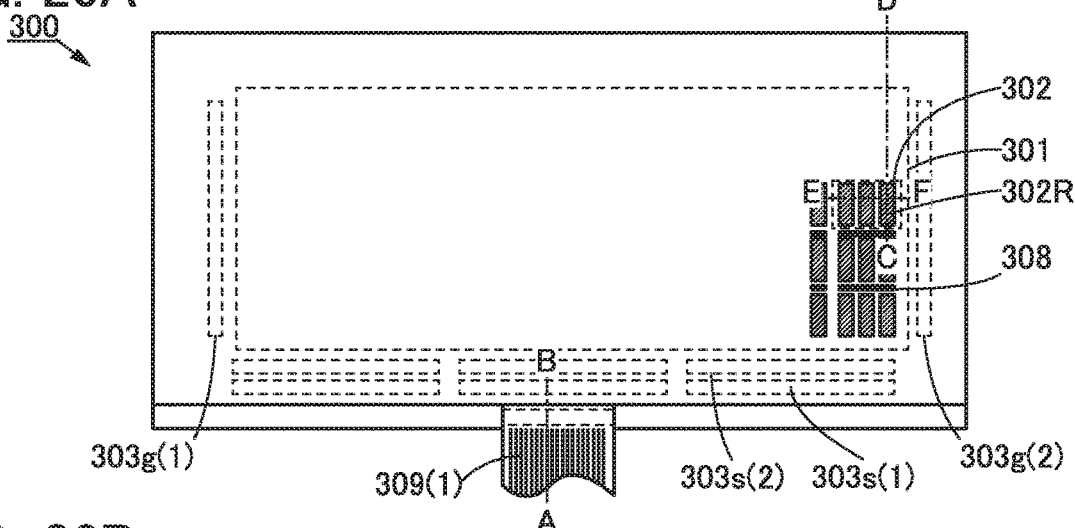
FIGS. 26A to 26C illustrate structures of a display panel that can be used for a display device of an embodiment.

FIG. 26A is a top view illustrating the structure of a display panel that can be used for a position input portion and a display device of the data processing device of one embodiment of the present invention.

Figure 26B:
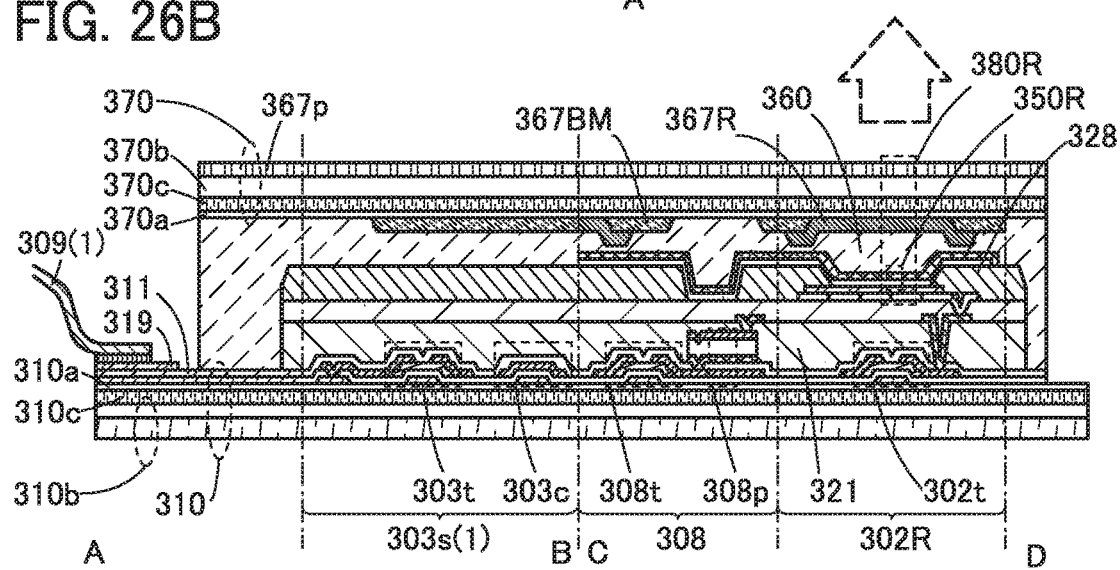

FIG. 26B is a cross-sectional view taken along line A-B and line C-D in FIG. 26A.

Figure 26C:
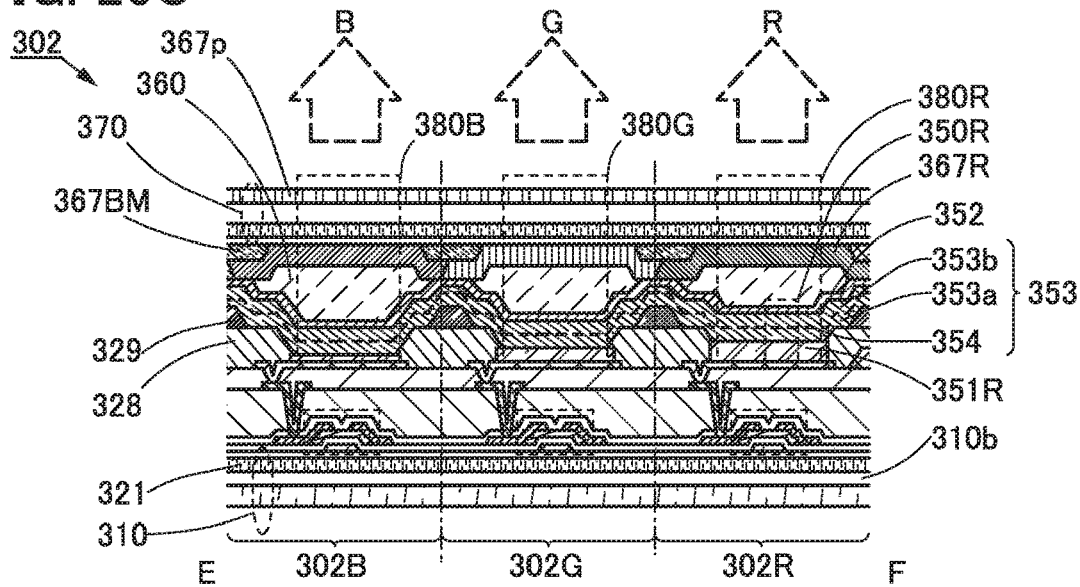

FIG. 26C is a cross-sectional view taken along line E-F in FIG. 26A.

<Top View>

An input/output device 300 described as an example in this embodiment includes a display portion 301 (see FIG. 26A).

The display portion 301 includes a plurality of pixels 302 and a plurality of imaging pixels 308. The imaging pixels 308 can sense a touch of a finger or the like on the display portion 301. Thus, a touch sensor can be formed using the imaging pixels 308.

Each of the pixels 302 includes a plurality of sub-pixels (e.g., a sub-pixel 302R). In addition, in the sub-pixels, light-emitting elements and pixel circuits that can supply electric power for driving the light-emitting elements are provided.

The pixel circuits are electrically connected to wirings through which selection signals are supplied and wirings through which image signals are supplied.

Furthermore, the input/output device 300 is provided with a scan line driver circuit 303g(1) that can supply selection signals to the pixels 302 and an image signal line driver circuit 303s(1) that can supply image signals to the pixels 302. Note that when the image signal line driver circuit 303s(1) is placed in a portion other than a bendable portion, malfunction can be inhibited.

The imaging pixels 308 include photoelectric conversion elements and imaging pixel circuits that drive the photoelectric conversion elements.

The imaging pixel circuits are electrically connected to wirings through which control signals are supplied and wirings through which power supply potentials are supplied.

Examples of the control signals include a signal for selecting an imaging pixel circuit from which a recorded imaging signal is read, a signal for initializing an imaging pixel circuit, and a signal for determining the time it takes for an imaging pixel circuit to detect light.

The input/output device 300 is provided with an imaging pixel driver circuit 303g(2) that can supply control signals to the imaging pixels 308 and an imaging signal line driver circuit 303s(2) that reads out imaging signals. Note that when the imaging signal line driver circuit 303s(2) is placed in a portion other than a bendable portion, malfunction can be inhibited.

<Cross-Sectional View>

The input/output device 300 includes a substrate 310 and a counter substrate 370 that faces the substrate 310 (see FIG. 26B).

The substrate 310 is a stacked body in which a flexible substrate 310b, a barrier film 310a that prevents diffusion of unintentional impurities to the light-emitting elements, and an adhesive layer 310c that attaches the barrier film 310a to the substrate 310b are stacked.

The counter substrate 370 is a stacked body including a flexible substrate 370b, a barrier film 370a that prevents diffusion of unintentional impurities to the light-emitting elements, and an adhesive layer 370c that attaches the barrier film 370a to the substrate 370b (see FIG. 26B).

A sealant 360 attaches the counter substrate 370 to the substrate 310. The sealant 360 also serving as an optical adhesive layer has a refractive index higher than that of air. The pixel circuits and the light-emitting elements (e.g., a first light-emitting element 350R) and the imaging pixel circuits and photoelectric conversion elements (e.g., a photoelectric conversion element 308p) are provided between the substrate 310 and the counter substrate 370.

<<Structure of Pixel>>

Each of the pixels 302 includes a sub-pixel 302R, a sub-pixel 302G, and a sub-pixel 302B (see FIG. 26C). The sub-pixel 302R includes a light-emitting module 380R, the sub-pixel 302G includes a light-emitting module 380G, and the sub-pixel 302B includes a light-emitting module 380B.

For example, the sub-pixel 302R includes the first light-emitting element 350R and the pixel circuit that can supply electric power to the first light-emitting element 350R and includes a transistor 302t (see FIG. 26B). Furthermore, the light-emitting module 380R includes the first light-emitting element 350R and an optical element (e.g., a coloring layer 367R).

The transistor 302t includes a semiconductor layer. As the semiconductor layer, any layer which is semiconductive can be used. For example, a semiconductor such as silicon and germanium, a compound semiconductor such as gallium arsenide, an oxide semiconductor such as indium oxide, zinc oxide, indium gallium zinc oxide, and an organic semiconductor can be used. Furthermore, the semiconductor layer may have crystallinity such as a single crystal, a polycrystal, a microcrystal, and the like. Furthermore, the semiconductor layer may be amorphous. The characteristics of the oxide semiconductor are less likely to change even when a change in shape such as bending is given to the oxide semiconductor. Thus, an oxide semiconductor is preferably used for a semiconductor layer of a transistor to be formed over a flexible substrate.

Although a channel-etched transistor that is a type of bottom-gate transistor is illustrated as the transistor 302t in this embodiment, a channel-protective transistor can be used. In addition, the transistor 302t may be a top-gate transistor.

The transistor 302t may have a single gate structure including one channel formation region in a semiconductor layer, a double gate structure including two channel formation regions in a semiconductor layer, or a triple gate structure including three channel formation regions in a semiconductor layer.

The transistor 302t may include a back gate electrode, with which the threshold value of the transistor 302t may be controlled.

The light-emitting element 350R includes a first lower electrode 351R, an upper electrode 352, and a layer 353 containing a light-emitting organic compound between the first lower electrode 351R and the upper electrode 352 (see FIG. 26C).

The layer 353 containing a light-emitting organic compound includes a light-emitting unit 353a, a light-emitting unit 353b, and an intermediate layer 354 between the light-emitting units 353a and 353b.

The light-emitting module 380R includes the first coloring layer 367R on the counter substrate 370. The coloring layer transmits light of a particular wavelength and is, for example, a layer that selectively transmits light of red, green, or blue color. A region that transmits light emitted from the light-emitting element as it is may be provided as well.

The light-emitting module 380R, for example, includes the sealant 360 that is in contact with the first light-emitting element 350R and the first coloring layer 367R.

The first coloring layer 367R is positioned in a region overlapping with the first light-emitting element 350R. Accordingly, part of light emitted from the first light-emitting element 350R passes through the sealant 360 that also serves as an optical adhesive layer and through the first coloring layer 367R and is emitted to the outside of the light-emitting module 380R as indicated by arrows in FIGS. 26B and 26C.

<<Structure of Input/Output Unit>>

The input/output device 300 includes a light-blocking layer 367BM on the counter substrate 370. The light-blocking layer 367BM is provided so as to surround the coloring layer (e.g., the first coloring layer 367R).

The input/output device 300 includes an anti-reflective layer 367p positioned in a region overlapping with the display portion 301. As the anti-reflective layer 367p, a circular polarizing plate can be used, for example.

The input/output device 300 includes an insulating film 321. The insulating film 321 covers the transistor 302t. Note that the insulating film 321 can be used as a layer for planarizing unevenness caused by the pixel circuits. An insulating film on which a layer that can prevent diffusion of impurities to the transistor 302t and the like is stacked can be used as the insulating film 321.

The input/output device 300 includes the light-emitting elements (e.g., the first light-emitting element 350R) over the insulating film 321.

The input/output unit 300 includes, over the insulating film 321, a partition wall 328 that overlaps with an end portion of the first lower electrode 351R (see FIG. 26C). In addition, a spacer 329 that controls the distance between the substrate 310 and the counter substrate 370 is provided on the partition wall 328.

<<Structure of Image Signal Line Driver Circuit>>

The image signal line driver circuit 303s (1) includes a transistor 303t and a capacitor 303c. Note that the image signal line driver circuit 303s(1) can be formed in the same process and over the same substrate as those of the pixel circuits. The transistor 303t has a structure similar to that of the transistor 302t. Note that the transistor 303t may have a structure different from that of the transistor 302t.

<<Structure of Imaging Pixel>>

The imaging pixels 308 each include a photoelectric conversion element 308p and an imaging pixel circuit for sensing light received by the photoelectric conversion element 308p. The imaging pixel circuit includes a transistor 308t. The transistor 308t has a structure similar to that of the transistor 302t. Note that the transistor 308t may have a structure different from that of the transistor 302t.

For example, a PIN photodiode can be used as the photoelectric conversion element 308p.

<<Other Structures>>

The input/output device 300 includes a wiring 311 through which a signal can be supplied. The wiring 311 is provided with a terminal 319. Note that an FPC 309(1) through which a signal such as an image signal or a synchronization signal can be supplied is electrically connected to the terminal 319. The FPC 309(1) is preferably placed in a portion other than a bendable portion of the input/output unit 300. Moreover, the FPC 309(1) is preferably placed at almost the center of one side of a region surrounding the display portion 301, especially a side which is folded (a longer side in FIG. 26A). Accordingly, the distance between an external circuit for driving the input/output unit 300 and the input/output unit 300 can be made short, resulting in easy connection. Furthermore, the center of gravity of the external circuit can be made almost the same as that of the input/output unit 300. As a result, the data processing device can be treated easily and mistakes such as dropping can be prevented.

Note that a printed wiring board (PWB) may be attached to the FPC 309(1).

Note that although the case where the light-emitting element is used as a display element is illustrated, one embodiment of the present invention is not limited thereto.

For example, in this specification and the like, a display element, a display device which is a device including a display element, a light-emitting element, and a light-emitting device which is a device including a light-emitting element can employ a variety of modes or can include a variety of elements. Examples of a display element, a display device, a light-emitting element, or a light-emitting device include a display medium whose contrast, luminance, reflectance, transmittance, or the like is changed by electromagnetic action, such as an electroluminescence (EL) element (e.g., an EL element including organic and inorganic materials, an organic EL element, or an inorganic EL element), an LED (e.g., a white LED, a red LED, a green LED, or a blue LED), a transistor (a transistor that emits light depending on current), an electron emitter, a liquid crystal element, electronic ink, an electrophoretic element, a grating light valve (GLV), a plasma display panel (PDP), a display element using micro electro mechanical system (MEMS), a digital micromirror device (DMD), a digital micro shutter (DMS), MIRASOL (registered trademark), an interferometric modulator display (IMOD) element, a MEMS shutter display element, an optical-interference-type MEMS display element, an electrowetting element, a piezoelectric ceramic display, or a carbon nanotube. Note that examples of display devices having EL elements include an EL display. Examples of display devices including electron emitters are a field emission display (FED) and an SED-type flat panel display (SED: surface-conduction electron-emitter display). Examples of display devices including liquid crystal elements include a liquid crystal display (e.g., a transmissive liquid crystal display, a transflective liquid crystal display, a reflective liquid crystal display, a direct-view liquid crystal display, or a projection liquid crystal display). An example of a display device including electronic ink or electrophoretic elements is electronic paper. In the case of a transflective liquid crystal display or a reflective liquid crystal display, some of or all of pixel electrodes function as reflective electrodes. For example, some or all of pixel electrodes are formed to contain aluminum, silver, or the like. In such a case, a memory circuit such as an SRAM can be provided under the reflective electrodes. Accordingly, power consumption can be further reduced.

In this specification and the like, for example, transistors with a variety of structures can be used as a transistor, without limitation to a certain type. For example, a transistor including a single-crystal silicon, or a transistor including a non-single-crystal semiconductor film typified by amorphous silicon, polycrystalline silicon, microcrystalline (also referred to as microcrystal, nanocrystal, or semi-amorphous) silicon, or the like can be used as a transistor. A thin film transistor (TFT) obtained by thinning such a semiconductor can be used. In the case of using the TFT, there are various advantages. For example, since the TFT can be formed at temperature lower than that of the case of using single-crystal silicon, manufacturing cost can be reduced or a manufacturing apparatus can be made larger. Since the manufacturing apparatus is made larger, the TFT can be formed using a large substrate. Therefore, many display devices can be formed at the same time at low cost. In addition, a substrate having low heat resistance can be used because of low manufacturing temperature. Therefore, the transistor can be formed using a light-transmitting substrate. Alternatively, transmission of light in a display element can be controlled by using the transistor formed using the light-transmitting substrate. Alternatively, part of a film included in the transistor can transmit light because the thickness of the transistor is small. Therefore, the aperture ratio can be improved.

Note that when a catalyst (e.g., nickel) is used in the case of forming polycrystalline silicon, crystallinity can be further improved and a transistor having excellent electric characteristics can be formed. Accordingly, a gate driver circuit (e.g., a scan line driver circuit), a source driver circuit (e.g., a signal line driver circuit), and a signal processing circuit (e.g., a signal generation circuit, a gamma correction circuit, or a DA converter circuit) can be formed using the same substrate as a pixel portion.

Note that when a catalyst (e.g., nickel) is used in the case of forming microcrystalline silicon, crystallinity can be further improved and a transistor having excellent electric characteristics can be formed. In this case, crystallinity can be improved by just performing heat treatment without performing laser irradiation. Accordingly, a gate driver circuit (e.g., a scan line driver circuit) and part of a source driver circuit (e.g., an analog switch) can be formed over the same substrate. Note that when laser irradiation for crystallization is not performed, unevenness in crystallinity of silicon can be suppressed. Therefore, high-quality images can be displayed. Note that it is possible to manufacture polycrystalline silicon or microcrystalline silicon without a catalyst (e.g., nickel).

Note that although preferably, crystallinity of silicon is improved to polycrystal, microcrystal, or the like in the whole panel, the present invention is not limited to this. Crystallinity of silicon may be improved only in part of the panel. Selective increase in crystallinity can be achieved by selective laser irradiation or the like. For example, only a peripheral driver circuit region excluding pixels may be irradiated with laser light. Alternatively, only a region of a gate driver circuit, a source driver circuit, or the like may be irradiated with laser light. Alternatively, only part of a source driver circuit (e.g., an analog switch) may be irradiated with laser light. Accordingly, crystallinity of silicon can be improved only in a region in which a circuit needs to be operated at high speed. Since a pixel region is not particularly needed to be operated at high speed, even if crystallinity is not improved, the pixel circuit can be operated without problems. Thus, a region whose crystallinity is improved is small, so that manufacturing steps can be decreased. Thus, throughput can be increased and manufacturing cost can be reduced. Alternatively, since the number of necessary manufacturing apparatus is small, manufacturing cost can be reduced.

Note that for example, a transistor including a compound semiconductor (e.g., SiGe, GaAs, and the like), an oxide semiconductor (e.g., ZnO, InGaZnO, IZO (indium zinc oxide) (registered trademark), ITO (indium tin oxide), SnO, TiO, and AlZnSnO (AZTO)), ITZO (In—Sn—Zn—O) (registered trademark), or the like; a thin film transistor obtained by thinning such a compound semiconductor or an oxide semiconductor; or the like can be used as a transistor. A thin film transistor obtained by thinning such a compound semiconductor or an oxide semiconductor, or the like can be used. Since manufacturing temperature can be lowered, such a transistor can be formed at room temperature, for example. Accordingly, the transistor can be formed directly on a substrate having low heat resistance, such as a plastic substrate or a film substrate. Note that such a compound semiconductor or an oxide semiconductor can be used not only for a channel portion of the transistor but also for other applications. For example, such a compound semiconductor or an oxide semiconductor can be used for a wiring, a resistor, a pixel electrode, a light-transmitting electrode, or the like. Since such an element can be formed at the same time as the transistor, cost can be reduced.

Note that for example, a transistor or the like formed by an inkjet method or a printing method can be used as a transistor. Accordingly, a transistor can be formed at room temperature, can be formed at a low vacuum, or can be formed using a large substrate. Therefore, the transistor can be formed without use of a mask (reticle), so that the layout of the transistor can be easily changed. Alternatively, since the transistor can be formed without use of a resist, material cost is reduced and the number of steps can be reduced. Further, since a film can be formed where needed, a material is not wasted as compared to a manufacturing method by which etching is performed after the film is formed over the entire surface; thus, costs can be reduced.

Note that for example, a transistor or the like including an organic semiconductor or a carbon nanotube can be used as a transistor. Accordingly, such a transistor can be formed using a substrate which can be bent. A device including a transistor which includes an organic semiconductor or a carbon nanotube can resist a shock.

Note that transistors with a variety of different structures can be used as a transistor. For example, a MOS transistor, a junction transistor, a bipolar transistor, or the like can be used as a transistor. By using a MOS transistor as a transistor, the size of the transistor can be reduced. Thus, a large number of transistors can be mounted. With use of a bipolar transistor as the transistor, large current can flow. Thus, a circuit can be operated at high speed. Note that a MOS transistor and a bipolar transistor may be formed over one substrate. Thus, reduction in power consumption, reduction in size, high speed operation, and the like can be realized.

Note that in this specification and the like, for example, a transistor with a multi-gate structure having two or more gate electrodes can be used as a transistor. With the multi-gate structure, a structure where a plurality of transistors are connected in series is provided because channel regions are connected in series. Thus, with the multi-gate structure, the amount of off-state current can be reduced and the withstand voltage of the transistor can be increased (the reliability can be improved). Alternatively, with the multi-gate structure, drain-source current does not change much even if drain-source voltage changes when the transistor operates in a saturation region, so that a flat slope of voltage-current characteristics can be obtained. By utilizing the flat slope of the voltage-current characteristics, an ideal current source circuit or an active load having an extremely large resistance can be realized. Accordingly, a differential circuit, a current mirror circuit, or the like having excellent properties can be realized.

Note that a transistor with a structure where gate electrodes are formed above and below a channel can be used, for example. With the structure where the gate electrodes are formed above and below the channel, a circuit structure where a plurality of transistors are connected in parallel is provided. Thus, a channel region is increased, so that the amount of current can be increased. Alternatively, by using the structure where gate electrodes are formed above and below the channel, a depletion layer can be easily formed, so that subthreshold swing can be improved.

Note that as a transistor, for example, it is possible to use a transistor with a structure where a gate electrode is formed above a channel region, a structure where a gate electrode is formed below a channel region, a staggered structure, an inverted staggered structure, a structure where a channel region is divided into a plurality of regions, a structure where channel regions are connected in parallel or in series, or the like. A transistor with any of a variety of structures such as a planar type, a FIN-type, a Tri-Gate type, a top-gate type, a bottom-gate type, a double-gate type (with gates above and below a channel), and the like can be used.

Note that in this specification and the like, a transistor can be formed using any of a variety of substrates, for example. The type of a substrate is not limited to a certain type. As the substrate, a semiconductor substrate (e.g., a single crystal substrate or a silicon substrate), an SOI substrate, a glass substrate, a quartz substrate, a plastic substrate, a metal substrate, a stainless steel substrate, a substrate including stainless steel foil, a tungsten substrate, a substrate including tungsten foil, a flexible substrate, an attachment film, paper including a fibrous material, a base material film, or the like can be used, for example. As an example of a glass substrate, a barium borosilicate glass substrate, an aluminoborosilicate glass substrate, a soda lime glass substrate, or the like can be given. Examples of a flexible substrate, a flexible substrate, an attachment film, a base film, or the like are as follows: a plastic typified by polyethylene terephthalate (PET), polyethylene naphthalate (PEN), and polyether sulfone (PES); a synthetic resin such as acrylic; polypropylene; polyester; polyvinyl fluoride; polyvinyl chloride; polyester; polyamide; polyimide; aramid; epoxy; an inorganic vapor deposition film; and paper. Specifically, the use of semiconductor substrates, single crystal substrates, SOI substrates, or the like enables the manufacture of small-sized transistors with a small variation in characteristics, size, shape, or the like and with high current capability. A circuit using such transistors achieves lower power consumption of the circuit or higher integration of the circuit.

Note that a transistor may be formed using one substrate, and then the transistor may be transferred to another substrate. Examples of a substrate to which a transistor is transferred include, in addition to the above-described substrates over which transistors can be formed, a paper substrate, a cellophane substrate, an aramid film substrate, a polyimide film substrate, a stone substrate, a wood substrate, a cloth substrate (including a natural fiber (e.g., silk, cotton, or hemp), a synthetic fiber (e.g., nylon, polyurethane, or polyester), a regenerated fiber (e.g., acetate, cupra, rayon, or regenerated polyester), or the like), a leather substrate, a rubber substrate, and the like. When such a substrate is used, a transistor with excellent properties or a transistor with low power consumption can be formed, a device with high durability, high heat resistance can be provided, or reduction in weight or thickness can be achieved.

Note that all the circuits needed to realize a predetermined function can be formed over the same substrate (e.g., a glass substrate, a plastic substrate, a single crystal substrate, or an SOI substrate). Thus, costs can be reduced by reduction in the number of components, or the reliability can be improved by reduction in the number of connections to circuit components.

Note that it is possible to form not all the circuits needed to realize the predetermined function over the same substrate. That is, a part of the circuits needed to realize the predetermined function can be formed over a substrate and another part of the circuits needed to realize the predetermined function can be formed over another substrate. For example, a part of the circuits needed to realize the predetermined function can be formed over a glass substrate and a part of the circuits needed to realize the predetermined function can be formed over a single crystal substrate (or an SOI substrate). Then, a single crystal substrate over which a part of the circuits needed to realize the predetermined function (such a substrate is also referred to as an IC chip) can be connected to a glass substrate by COG (chip on glass), and an IC chip can be provided on the glass substrate. Alternatively, an IC chip can be connected to a glass substrate using TAB (tape automated bonding), COF (chip on film), SMT (surface mount technology), a printed circuit board, or the like. When some of the circuits are formed using the same substrate as a pixel portion in this manner, cost can be reduced by reduction in the number of components or reliability can be improved by reduction in the number of connections to circuit components. In particular, a circuit with high driving voltage, a circuit with high driving frequency, or the like consumes a large amount of power in many cases. In order to deal with it, such a circuit is formed over a substrate (e.g., a single crystal substrate) which is different from a substrate where the pixel portion is formed, so that an IC chip is formed. By the use of this IC chip, an increase in power consumption can be prevented.

For example, in this specification and the like, an active matrix method in which an active element is included in a pixel or a passive matrix method in which an active element is not included in a pixel can be used.

In an active matrix method, as an active element (a non-linear element), not only a transistor but also various active elements (non-linear elements) can be used. For example, an MIM (metal insulator metal), a TFD (thin film diode), or the like can also be used. Since such an element has few numbers of manufacturing steps, manufacturing cost can be reduced or yield can be improved. Alternatively, since the size of the element is small, the aperture ratio can be improved, so that power consumption can be reduced or higher luminance can be achieved.

As a method other than the active matrix method, the passive matrix method in which an active element (a non-linear element) is not used can also be used. Since an active element (a non-linear element) is not used, the number of manufacturing steps is small, so that manufacturing cost can be reduced or yield can be improved. Alternatively, since an active element (a non-linear element) is not used, the aperture ratio can be improved, so that power consumption can be reduced or higher luminance can be achieved, for example.

This embodiment can be combined with any of the other embodiments in this specification as appropriate.

Embodiment 7

In this embodiment, the structure of a display panel that can be used for a position input portion and a display device of the data processing device of one embodiment of the present invention will be described with reference to FIGS. 27A and 27B and FIG. 28. Note that the display panel described in this embodiment includes a touch sensor (a contact sensor device) that overlaps with a display portion; thus, the display panel can be called a touch panel (an input/output device).

Figure 27A:
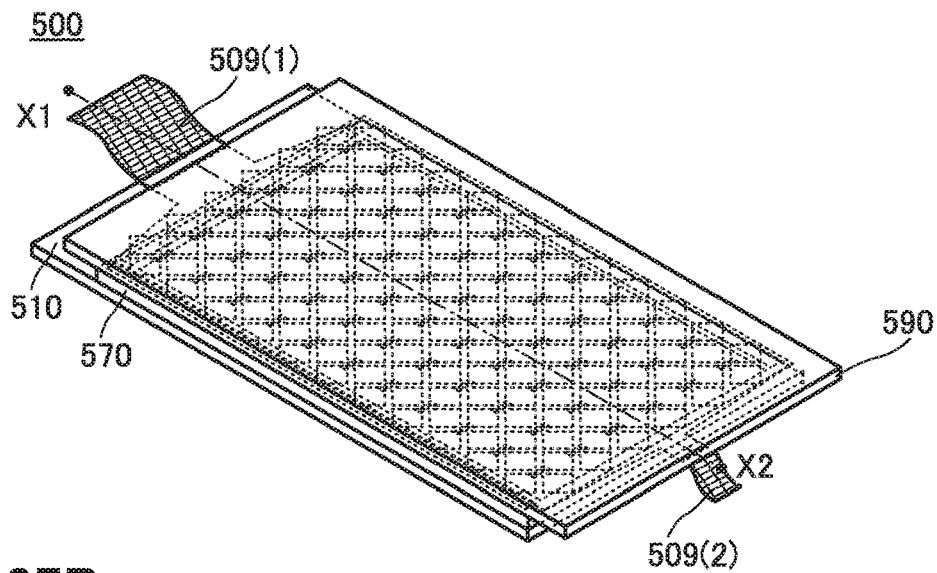
FIGS. 27A and 27B illustrate a structure of a display panel that can be used for a display device of an embodiment.

FIG. 27A is a schematic perspective view of a touch panel 500 described as an example in this embodiment. Note that FIGS. 27A and 27B illustrate only main components for simplicity. FIG. 27B is a developed view of the schematic perspective view of the touch panel 500.

Figure 28:
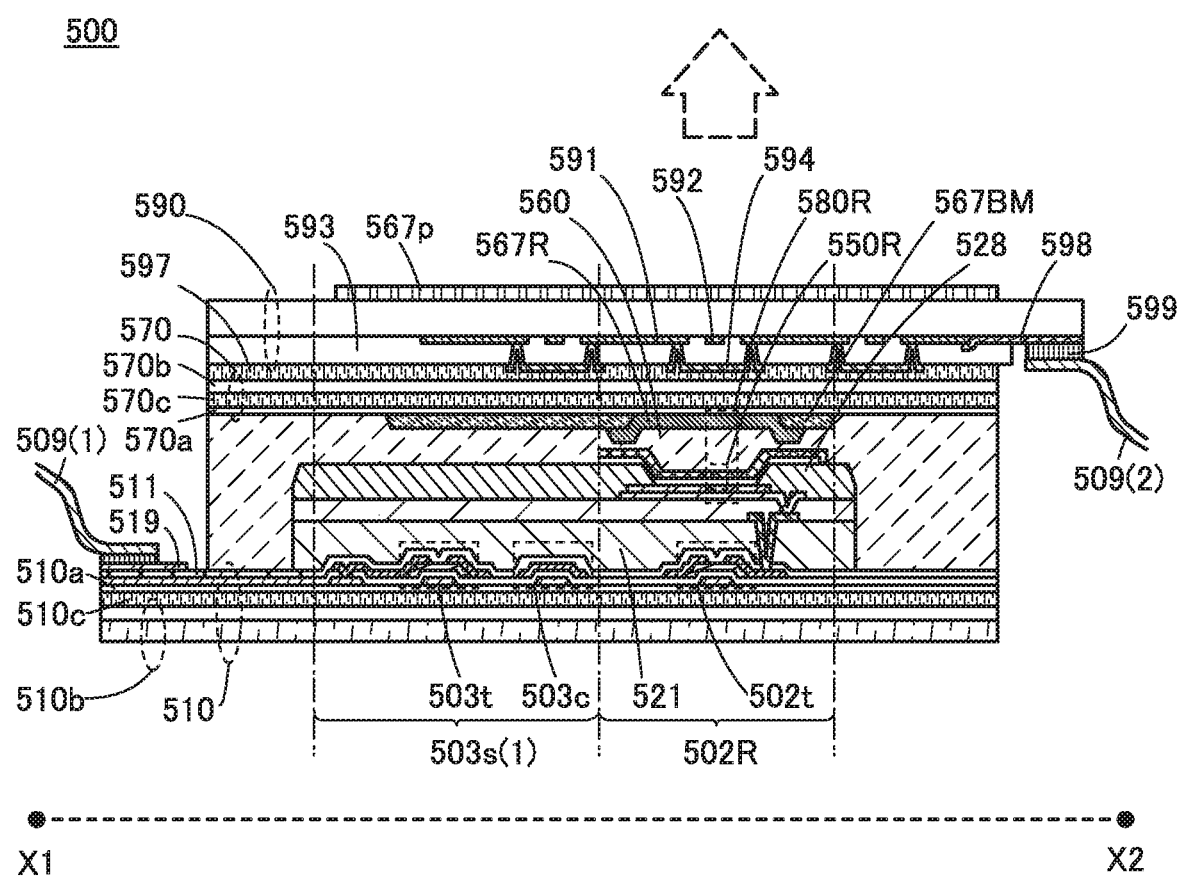
FIG. 28 illustrates a structure of a display panel that can be used for a display device of an embodiment.

FIG. 28 is a cross-sectional view of the touch panel 500 taken along line X1-X2 in FIG. 27A.

Figure 27B:
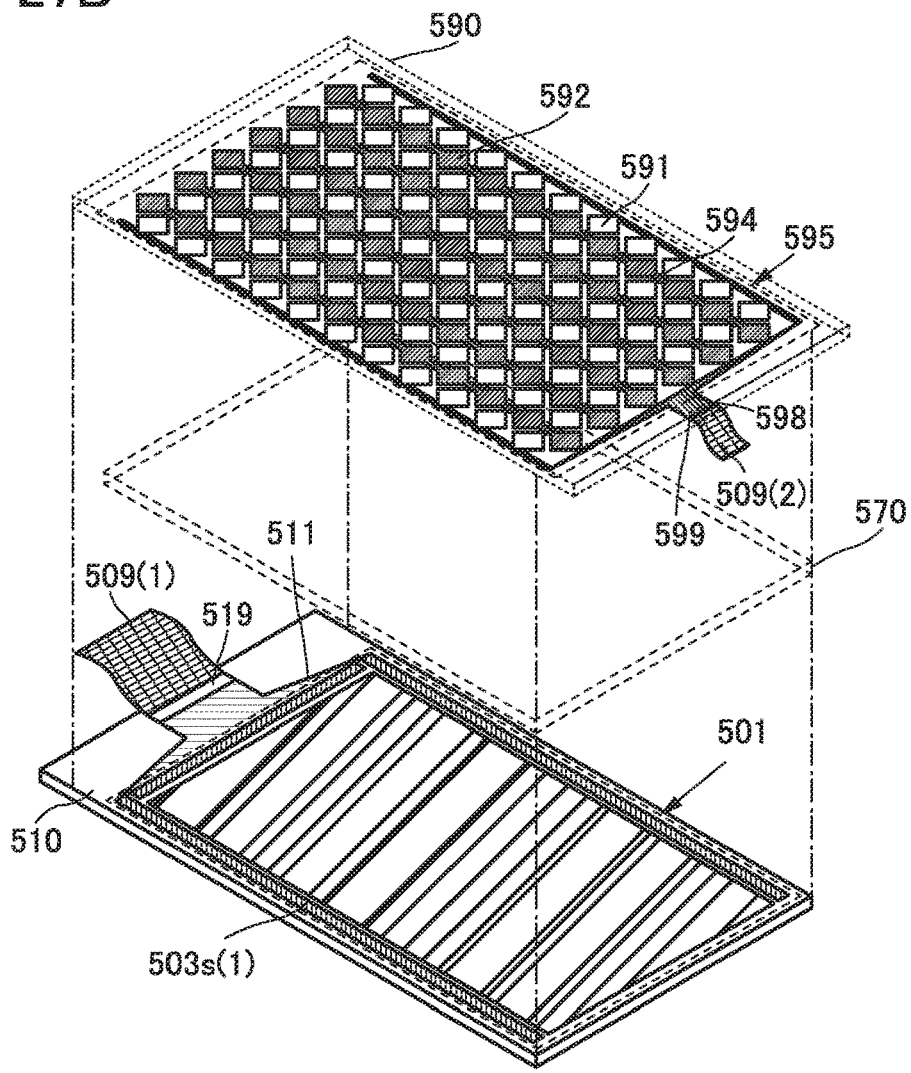

The touch panel 500 includes a display unit 501 and a touch sensor 595 (see FIG. 27B). Furthermore, the touch panel 500 includes a substrate 510, a substrate 570, and a substrate 590. Note that the substrate 510, the substrate 570, and the substrate 590 each have flexibility, for example.

Note that in this specification and the like, a transistor can be formed using any of a variety of substrates, for example. The type of a substrate is not limited to a certain type. As the substrate, a semiconductor substrate (e.g., a single crystal substrate or a silicon substrate), an SOI substrate, a glass substrate, a quartz substrate, a plastic substrate, a metal substrate, a stainless steel substrate, a substrate including stainless steel foil, a tungsten substrate, a substrate including tungsten foil, a flexible substrate, an attachment film, paper including a fibrous material, a base material film, or the like can be used, for example. As an example of a glass substrate, a barium borosilicate glass substrate, an aluminoborosilicate glass substrate, a soda lime glass substrate, or the like can be given. Examples of a flexible substrate include a flexible synthetic resin such as plastics typified by polyethylene terephthalate (PET), polyethylene naphthalate (PEN), and polyether sulfone (PES), and acrylic. Examples of an attachment film are attachment films formed using polypropylene, polyester, polyvinyl fluoride, polyvinyl chloride, and the like. Examples of the material for the base film include polyester, polyamide, polyimide, inorganic vapor deposition film, and paper. Specifically, the use of semiconductor substrates, single crystal substrates, SOI substrates, or the like enables the manufacture of small-sized transistors with a small variation in characteristics, size, shape, or the like and with high current capability. A circuit using such transistors achieves lower power consumption of the circuit or higher integration of the circuit.

The display portion 501 includes the substrate 510, a plurality of pixels over the substrate 510, and a plurality of wirings 511 through which signals are supplied to the pixels. The plurality of wirings 511 is led to a peripheral portion of the substrate 510, and part of the plurality of wirings 511 forms a terminal 519. The terminal 519 is electrically connected to an FPC 509(1).

<Touch Sensor>

The substrate 590 includes the touch sensor 595 and a plurality of wirings 598 electrically connected to the touch sensor 595. The plurality of wirings 598 is led to a peripheral portion of the substrate 590, and part of the plurality of wirings 598 forms a terminal for electrical connection to an FPC 509(2). Note that in FIG. 27B, electrodes, wirings, and the like of the touch sensor 595 provided on the back side of the substrate 590 (on the back side of the diagram) are indicated by solid lines for clarity.

As a touch sensor used as the touch sensor 595, a capacitive touch sensor is preferably used. Examples of the capacitive touch sensor are a surface capacitive touch sensor and a projected capacitive touch sensor. Examples of the projected capacitive touch sensor are a self capacitive touch sensor and a mutual capacitive touch sensor, which differ mainly in the driving method. The use of a mutual capacitive type is preferable because multiple points can be sensed simultaneously.

An example of using a projected capacitive touch sensor is described below with reference to FIG. 27B. Note that a variety of sensors that can sense the closeness or the contact of a sensing target such as a finger, can be used.

The projected capacitive touch sensor 595 includes electrodes 591 and electrodes 592. The electrodes 591 are electrically connected to any of the plurality of wirings 598, and the electrodes 592 are electrically connected to any of the other wirings 598.

The electrode 592 is in the form of a series of quadrangles arranged in one direction as illustrated in FIGS. 27A and 27B. Each of the electrodes 591 is in the form of a quadrangle. A wiring 594 electrically connects two electrodes 591 arranged in a direction intersecting with the direction in which the electrode 592 extends. The intersecting area of the electrode 592 and the wiring 594 is preferably as small as possible. Such a structure allows a reduction in the area of a region where the electrodes are not provided, reducing unevenness in transmittance. As a result, unevenness in luminance of light from the touch sensor 595 can be reduced.

Note that the shapes of the electrodes 591 and the electrodes 592 are not limited to the above-mentioned shapes and can be any of a variety of shapes. For example, the plurality of electrodes 591 may be provided so that space between the electrodes 591 are reduced as much as possible, and a plurality of electrodes 592 may be provided with an insulating layer sandwiched between the electrodes 591 and the electrodes 592 and may be spaced apart from each other to form a region not overlapping with the electrodes 591. In that case, between two adjacent electrodes 592, it is preferable to provide a dummy electrode which is electrically insulated from these electrodes, whereby the area of a region having a different transmittance can be reduced.

The structure of the touch panel 500 is described with reference to FIG. 28.

The touch sensor 595 includes the substrate 590, the electrodes 591 and the electrodes 592 provided in a staggered arrangement on the substrate 590, an insulating layer 593 covering the electrodes 591 and the electrodes 592, and the wiring 594 that electrically connects the adjacent electrodes 591 to each other.

An adhesive layer 597 attaches the substrate 590 to the substrate 570 so that the touch sensor 595 overlaps with the display portion 501.

The electrodes 591 and the electrodes 592 are formed using a light-transmitting conductive material. As a light-transmitting conductive material, a conductive oxide such as indium oxide, indium tin oxide, indium zinc oxide, zinc oxide, or zinc oxide to which gallium is added can be used.

The electrodes 591 and the electrodes 592 may be formed by depositing a light-transmitting conductive material on the substrate 590 by a sputtering method and then removing an unnecessary portion by any of various patterning techniques such as photolithography.

The insulating layer 593 covers the electrodes 591 and the electrodes 592. Examples of a material for the insulating layer 593 are a resin such as acrylic or epoxy resin, a resin having a siloxane bond, and an inorganic insulating material such as silicon oxide, silicon oxynitride, or aluminum oxide.

Furthermore, openings reaching the electrodes 591 are formed in the insulating layer 593, and the wiring 594 electrically connects the adjacent electrodes 591. The wiring 594 is preferably formed using a light-transmitting conductive material, in which case the aperture ratio of the touch panel can be increased. Moreover, the wiring 594 is preferably formed using a material that has higher conductivity than those of the electrodes 591 and the electrodes 592.

One electrode 592 extends in one direction, and a plurality of electrodes 592 is provided in the form of stripes.

The wiring 594 intersects with the electrode 592.

Adjacent electrodes 591 are provided with one electrode 592 provided therebetween and are electrically connected by the wiring 594.

Note that the plurality of electrodes 591 is not necessarily arranged in the direction orthogonal to one electrode 592 and may be arranged to intersect with one electrode 592 at an angle of less than 90 degrees.

One wiring 598 is electrically connected to any of the electrodes 591 and 592. Part of the wiring 598 serves as a terminal. For the wiring 598, a metal material such as aluminum, gold, platinum, silver, nickel, titanium, tungsten, chromium, molybdenum, iron, cobalt, copper, or palladium or an alloy material containing any of these metal materials can be used.

Note that an insulating layer that covers the insulating layer 593 and the wiring 594 may be provided to protect the touch sensor 595.

Furthermore, a connection layer 599 electrically connects the wiring 598 to the FPC 509(2).

As the connection layer 599, any of various anisotropic conductive films (ACF), anisotropic conductive pastes (ACP), or the like can be used.

The adhesive layer 597 has a light-transmitting property. For example, a thermosetting resin or an ultraviolet curable resin can be used; specifically, a resin such as an acrylic resin, a urethane resin, an epoxy resin, or a resin having a siloxane bond can be used.

⟨Display Portion⟩

The touch panel 500 includes a plurality of pixels arranged in a matrix. Each of the pixels includes a display element and a pixel circuit for driving the display element.

In this embodiment, an example of using an organic electroluminescent element that emits white light as a display element will be described; however, the display element is not limited to such element.

As the display element, for example, other than organic electroluminescent elements, any of a variety of display elements such as display elements (electronic ink) that perform display by an electrophoretic method, an electronic liquid powder method, or the like; MEMS shutter display elements; optical interference type MEMS display elements; and liquid crystal elements can be used. Note that a structure suitable for employed display elements can be selected from among a variety of structures of pixel circuits.

The substrate 510 is a stacked body in which a flexible substrate 510b, a barrier film 510a that prevents diffusion of unintentional impurities to light-emitting elements, and an adhesive layer 510c that attaches the barrier film 510a to the substrate 510b are stacked.

The substrate 570 is a stacked body in which a flexible substrate 570b, a barrier film 570a that prevents diffusion of unintentional impurities to the light-emitting elements, and an adhesive layer 570c that attaches the barrier film 570a to the substrate 570b are stacked.

A sealant 560 attaches the substrate 570 to the substrate 510. The sealant 560, also serving as an optical adhesive layer, has a refractive index higher than that of air. The pixel circuits and the light-emitting elements (e.g., a first light-emitting element 550R) are provided between the substrate 510 and the substrate 570.

<<Structure of Pixels>>

A pixel includes a sub-pixel 502R, and the sub-pixel 502R includes a light-emitting module 580R.

The sub-pixel 502R includes the first light-emitting element 550R and the pixel circuit that can supply electric power to the first light-emitting element 550R and includes a transistor 502t. Furthermore, the light-emitting module 580R includes the first light-emitting element 550R and an optical element (e.g., a coloring layer 567R).

The first light-emitting element 550R includes a lower electrode, an upper electrode, and a layer containing a light-emitting organic compound between the lower electrode and the upper electrode.

The light-emitting module 580R includes the first coloring layer 567R on the substrate 570. The coloring layer transmits light of a particular wavelength and is, for example, a layer that selectively transmits light of red, green, or blue color. A region that transmits light emitted from the light-emitting element as it is may be provided as well.

The light-emitting module 580R includes the sealant 560 that is in contact with the first light-emitting element 550R and the first coloring layer 567R.

The first coloring layer 567R is positioned in a region overlapping with the first light-emitting element 550R. Accordingly, part of light emitted from the first light-emitting element 550R passes through the sealant 560 that also serves as an optical adhesive layer and through the first coloring layer 567R and is emitted to the outside of the light-emitting module 580R as indicated by arrows in FIG. 28.

<<Structure of Display Portion>>

The display portion 501 includes a light-blocking layer 567BM on the substrate 570. The light-blocking layer 567BM is provided so as to surround the coloring layer (e.g., the first coloring layer 567R).

The display portion 501 includes an anti-reflective layer 567p positioned in a region overlapping with pixels. As the anti-reflective layer 567p, a circular polarizing plate can be used, for example.

The display portion 501 includes an insulating film 521. The insulating film 521 covers the transistor 502t. Note that the insulating film 521 can be used as a layer for planarizing unevenness due to the pixel circuit. An insulating film on which a layer that can prevent diffusion of impurities to the transistor 502t and the like is stacked can be used as the insulating film 521.

The display portion 501 includes the light-emitting elements (e.g., the first light-emitting element 550R) over the insulating film 521.

The display portion 501 includes, over the insulating film 521, a partition wall 528 that overlaps with an end portion of the first lower electrode. In addition, a spacer that controls the distance between the substrate 510 and the substrate 570 is provided on the partition wall 528.

<<Structure of Image Signal Line Driver Circuit>>

The image signal line driver circuit 503s(1) includes a transistor 503t and a capacitor 503c. Note that the image signal line driver circuit 503s(1) can be formed in the same process and over the same substrate as those of the pixel circuits.

<<Other Structures>>

The display portion 501 includes the wirings 511 through which signals can be supplied. The wirings 511 are provided with the terminal 519. Note that the FPC 509(1) through which a signal such as an image signal or a synchronization signal can be supplied is electrically connected to the terminal 519.

Note that a printed wiring board (PWB) may be attached to the FPC 509(1).

This embodiment can be combined with any of the other embodiments in this specification as appropriate.

Embodiment 8

In this embodiment, a method for manufacturing a foldable device that can be used for the data processing device or an electronic device of one embodiment of the present invention will be described with reference to FIGS. 29A to 29D, FIGS. 30A to 30D, and FIGS. 31A to 31D. As examples of the foldable device, a display device, a light-emitting device, an input device, and the like can be given. As examples of the input device, a touch sensor, a touch panel, and the like can be given. As examples of the light-emitting device, an organic EL panel, a lighting device, and the like can be given. As examples of the display device, a light-emitting device, an organic EL panel, a liquid crystal display device, and the like can be given. Note that functions of an input device such as a touch sensor and the like are provided in the display device and or the light-emitting device in some cases. For example, a counter substrate (e.g., a substrate not provided with a transistor) included in the display device or the light-emitting device is provided with a touch sensor in some cases. Alternatively, an element substrate (e.g., a substrate provided with a transistor) included in the display device or the light-emitting device is provided with a touch sensor in some cases. Alternatively, the counter substrate included in the display device or the light-emitting device and the element substrate included in the display device or the light-emitting device are provided with touch sensors in some cases.

Figure 29A:
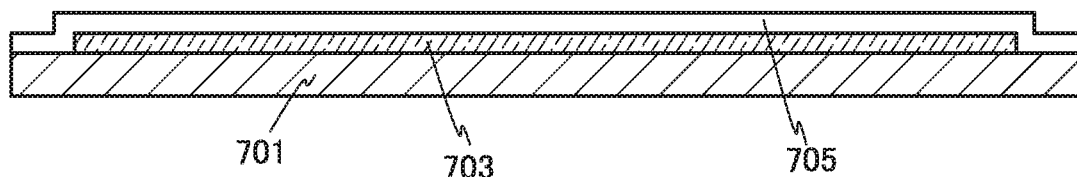
FIGS. 29A to 29D illustrate a method for manufacturing a foldable functional element of one embodiment.
Figure 29B:
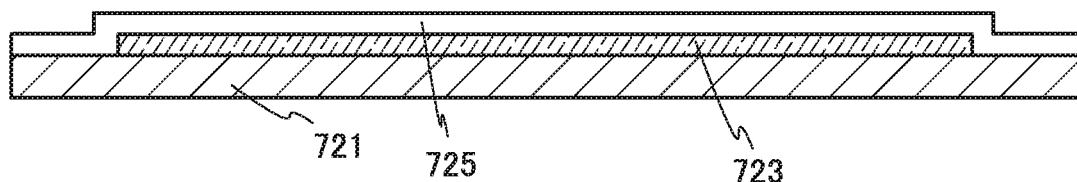

First, a separation layer 703 is formed over a formation substrate 701, and a layer 705 to be separated is formed over the separation layer 703 (FIG. 29A). Furthermore, a separation layer 723 is formed over a formation substrate 721, and a layer 725 to be separated is formed over the separation layer 723 (FIG. 29B).

Furthermore, in the case of using a tungsten film as a separation layer, a tungsten oxide film can be formed on a surface of the tungsten film by any of the following methods: performing a plasma treatment over the surface of the tungsten film using a gas containing oxygen such as $N_2O$, annealing the tungsten film in a gas atmosphere containing oxygen. Alternatively, a tungsten oxide film can be formed by method such as sputtering in gas atmosphere containing oxygen. In this manner, the oxide tungsten film may be formed between a separation layer and a layer to be separated.

In a separating and transferring process of the tungsten oxide film, it is preferable that the tungsten oxide film be mainly $WO_x$ whose x is smaller than 3. In the case where $WO_x$ is $W_nO_{(3n-1)}$ or $W_nO_{(3n-2)}$, which is a homologous series, shear is easily caused by heating because there is a crystal optical shear plane therein. The tungsten oxide film is formed, so that separation of the layer to be separated from a substrate can be performed with small force.

Alternatively, it is also possible that a tungsten film is not formed and only the tungsten oxide film is formed as the separation layer. For example, the tungsten oxide film may be formed by the following methods: performing a plasma treatment using a gas containing oxygen with respect to a sufficiently thin tungsten film, annealing the sufficiently thin tungsten film in a gas atmosphere containing oxygen. Alternatively, the tungsten oxide film may be formed by a method such as a sputtering method in a gas atmosphere containing oxygen.

Here, when the tungsten oxide film is separated at the interface with the layer to be separated, the tungsten oxide film remains on the layer to be separated side in some cases. When the tungsten oxide film remains, the characteristics of the transistor are adversely affected in some cases. Thus, after a step of separating the separation layer and the layer to be separated, the step of removing the tungsten oxide film is preferably included. In the above method of separating from the substrate, $N_2O$ plasma treatment is not necessarily performed, and the step of removing the tungsten oxide film can be omitted. In that case, the device can be manufactured more easily.

Furthermore, in one embodiment of the present invention, a tungsten film with a thickness of greater than or equal to 0.1 nm and less than 200 nm is formed over the substrate.

As the separation layer, a film containing molybdenum, titanium, vanadium, tantalum, silicon, aluminum, or an alloy thereof can be used, besides a tungsten film. Furthermore, it is also possible to use a stack of such a film and an oxide film. The separation layer is not limited to an inorganic film, and an organic film such as polyimide may be used.

In the case of using an organic resin for the separation layer, a process temperature needs to be lower than or equal to 350° C. when polysilicon is used as an active layer of the transistor. Thus, dehydrogenation baking for silicon crystallization, hydrogenation for termination of defects in silicon, or activation of a doped region cannot be performed sufficiently, so that the performance of the transistor is limited. On the other hand, in the case of using an inorganic film, the process temperature can be higher than 350° C., and excellent characteristics of a transistor can be obtained.

In the case of using the organic resin for the separation layer, the organic resin or a functional element is damaged by laser irradiation at the time of crystallization; thus, it is preferable to use an inorganic film for the separation layer because such a problem is not caused.

Furthermore, in the case of using the organic resin for the separation layer, the organic resin shrinks by laser irradiation for separating the resin and contact failure is caused in the contact portion of the terminal of an FPC or the like, which makes it difficult for functional elements with many terminals a high-definition display of FPC, or the like to separate and transpose with high yield. In the case of using an inorganic film for the separation layer, there is no such limitation, and functional elements with many terminals of high-definition display and the like, or the like can be separated and transferred with high yield.

In the method for separating and transferring the functional element from the substrate of one embodiment of the present invention, an insulating film and a transistor can be formed over the formation substrate at a temperature of lower than or equal to 600° C. In that case, a high-temperature polysilicon or CG silicon (registered trademark) can be used for a semiconductor layer. With use of a conventional production line for high-temperature polysilicon or CG silicon (registered trademark), a semiconductor device with a high operation speed, a high gas barrier property, and high reliability can be mass-produced. In that case, with use of the insulating layer and the transistor formed through the process at the temperature of lower than or equal to 600° C., insulating layers having an excellent gas barrier property formed at the temperature of lower than or equal to 600° C. can be provided above and below an organic EL element. Accordingly, entry of impurities such as moisture into the organic EL element or the semiconductor layer can be suppressed, whereby an extraordinarily reliable light-emitting device can be obtained as compared with the case of using the organic resin or the like as the separation layer.

Alternatively, the insulating layer and the transistor can be formed over the formation substrate at 500° C. or lower. In that case, low-temperature polysilicon or an oxide semiconductor can be used for the semiconductor layer, and mass production is possible with use of a conventional production line for low temperature polysilicon. Also in that case, with use of the insulating layer and the transistor formed through the process at the temperature of lower than or equal to 500° C., insulating layers having an excellent gas barrier property formed at the temperature of lower than or equal to 500° C. can be provided above and below the organic EL element. Accordingly, the entry of impurities such as moisture into the inorganic EL element or the semiconductor layer is suppressed, whereby a highly reliable light-emitting device can be obtained as compared with the case of using the organic resin as the separation layer.

Alternatively, the insulating layer and the transistor can be formed over the formation substrate at 400° C. or lower. In that case, amorphous silicon or the oxide semiconductor can be used for the semiconductor layer, and mass production is possible with use of a conventional production line for amorphous silicon. Also in that case, with use of the insulating layer and the transistor formed through the process at the temperature of 400° C. or lower, the insulating layers having an excellent gas barrier property formed at the temperature of 400° C. or lower can be provided above and below the organic EL element. Accordingly, entry of impurities such as moisture into the organic EL element or the semiconductor layer is suppressed, whereby a highly reliable light emitting device can be obtained as compared with a case of using the organic resin and the like as the separation layer.

Figure 29C:
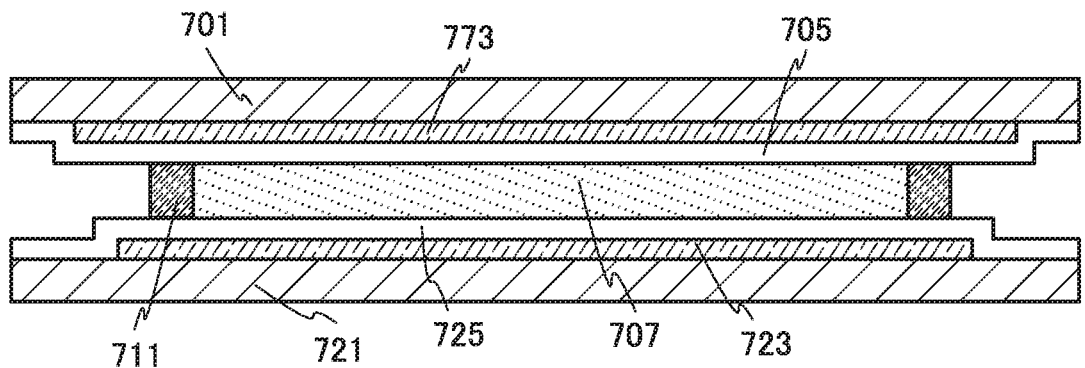

Next, the formation substrate 701 and the formation substrate 721 are attached to each other by using a bonding layer 707 and a frame-shaped bonding layer 711 so that the surfaces over which the layers to be separated are formed face each other, and then, the bonding layer 707 and the frame-shaped bonding layer 711 are cured (FIG. 29C). Here, the frame-shaped bonding layer 711 and the bonding layer 707 in a region surrounded by the frame-shaped bonding layer 711 are provided over the layer 725 to be separated and after that, the formation substrate 701 and the formation substrate 721 face each other and are attached to each other.

Note that the formation substrate 701 and the formation substrate 721 are preferably attached to each other in a reduced-pressure atmosphere.

Figure 29D:
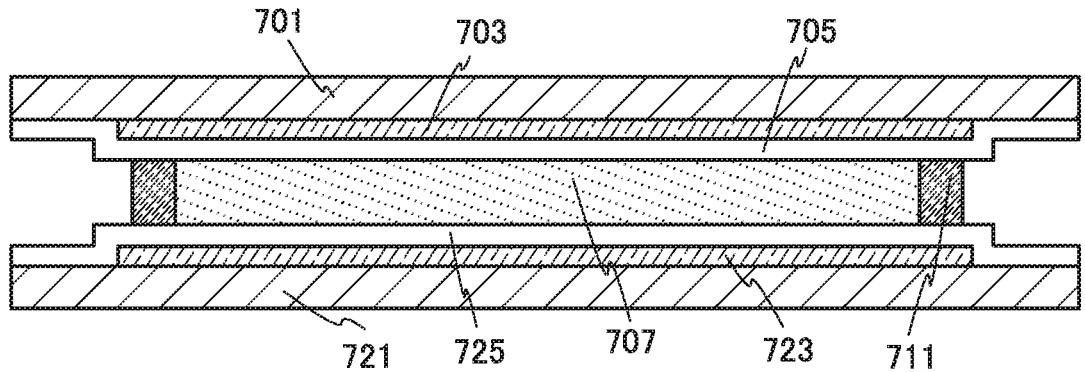

Note that although FIG. 29C illustrates the case where the separation layer 703 and the separation layer 723 are different in size, separation layers of the same size as illustrated in FIG. 29D may be used.

The bonding layer 707 is provided to overlap with the separation layer 703, the layer 705 to be separated, the layer 725 to be separated, and the separation layer 723. Then, an end portion of the bonding layer 707 is preferably positioned on an inner side of at least an end portion of either the separation layer 703 or the separation layer 723 (the separation layer which is desirably separated from the substrate first). Accordingly, strong adhesion between the formation substrate 701 and the formation substrate 721 can be suppressed; thus, a decrease in the yield of a subsequent separation process can be suppressed.

Figure 30A:
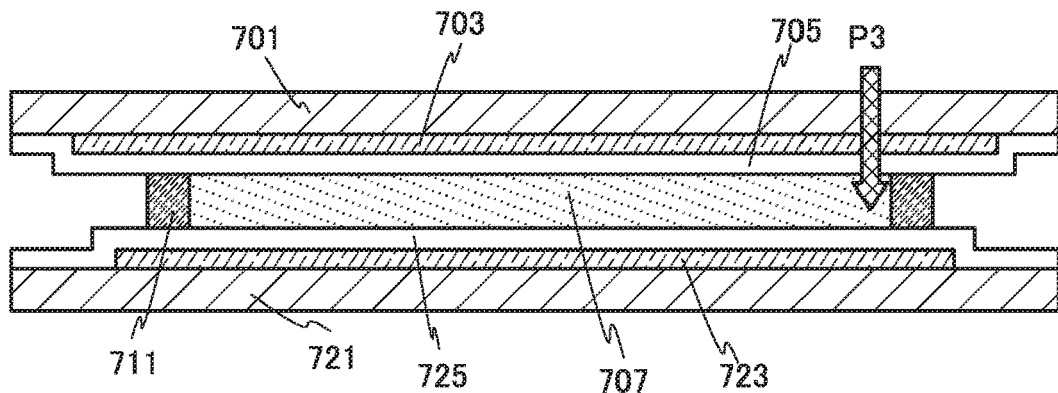
FIGS. 30A to 30D illustrate a method for manufacturing a foldable functional element of an embodiment.
Figure 30B:
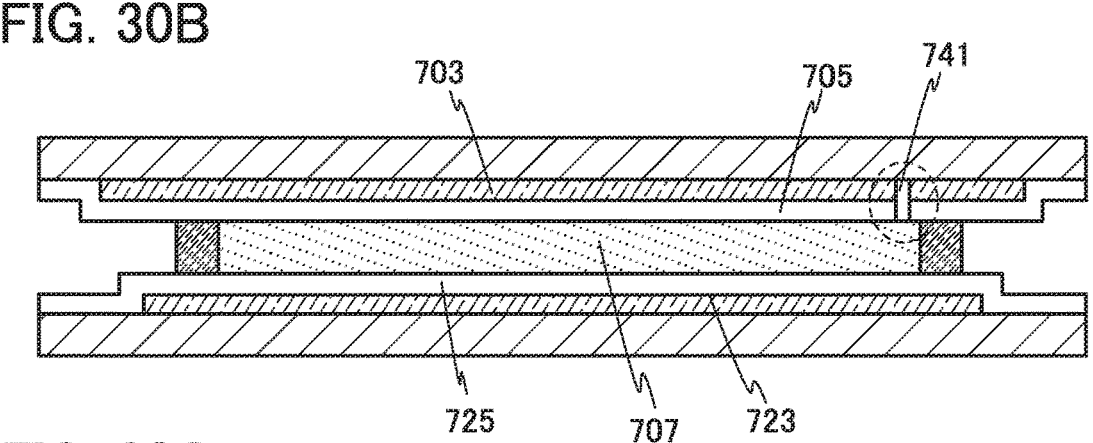

Next, a first separation trigger 741 from the substrate is formed by laser light irradiation (FIGS. 30A and 30B).

Either the formation substrate 701 or the formation substrate 721 may be separated first. In the case where the separation layers differ in size, a substrate over which a larger separation layer is formed may be separated first or a substrate over which a smaller separation layer is formed may be separated first. In the case where an element such as a semiconductor element, a light-emitting element, or a display element is formed only over one of the substrates, the substrate on the side where the element is formed may be separated first or the other substrate may be separated first. Here, an example in which the formation substrate 701 is separated first is described.

A region where the bonding layer 707 in a cured state or the frame-shaped bonding layer 711 in a cured state, the layer 705 to be separated, and the separation layer 703 overlap with one another is irradiated with laser light. Here, the bonding layer 707 is in a cured state and the frame-shaped bonding layer 711 is not in a cured state, and the bonding layer 707 in a cured state is irradiated with laser light (see an arrow P3 in FIG. 30A).

The first separation trigger 741 (see a region surrounded by a dashed line in FIG. 30B) can be formed by cracking (causing break or crack) at least the first layer (a layer provided between the layer 705 to be separated and the separation layer 703, e.g., a tungsten oxide film). At this time, not only the first layer but also the separation layer 703, the bonding layer 707, or another layer included in the layer 705 to be separated may be partly removed.

It is preferable that laser light irradiation be performed from the substrate side provided with the separation layer that is desirably separated. In the case where a region where the separation layer 703 and the separation layer 723 overlap with each other is irradiated with laser light, the formation substrate 701 and the separation layer 703 can be selectively separated by cracking only the layer 705 to be separated between the layer 705 to be separated and the layer 725 to be separated (see a region surrounded by a dotted line in FIG. 30B).

When the separation trigger from the substrate is formed in both the layer 705 to be separated on the separation layer 703 side and the layer 725 to be separated on the separation layer 723 side in the case where the region where the separation layer 703 and the separation layer 723 overlap with each other is irradiated with laser light, it might be difficult to selectively separate one of the formation substrates. Therefore, laser light irradiation conditions might be restricted so that only one of the layers to be separated is cracked. The first separation trigger 741 from the substrate may be formed by a sharp knife such as a cutter, without limitation to the laser light irradiation, or the like.

Figure 30C:
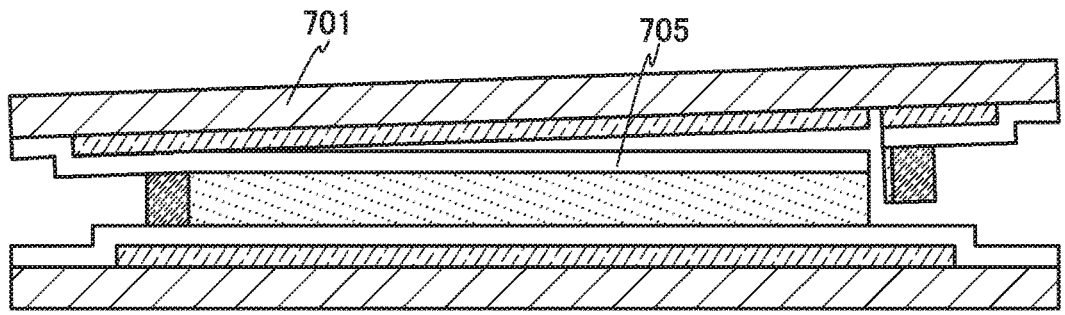
Figure 30D:
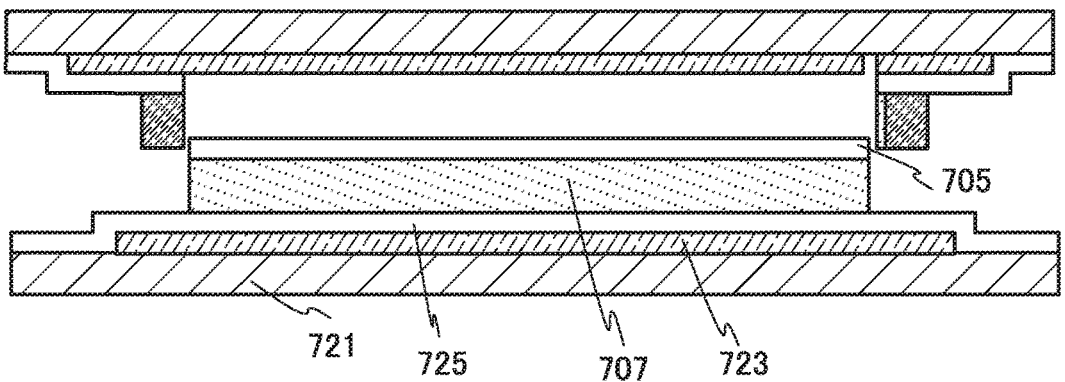

Then, the layer 705 to be separated and the formation substrate 701 are separated from each other from the formed first separation trigger 741 (FIGS. 30C and 30D). Accordingly, the layer 705 to be separated can be transferred from the formation substrate 701 to the formation substrate 721.

Figure 31A:
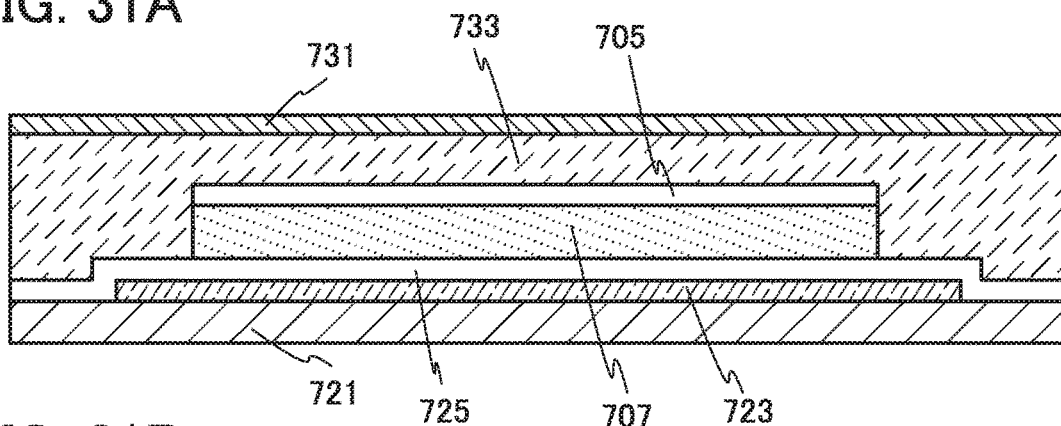
FIGS. 31A to 31D illustrate a method for manufacturing a foldable functional element of an embodiment.

The layer 705 which is separated from the formation substrate 701 in the step in FIG. 30D is attached to a substrate 731 with a bonding layer 733, and the bonding layer 733 is cured (FIG. 31A).

Figure 31B:
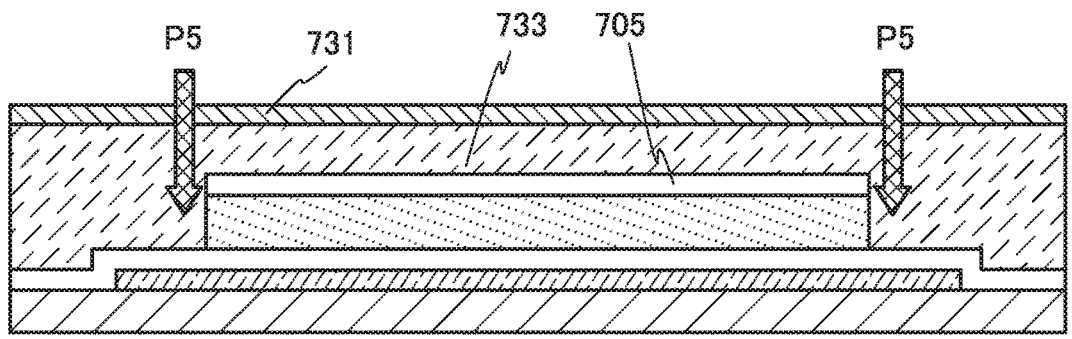
Figure 31C:
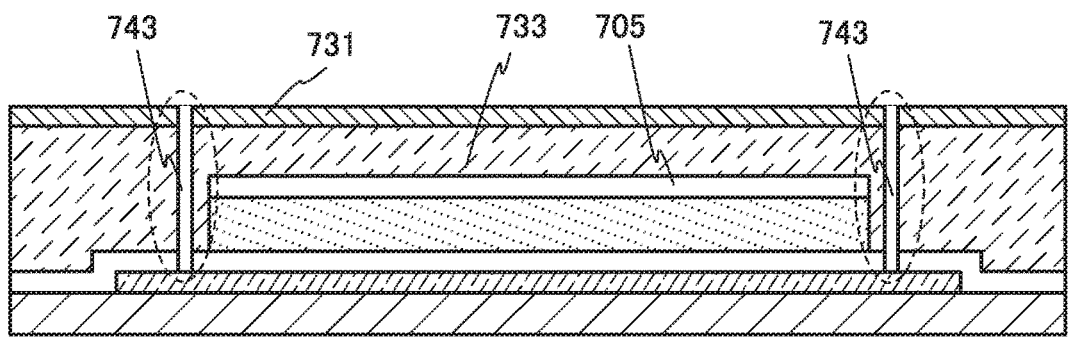

Next, a second separation trigger 743 from the substrate is formed by a sharp knife such as a cutter (FIGS. 31B and 31C). The second separation trigger 743 from the substrate is formed by the laser light irradiation, without limitation to the sharp knife such as a cutter, or the like.

In the case where the substrate 731 on the side where the separation layer 723 is not provided can be cut by a knife or the like, a cut may be made in the substrate 731, the bonding layer 733, and the layer 725 to be separated (see arrows P5 in FIG. 31B). Accordingly, part of the first layer can be removed; thus, the second separation trigger 743 from the substrate can be formed (see a region surrounded by a dashed line in FIG. 31C).

As illustrated in FIGS. 31B and 31C, in the case where the formation substrate 721 and the substrate 731 are attached to each other using the bonding layer 733 in a region not overlapping with the separation layer 723, yield of a process for separation from the substrate might be decreased depending on a degree of adhesion between the formation substrate 721 side and the substrate 731 side. Therefore, it is preferable to make a cut in a frame shape in a region where the bonding layer 733 in a cured state and the separation layer 723 overlap with each other to form the second separation trigger 743 from the substrate in a form of a solid line. Accordingly, the yield of a process for separation from the substrate can be improved.

Figure 31D:
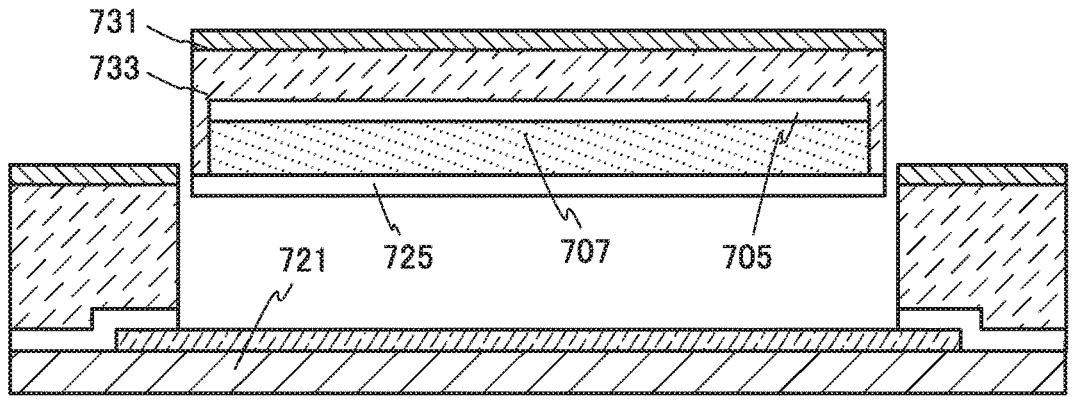

Then, the layer 725 to be separated and the formation substrate 721 are separated from each other from the formed second separation trigger 743 from the substrate (FIG. 31D). Accordingly, the layer 725 to be separated can be transferred from the formation substrate 721 to the substrate 731.

For example, in the case where the tungsten oxide film, which is tightly anchored by $N_2O$ plasma or the like is formed on an inorganic film such as a tungsten film, adhesion can be relatively high in deposition. After that, when a separation trigger is formed, cleavage occurs therefrom, whereby a layer to be separated is easily separated from the formation surface and transferred to another substrate.

The formation substrate 721 and the layer 725 to be separated may be separated by filling the interface between the separation layer 723 and the layer 725 to be separated with a liquid such as water. A portion between the separation layer 723 and the layer 725 to be separated absorbs a liquid through capillarity action, whereby an adverse effect (e.g., a phenomenon in which a semiconductor element is damaged by static electricity) on the functional element such as an FET included in the layer 725 to be separated due to static electricity caused at the time of separation from the substrate can be suppressed.

When a bond of M-O—W (M represents a given element) is divided by application of physical force, a liquid is absorbed in the separation portion, whereby the bond becomes a bond of M-OH HO—W and the separation is promoted.

Note that a liquid may be sprayed in an atomized form or in a vaporized form. As the liquid, pure water, an organic solvent, or the like can be used; a neutral, alkaline, or acid aqueous solution, an aqueous solution in which salt is dissolved, and the like may be used.

The temperature of the liquid and the substrate at the time of dynamic separation is set in the range from room temperature to 120° C., and preferably set to 60° C. to 90° C.

In the method for separation from the substrate of one embodiment of the present invention described above, separation of the formation substrate is performed in such a manner that the second separation trigger 743 from the substrate is formed by a sharp knife or the like so that the separation layer and the layer to be separated are made in a state where separating can be easily performed. Accordingly, the yield of the process for separation from substrate can be improved.

In addition, bonding of a substrate with which a device is to be formed can be performed after the following procedure: a pair of formation substrates each provided with the layer to be separated are attached to each other and then, separating each formation substrate is performed. This means that formation substrates having low flexibility can be attached to each other when the layers to be separated are attached to each other. Accordingly, alignment accuracy at the time of attachment can be improved as compared to the case where flexible substrates are attached to each other.

Note that this embodiment can be combined with any of the other embodiments and examples described in this specification as appropriate.

EXPLANATION OF REFERENCE

100: data processing device, 101: housing, 110: arithmetic unit, 111: arithmetic portion, 112: memory portion, 114: transmission path, 115: input/output interface, 120: input/output unit, 130: display portion, 131: keyboard, 140: position input portion, 141: substrate, 142: proximity sensor, 145: input/output portion, 150: sensor portion, 151: sensor, 152: arrow, 159: sign, 160: communication portion, 300: input/output unit, 301: display portion, 302: pixel, 308: imaging pixel, 309: FPC, 310: substrate, 311: wiring, 319: terminal, 321: insulating film, 328: partition wall, 329: spacer, 352: upper electrode, 353: layer, 354: intermediate layer, 360: sealant, 370: counter substrate, 500: touch panel, 501: display portion, 509: FPC, 510: substrate, 511: wiring, 519: terminal, 521: insulating film, 528: partition wall, 560: sealant, 570: substrate, 590: substrate, 591: electrode, 592: electrode, 593: insulating layer, 594: wiring, 595: touch sensor, 597: adhesive layer, 598: wiring, 599: connection layer, 100B: data processing device, 120B: input/output unit, 130B: display portion, 13a: connecting member, 13b: connecting member, 140 (1): region, 140 (2): region, 140 (3): region, 140 (4): region, 140 (5): region, 140B: position input portion, 140B (1): region, 140B (2): region, 140B (3): region, 15a: supporting member, 15b: supporting member, 302B: sub-pixel, 302G: sub-pixel, 302R: sub-pixel, 302t: transistor, 303c: capacitor, 303g (1): scan line driver circuit, 303g (2): imaging pixel driver circuit, 303s (1): image signal line driver circuit, 303s (2): imaging signal line driver circuit, 303t: transistor, 308p: photoelectric conversion element, 308t: transistor, 310a: barrier film, 310b: substrate, 310c: adhesive layer, 350R: light-emitting element, 351R: lower electrode, 353a: light-emitting unit, 353b: light-emitting unit, 367BM: light-blocking layer, 367p: anti-reflective layer, 367R: coloring layer, 370a: barrier film, 370b: substrate, 370c: adhesive layer, 380B: light-emitting module, 380G: light-emitting module, 380R: light-emitting module, 502R: sub-pixel, 502*t*: transistor, 503*c*: capacitor, 503*s*: image signal line driver circuit, 503*t*: transistor, 510*a*: barrier film, 510*b*: substrate, 510*c*: adhesive layer, 550R: light-emitting element, 567BM: light-blocking layer, 567*p*: anti-reflective layer, 567R: coloring layer, 570*a*: barrier film, 570*b*: substrate; 570*c*: adhesive layer, 580R: light-emitting module, 701: formation substrate, 703: separation layer, 705: layer to be separated, 707: bonding layer, 711: frame-shaped bonding layer, 721: formation substrate, 723: separation layer, 725: layer to be separated; 731: substrate, 733: bonding layer, 741: first separation trigger, and 743: second separation trigger.

This application is based on Japanese Patent Application serial no. 2013-248392 filed with Japan Patent Office on Nov. 29, 2013, the entire contents of which are hereby incorporated by reference.

What is claimed is:

1. A portable device comprising:
a display panel configured to display an image over a front surface and a first side surface of the portable device;
a sensor portion configured to sense touch of an object over the front surface and the first side surface of the portable device; and
an arithmetic portion configured to determine whether touch in a region of the display panel corresponds to an intentional input of a user and selectively stop supply of an image signal to the region,
wherein a part of the display panel is curved toward a back surface of the portable device, and
wherein the arithmetic portion is on and in contact with the part of the display panel.

2. The portable device according to claim 1, wherein touch in the region is identified as an unintentional input when the portable device is held by the user for a certain period.

3. The portable device according to claim 1, wherein the part of display panel is curved in conformity with the first side surface of the portable device.

4. The portable device according to claim 1, wherein the display panel is configured to display the image over a second side surface opposite to the first side surface of the portable device.

5. A portable device comprising:
a display panel configured to display an image over a front surface and a first side surface of the portable device;
a sensor portion configured to sense touch of an object over the front surface and the first side surface of the portable device; and
an arithmetic portion configured to determine whether touch in a region of the display panel corresponds to an intentional input of a user and selectively stop supply of an image signal to the region,
wherein a part of the display panel is curved toward a back surface of the portable device,
wherein the sensor portion comprises a plurality of sensors over a flexible substrate,
wherein a part of the flexible substrate is curved toward the back surface of the portable device, and
wherein the arithmetic portion is on and in contact with the part of the display panel.

6. The portable device according to claim 5, wherein touch in the region is identified as an unintentional input when the portable device is held by the user for a certain period.

7. The portable device according to claim 5, wherein the part of display panel is curved in conformity with the first side surface of the portable device.

8. The portable device according to claim 5, wherein the display panel is configured to display the image over a second side surface opposite to the first side surface of the portable device.

9. A portable device comprising:
a display panel configured to display an image over a front surface and a first side surface of the portable device;
a sensor portion configured to sense touch of an object over the front surface and the first side surface of the portable device; and
an arithmetic portion configured to determine whether touch in a region of the display panel corresponds to an intentional input of a user and selectively stop supply of an image signal to the region,
wherein a part of the display panel is curved toward a back surface of the portable device,
wherein the arithmetic portion is on and in contact with the part of the display panel, and
wherein the display panel is folded in three such that a first portion, a second portion, and a third portion of the display panel overlap with each other.

10. The portable device according to claim 9, wherein touch in the region is identified as an unintentional input when the portable device is held by the user for a certain period.

11. The portable device according to claim 9, wherein the part of display panel is curved in conformity with the first side surface of the portable device.

12. The portable device according to claim 9, wherein the display panel is configured to display the image over a second side surface opposite to the first side surface of the portable device.

13. The portable device according to claim 9, wherein the display panel is folded between the first portion and the second portion and between the second portion and the third portion.

* * * * *